(12) United States Patent
Varaprasad et al.

(10) Patent No.: US 6,954,300 B2
(45) Date of Patent: Oct. 11, 2005

(54) ELECTROCHROMIC POLYMERIC SOLID FILMS, MANUFACTURING ELECTROCHROMIC DEVICES USING SUCH SOLD FILMS, AND PROCESSES FOR MAKING SUCH SOLID FILMS AND DEVICES

(75) Inventors: Desaraju V. Varaprasad, Holland, MI (US); Mingtang Zhao, Holland, MI (US); Craig Allen Dornan, Grand Haven, MI (US); Anoop Agrawal, Tucson, AZ (US); Pierre-Marc Allemand, Tucson, AZ (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/835,328

(22) Filed: Apr. 17, 2001

(65) Prior Publication Data

US 2002/0012156 A1 Jan. 31, 2002

Related U.S. Application Data

(63) Continuation of application No. 09/251,937, filed on Feb. 18, 1999, now Pat. No. 6,245,262, which is a continuation of application No. 08/824,501, filed on Mar. 26, 1997, now Pat. No. 5,910,854, which is a continuation-in-part of application No. 08/406,663, filed on Mar. 20, 1995, now abandoned, which is a continuation of application No. 08/193,557, filed on Feb. 8, 1994, now abandoned, which is a continuation-in-part of application No. 08/023,675, filed on Feb. 26, 1993, now abandoned.

(51) Int. Cl.$^7$ .............................................. G02F 1/153
(52) U.S. Cl. ...................................... 359/273; 359/275
(58) Field of Search ................................... 359/265–275

(56) References Cited

U.S. PATENT DOCUMENTS 3,215,038 A    11/1965   Heller et al. ................. 252/586
3,280,701 A    10/1966   Donnelly et al. ............ 359/275
3,451,741 A     6/1969   Manos ......................... 359/275

(Continued)

FOREIGN PATENT DOCUMENTS

| AU | A6804290 | 2/1991 |
|----|----------|--------|
| EP | 0115394  | 8/1984 |
| EP | 0145337  | 6/1985 |

(Continued)

OTHER PUBLICATIONS

US 5,148,305, 9/1992, Byker (withdrawn)
H. Akahoshi et al., "Electrochemical and Spectrochemical Properties of Polyviologen Complex Modified Electrodes", J. Phys. Chem., 85, 818–22 (1981).
F.G.K. Baucke, "Electrochromic Mirrors with Variable Reflectance", *Optical Matls Tech. for Energy Efficiency and Solar Energy Conversion V*, SPIE—The International Society for Optical Engineering, SPIE vol. 653, 47–54 (1986).

(Continued)

*Primary Examiner*—Evelyn A. Lester
(74) *Attorney, Agent, or Firm*—Fitzpatrick, Cella, Harper & Scinto

(57) ABSTRACT

The present invention relates to electrochromic polymeric solid films, manufacturing electrochromic devices using such solid films and processes for making such solid films and devices. The electrochromic polymeric solid films of the present invention exhibit beneficial properties and characteristics, especially when compared to known electrochromic media. The electrochromic polymeric solid films are transformed in situ from a low viscosity electrochromic monomer composition by exposure to electromagnetic radiation, and in so doing minimum shrinkage occurs. The electrochromic polymeric solid films of the present invention also perform well under prolonged coloration, outdoor weathering and all-climate exposure, and provide an inherent safety aspect not known to electrochromic media heretofore.

29 Claims, 1 Drawing Sheet

U.S. PATENT DOCUMENTS

| | | | |
|---|---|---|---|
| 3,453,038 A | 7/1969 | Kissa et al. | 359/275 |
| 3,521,941 A | 7/1970 | Deb et al. | 359/275 |
| 3,652,149 A | 3/1972 | Rogers | 359/275 |
| 3,692,388 A | 9/1972 | Hall, Jr. et al. | 359/275 |
| 3,774,988 A | 11/1973 | Rogers | 359/275 |
| 3,806,229 A | 4/1974 | Schoot et al. | 359/273 |
| 3,807,832 A | 4/1974 | Castellion | 359/267 |
| 3,854,794 A | 12/1974 | Van Dam et al. | 359/272 |
| 3,873,185 A | 3/1975 | Rogers | 359/275 |
| 4,116,545 A | 9/1978 | Reddy | 359/270 |
| 4,139,234 A | 2/1979 | Morgan | 296/201 |
| 4,142,783 A | 3/1979 | Engler et al. | 359/265 |
| 4,174,152 A | 11/1979 | Giglia et al. | 359/270 |
| 4,282,272 A | 8/1981 | Matsuhiro et al. | 427/126.3 |
| RE30,835 E | 12/1981 | Giglia | 359/270 |
| 4,304,465 A | 12/1981 | Diaz | 359/273 |
| 4,306,774 A | 12/1981 | Nicholson | 359/270 |
| 4,338,000 A | 7/1982 | Kamimori et al. | 359/275 |
| 4,435,048 A | 3/1984 | Kamimori et al. | 359/275 |
| 4,449,786 A | 5/1984 | McCord | 359/868 |
| 4,465,339 A | 8/1984 | Baucke et al. | 359/274 |
| 4,473,695 A | 9/1984 | Wrighton et al. | 546/266 |
| 4,519,930 A | 5/1985 | Kakiuchi | 252/62.2 |
| 4,550,982 A | 11/1985 | Hirai | 359/274 |
| 4,561,625 A | 12/1985 | Weaver | 249/85 |
| 4,586,792 A | 5/1986 | Yang et al. | 359/273 |
| 4,613,211 A | 9/1986 | Papir et al. | 359/270 |
| 4,652,090 A | 3/1987 | Uchikawa et al. | 359/267 |
| 4,671,619 A | 6/1987 | Kamimori et al. | 359/275 |
| 4,702,566 A | 10/1987 | Tukude et al. | 359/267 |
| 4,712,879 A | 12/1987 | Lynam et al. | 359/275 |
| 4,741,603 A | 5/1988 | Miyagi et al. | 359/270 |
| 4,750,817 A | 6/1988 | Sammells | 359/270 |
| 4,795,242 A | 1/1989 | Fred et al. | 359/265 |
| 4,807,977 A | 2/1989 | Sammells | 359/270 |
| 4,810,067 A | 3/1989 | Demiryont | 359/265 |
| 4,832,467 A | 5/1989 | Miyagi et al. | 359/273 |
| 4,871,236 A | 10/1989 | Gemma et al. | 359/273 |
| 4,872,745 A | 10/1989 | Fujisawa et al. | 359/268 |
| 4,893,908 A | 1/1990 | Wolf et al. | 359/275 |
| 4,902,108 A | 2/1990 | Byker | 359/265 |
| 4,908,283 A | 3/1990 | Takahashi et al. | 429/317 |
| 4,927,246 A | 5/1990 | Ito et al. | 359/275 |
| 4,962,158 A | 10/1990 | Kobayashi et al. | 525/279 |
| 4,973,844 A | 11/1990 | O'Farrell et al. | 250/341 |
| 4,993,810 A | 2/1991 | Demiryont | 359/265 |
| 5,028,124 A | 7/1991 | Akhtar | 359/265 |
| 5,042,923 A | 8/1991 | Wolf et al. | 359/275 |
| 5,066,112 A | 11/1991 | Lynam et al. | 359/267 |
| 5,068,062 A | 11/1991 | Inata et al. | 252/518 |
| 5,073,012 A | 12/1991 | Lynam | 359/265 |
| 5,076,674 A | 12/1991 | Lynam | 359/274 |
| 5,080,471 A | 1/1992 | Cogan et al. | 359/275 |
| 5,115,346 A | 5/1992 | Lynam | 359/604 |
| 5,122,896 A | 6/1992 | Mizusaki et al. | 359/273 |
| 5,128,799 A | 7/1992 | Byker | 359/265 |
| 5,140,455 A | 8/1992 | Varaprasad et al. | 359/275 |
| 5,142,407 A | 8/1992 | Varaprasad et al. | 359/276 |
| 5,148,014 A | 9/1992 | Lynam et al. | 250/214 |
| 5,151,816 A | 9/1992 | Varaprasad et al. | 359/275 |
| 5,187,032 A | 2/1993 | Sasaki et al. | 429/192 |
| 5,202,787 A | 4/1993 | Byker et al. | 359/267 |
| 5,207,492 A | 5/1993 | Roberts | 362/30 |
| 5,233,461 A | 8/1993 | Dornan et al. | 359/272 |
| 5,239,405 A | 8/1993 | Varaprasad et al. | 359/272 |
| 5,239,406 A | 8/1993 | Lynam et al. | 359/275 |
| 5,278,693 A | 1/1994 | Theiste et al. | 359/272 |
| 5,280,380 A | 1/1994 | Byker | 359/265 |
| 5,282,077 A | 1/1994 | Byker | 359/272 |
| 5,311,350 A * | 5/1994 | Hiramatsu et al. | 359/263 |
| 5,327,281 A | 7/1994 | Cogan et al. | 359/270 |
| 5,457,218 A | 10/1995 | Cronin et al. | 556/44 |
| 5,471,338 A | 11/1995 | Yu et al. | 359/273 |
| 5,500,760 A | 3/1996 | Varaprasad et al. | 359/272 |
| 5,572,354 A | 11/1996 | Desmond et al. | 359/265 |
| 5,576,687 A | 11/1996 | Blank et al. | 340/438 |
| 5,910,854 A * | 6/1999 | Varaprasad et al. | 359/273 |
| 6,002,511 A * | 12/1999 | Varaprasad et al. | 359/265 |
| 6,154,306 A * | 11/2000 | Varaprasad et al. | 359/273 |

FOREIGN PATENT DOCUMENTS

| | | |
|---|---|---|
| EP | 0240226 | 10/1987 |
| JP | 52 10745 | 1/1977 |
| JP | 57208530 | 12/1982 |
| JP | 59116623 | 7/1984 |
| JP | 63262624 | 4/1987 |
| JP | 1 33535 | 2/1989 |
| JP | 1230608 | 9/1989 |

OTHER PUBLICATIONS

I.F. Chang, "Electrochromic and Electrochemichromic Materials and Phenomena" in *Nonemmissive Electrooptic Displays*, 155–96, A.R. Kmetz and F.K. von Willisen, eds., Plenum Press, New York (1976).

E.M. Engler et al., "Electrochromic Display Device With Memory Based On Homogenous Donor Polymer Film", *IBM Tech. Disc. Bull.*, 22(7), 2993–97 (1979).

Y. Hirai and C. Tani, "Electrochromism for Organic Materials in Polymeric All Solid–State Systems", Appl. Phys. Lett., 43(7), 704–05 (1983).

K. Honda and A. Kuwano, "Solid–State Electrochromic Device Using Polynuclear Metal Complex–Containing Solid Polymer Electrolyte", J. Electrochem. Soc.—Accelerated Brief Comm., 853–54 (1986).

K. Itaya et al., "Polymer–Modified Electrodes II. Spectroelectrochemical Properties of a Ligand (Bathophenanthroline Disulfonic Acid) Bound to Polyelectrolytes on Electrodes and the Use of the Modified Electrodes for an Electrochromic Display Device", *J. Electrochem. Soc.*, 129(4), 762–67 (1982).

F. B. Kaufman, "New Organic Materials for Use as Transducers in Electrochromic Display Devices", *Conf. Rec. of 1978 Biennial Display Res. Conf.*, 23, Soc. for Info. Displays (Oct. 24–26, 1978).

F. B. Kaufman et al., "Polymer–Modified Electrodes: A New Class of Electrochromic Materials", Appl. Phys. Lett., 36(6), 422–25 (1980).

S. Kuwabata et al., "Photoelectrochromic Properties of Methylene Blue in Conducting Polyaniline Matrixes", J. Electrochem. Soc., 139(7), 1824–30 (1992).

C. M. Lambert, "Electrochromic–Materials and Devices for Energy Efficient Windows", Solar Energy–Materials, 11, 1–27 (1984).

N. Leventis and Y. C. Chung, "Polyaniline–Prussian Blue Novel Composite Material for Electrochromic Applications", *J. Electrochem. Soc.*, 137(10), 3321–322 (1990).

N. Leventis and Y. C. Chung, "Poly(3–methylthiophene)–Prussian Blue: A New Composite Electrochromic Material", *J. Mater. Chem.*, 2(3), 289–93 (1992).

N. R. Lynam, "Electrochromic Automotive Day/Night Mirrors", *SAE Technical Paper Series*, 870636, Society for Automotive Engineers (1987).

N. R. Lynam, "Smart Windows for Automobiles", *SAE Technical Paper Series*, 900419, Society for Automotive Engineers (1990).

N. R. Lynam, "Transparent Electronic Conductors", in *Proc. Symp. on Electro–chromic Matls.*, 90–2, 201–31, The Electrochemical Society, Inc., Pennington, New Jersey (1990).

N. R. Lynam and A. Agrawal, "Automotive Applications of Chromogenic Materials", *Large–Area Chromogenics: Materials and Devices for Transmittance Control, SPIE Institute Series*, IS 4, 46–84, C. M. Lampert and C. G. Granquist, eds., SPIE Optical Engineering Press, Washington (1990).

*Modern Plastics Encyclopedia 1988*, 203–300, McGraw–Hill Inc., New York (1988).

T. Niwa et al., "All–Solid Large Area Variable Reflectance EC Mirror with a Compound Film of Iridium Oxide and Tin Oxide", *Proc. of 6th Int'l. Disp. Res. Conf.*, P2.19, 322–75 (1986).

H. Tsutsumi et al., "Polymer Gel Films with Simple Organic Electrochromics for Single–Film Electrochromic Devices", *J. Polym. Sci.*, 1725–29 (1992).

H. Tsutsumi et al., "Single Polymer Gel Film Electrochromic Device", Electrochemica Acta, 37, 369–70 (1992).

M. Watanabe et al., "High Lithium Conductivity of Polymeric Solid Electrolytes", Makromol. Chem., Rapid Comm., 2, 741–44 (1981).

* cited by examiner

ELECTROCHROMIC POLYMERIC SOLID FILMS, MANUFACTURING ELECTROCHROMIC DEVICES USING SUCH SOLD FILMS, AND PROCESSES FOR MAKING SUCH SOLID FILMS AND DEVICES

RELATED UNITED STATES PATENT APPLICATIONS

This application is a continuation of U.S. patent application Ser. No. 09/251,937, filed Feb. 18, 1999, now U.S. Pat. No. 6,245,262, which is a continuation of U.S. patent application Ser. No. 08/824,501, filed Mar. 26, 1997, now U.S. Pat. No. 5,910,854 which is a continuation-in-part of U.S. patent application Ser. No. 08/406,663, filed Mar. 20, 1995 (now abandoned), which is a continuation of U.S. patent application Ser. No. 08/193,557, filed Feb. 8, 1994 (now abandoned), which is a continuation-in-part of U.S. patent application Ser. No. 08/023,675, filed Feb. 26, 1993 (now abandoned).

BACKGROUND OF THE INVENTION

1. Technical Field of the Invention

The present invention relates to reversibly variable electrochromic devices for varying the transmittance to light, such as electrochromic rearview mirrors, windows and sun roofs for motor vehicles, reversibly variable 2. Brief Description of the Related Technology Reversibly variable electrochromic devices are known in the art. In such devices, the intensity of light (e.g., visible, infrared, ultraviolet or other distinct or overlapping electromagnetic radiation) is modulated by passing the light through an electrochromic medium. The electrochromic medium is disposed between two conductive electrodes, at least one of which is typically transparent, which causes the medium to undergo reversible electrochemical reactions when potential differences are applied across the two electrodes. Some examples of these prior art devices are described in U.S. Pat. No. 3,280,701 (Donnelly); U.S. Pat. No. 3,451,741 (Manos); U.S. Pat. No. 3,806,229 (Schoot); U.S. Pat. No. 4,712,879 (Lynam) ("Lynam I"); U.S. Pat. No. 4,902,108 (Byker) ("Byker I"); and I. F. Chang, "Electrochromic and Electrochemichromic Materials and Phenomena", in *Nonemissive Electrooptic Displays*, 155–96, A. R. Kmetz and F. K. von Willisen, eds., Plenum Press, New York (1976).

Reversibly variable electrochromic media include those wherein the electrochemical reaction takes place in a solid film or occurs entirely in a liquid solution. See e.g., Chang.

Numerous devices using an electrochromic medium, wherein the electrochemical reaction takes place entirely in a solution, are known in the art. Some examples are described in U.S. Pat. No. 3,453,038 (Kissa); U.S. Pat. No. 5,128,799 (Byker) ("Byker II"); Donnelly; Manos; Schoot; Byker I; and commonly assigned U.S. Pat. No. 5,073,012 (Lynam) ("Lynam II"); U.S. Pat. No. 5,115,346 (Lynam) ("Lynam III"); U.S. Pat. No. 5,140,455 (Varaprasad) ("Varaprasad I"); U.S. Pat. No. 5,142,407 (Varaprasad) ("Varaprasad II"); U.S. Pat. No. 5,151,816 (Varaprasad) ("Varaprasad III") and U.S. Pat. No. 5,239,405 (Varaprasad) ("Varaprasad IV"); and commonly assigned U.S. patent application Ser. No. 07/935,784 (filed Aug. 27, 1992) and now U.S. Pat. No. 5,500,760]. Typically, these electrochromic devices, sometimes referred to as electrochemichromic devices, are single-compartment, self-erasing, solution-phase electrochromic devices. See e.g., Manos, Byker I and Byker II.

In single-compartment, self-erasing, solution-phase electrochromic devices, the intensity of the electromagnetic radiation is modulated by passing through a solution held in a compartment. The solution often includes a solvent, at least one anodic compound and at least one cathodic compound. During operation of such devices, the solution is fluid, although it may be gelled or made highly viscous with a thickening agent, and the solution components, including the anodic compounds and cathodic compounds, do not precipitate. See e.g., Byker I and Byker II.

Certain of these electrochemichromic devices have presented drawbacks. First, a susceptibility exists for distinct bands of color to form adjacent the bus bars after having retained a colored state over a prolonged period of time. This undesirable event is known as segregation. Second, processing and manufacturing limitations are presented with electrochemichromic devices containing electrochemichromic solutions. For instance, in the case of electrochemichromic devices which contain an electrochemichromic solution within a compartment or cavity thereof, the size and shape of the electrochemichromic device is limited by the bulges and non-uniformities which often form in such large area electrochemichromic devices because of the hydrostatic nature of the liquid solution. Third, from a safety standpoint, in the event an electrochemichromic device should break or become damaged through fracture or rupture, it is important for the device to maintain its integrity so that, if the substrates of the device are shattered, an electrochemichromic solution does not escape therefrom and that shards of glass and the like are retained and do not scatter about. In the known electrochromic devices, measures to reduce breakage or broken glass scattering include the use of tempered glass and/or a laminate assembly comprising at least two panels affixed to one another by an adhesive. Such measures control the scattering of glass shards in the event of breakage or damage due, for instance, to the impact caused by an accident.

Numerous devices using an electrochromic medium, wherein the electrochemical reaction takes place in a solid layer, are known in the art. Typically, these devices employ electrochromic solid-state thin film technology [see e.g., N. R. Lynam, "Electrochromic Automotive Day/Night Mirrors", *SAE Technical Paper Series*, 870636 (1987); N. R. Lynam, "Smart Windows for Automobiles", *SAE Technical Paper Series*, 900419 (1990); N. R. Lynam and A. Agrawal, "Automotive Applications of Chromogenic Materials", *Large Area Chromogenics: Materials & Devices for Transmittance Control*, C. M. Lampert and C. G. Granquist, eds., Optical Eng'g Press, Washington (1990); C. M. Lampert, "Electrochromic Devices and Devices for Energy Efficient Windows", *Solar Energy Materials*, 11, 1–27 (1984); U.S. Pat. No. 3,521,941 (Deb); U.S. Pat. No. 4,174,152 (Giglia); U.S. Pat. No. Re. 30,835 (Giglia); U.S. Pat. No. 4,338,000 (Kamimori); U.S. Pat. No. 4,652,090 (Uchikawa); U.S. Pat. No. 4,671,619 (Kamimori); Lynam I; and commonly assigned U.S. Pat. No. 5,066,112 (Lynam) ("Lynam IV") and U.S. Pat. No. 5,076,674 (Lynam) ("Lynam V")].

In solid-state thin film electrochromic devices, an anodic electrochromic layer and a cathodic electrochromic layer, each layer usually made from inorganic metal oxides, are typically separate and distinct from one another and assembled in a spaced-apart relationship. The solid-state thin films are often formed using techniques such as chemical vapor deposition or physical vapor deposition. Such techniques are not attractive economically, however, as they involve cost. In another type of solid-state thin film electrochromic device, two substrates are coated separately with compositions of photo- or thermo-setting monomers or oligomers to form on one of the substrates an electrochromic layer, with the electrochromic material present within the layer being predominantly an inorganic material, and on the other substrate a redox layer. [See Japanese Patent Document JP 63-262,624].

Attempts have been made to prepare electrochromic media from polymers. For example, it has been reported that electrochromic polymer layers may be prepared by dissolving in a solvent organic polymers, which contain no functionality capable of further polymerization, together with an electrochromic compound, and thereafter casting or coating the resulting solution onto an electrode. It has been reported further that electrochromic polymer layers are created upon evaporation of the solvent by pressure reduction and/or temperature elevation. [See e.g., U.S. Pat. No. 3,652,149 (Rogers), U.S. Pat. No. 3,774,988 (Rogers) and U.S. Pat. No. 3,873,185 (Rogers); U.S. Pat. No. 4,550,982 (Hirai); Japanese Patent Document JP 52-10,745; and Y. Hirai and C. Tani, "Electrochromism for Organic Materials in Polymeric All-Solid State Systems", *Appl. Phys. Lett.,* 43(7), 704–05 (1983)]. Use of such polymer solution casting systems has disadvantages, however, including the need to evaporate the solvent prior to assembling devices to form polymer electrochromic layers. This additional processing step adds to the cost of manufacture through increased capital expenditures and energy requirements, involves potential exposure to hazardous chemical vapors and constrains the type of device to be manufactured.

A thermally cured polymer gel film containing a single organic electrochromic compound has also been reported for use in display devices. [See H. Tsutsumi et al., "Polymer Gel Films with Simple Organic Electrochromics for Single-Film Electrochromic Devices", *J. Polym. Sci.,* 30, 1725–29 (1992) and H. Tsutsumi et al., "Single Polymer Gel Film Electrochromic Device", *Electrochemica Acta,* 37, 369–70 (1992)]. The gel film reported therein was said to possess a solvent-like environment around the electrochromic compounds of that film. This gel film was reported to turn brown, and ceased to perform color-bleach cycles, after only 35,200 color-bleach cycles.

SUMMARY OF THE INVENTION

The present invention provides electrochromic polymeric solid films ("polychromic solid films") that are prepared by an in situ curing process different from processes used to prepare the electrochromic polymer layers known to date, and employ different combinations of electrochromic compounds than those that have been placed heretofore in solid electrochromic media. The resulting polychromic solid films possess beneficial properties and characteristics, and offer superior results, compared to the known electrochromic media. For instance, polychromic solid films overcome well-known manufacturing and use concerns such as hydrostatic pressure that is particularly troublesome in large area vertically mounted panels, such as windows, or large area mirrors, such as Class 8 truck mirrors. Thus, polychromic solid films are extremely well-suited to commercial applications, like the manufacture and use of electrochromic devices. Such electrochromic devices include, but are not limited to, electrochromic mirrors—e.g., vehicular, for instance, truck mirrors, particularly large area truck mirrors, automotive interior and exterior mirrors, architectural or specialty mirrors, like those useful in periscopic or dental and medical applications; electrochromic glazings—e.g., architectural, such as those useful in the home, office or other edifice, aeronautical, such as those useful in aircraft, or vehicular glazings, for instance, windows, such as windshields, side windows and backlights, sun roofs, sun visors or shade bands and optically attenuating contrast filters, such as contrast enhancement filters, suitable for use in connection with cathode ray tube monitors and the like; electrochromic privacy or security partitions; electrochromic solar panels, such as sky lights; electrochromic information displays; electrochromic lenses and eye glass. Moreover, in view of the teaching herein, any of such electrochromic devices may be manufactured to be segmented so that a portion of the device colors preferentially to change the light transmittance thereof.

The present invention also provides novel electrochromic monomer compositions comprising anodic electrochromic compounds, cathodic electrochromic compounds, a monomer component and a plasticizer that are useful in the formation of such polychromic solid films. More specifically, each of the electrochromic compounds are organic or organometallic compounds. Electrochromic monomer compositions may also include, but are not limited to, either individually or in combination, cross-linking agents, photoinitiators, photosensitizers, ultraviolet stabilizing agents, electrolytic materials, coloring agents, spacers, anti-oxidizing agents, flame retarding agents, heat stabilizing agents, compatibilizing agents, adhesion promoting agents, coupling agents, humectants and lubricating agents.

The present invention further provides novel processes for making polychromic solid films by transforming such novel electrochromic monomer compositions into polychromic solid films through exposure to electromagnetic radiation for a time sufficient to effect an in situ cure.

The present invention still further provides electrochromic devices, such as those referred to above, particularly rearview mirrors, windows and sun roofs for automobiles, which devices are stable to outdoor weathering, particularly weathering observed due to prolonged exposure to ultraviolet radiation from the sun, and are safety protected against impact from an accident. Such outdoor weathering and safety benefits are achieved by manufacturing these devices using as a medium of varying transmittance to light the polychromic solid films prepared by the in situ cure of an electrochromic monomer composition containing a monomer component that is capable of further polymerization.

The present invention provides for the first time, among other things (1) polychromic solid films that may be transformed from electrochromic monomer compositions by an in situ curing process through exposure to electromagnetic radiation, such as ultraviolet radiation; (2) a transformation during the in situ curing process from the low viscosity, typically liquid, electrochromic monomer compositions to polychromic solid films that occurs with minimum shrinkage and with good adhesion to the contacting surfaces; (3) polychromic solid films that (a) may be manufactured to be self-supporting and subsequently laminated between conductive substrates, (b) perform well under prolonged coloration, (c) demonstrate a resistance to degradation caused by environmental conditions, such as outdoor weathering and all-climate exposure, particularly demonstrating ultraviolet stability when exposed to the sun, and (d) demonstrate a broad spectrum of color under an applied potential; (4) polychromic solid films that may be manufactured economically and are amenable to commercial processing; (5) polychromic solid films that provide inherent safety protection not known to electrochromic media heretofore; and (6) electrochromic monomer compositions that comprise anodic electrochromic compounds and cathodic electrochromic compounds, which compounds are organic or organometallic.

The self-supporting nature of polychromic solid films provides many benefits to the electrochromic devices manufactured therewith, including the elimination of a compartmentalization means, such as a sealing means, since no such means is required to confine or contain a polychromic solid film within an electrochromic device. That polychromic solid films may be manufactured to be self-supporting also enhances processibility, and vitiates obstacles well-recognized in the manufacturing of electrochromic devices containing known electrochromic media, especially those that are to be vertically mounted in their intended use.

Moreover, since the electrochromic compounds are not free to migrate within polychromic solid films, in contrast to electrochromic compounds present within a liquid solution-phase environment, polychromic solid films do not pose the segregation concern as do solution-phase electrochemichromic devices; rather, polychromic solid films perform well under prolonged coloration.

Further, from a safety perspective, in the event that electrochromic devices manufactured with polychromic solid films should break or become damaged due to the impact from an accident, no liquid is present to seep therefrom since the polychromic solid films of the present invention are indeed solid. Also, the need to manufacture electrochromic devices with tempered glass, or with at least one of the substrates being of a laminate assembly, to reduce potential lacerative injuries is obviated since polychromic solid films, positioned between, and in abutting relationship with, the conductive surface of the two substrates, exhibit good adhesion to the contacting surfaces. Thus, polychromic solid films should retain any glass shards that may be created and prevent them from scattering. Therefore, a safety protection feature inherent to polychromic solid films is also provided herein, making polychromic solid films particularly attractive for use in connection with electrochromic devices, such as mirrors, windows, sun roofs, shade bands, eye glass and the like.

Polychromic solid films embody a novel and useful technology within the electrochromic art, whose utility will become more readily apparent and more greatly appreciated by those of skill in the art through a study of the detailed description taken in conjunction with the figures which follow hereinafter.

Figure 1:
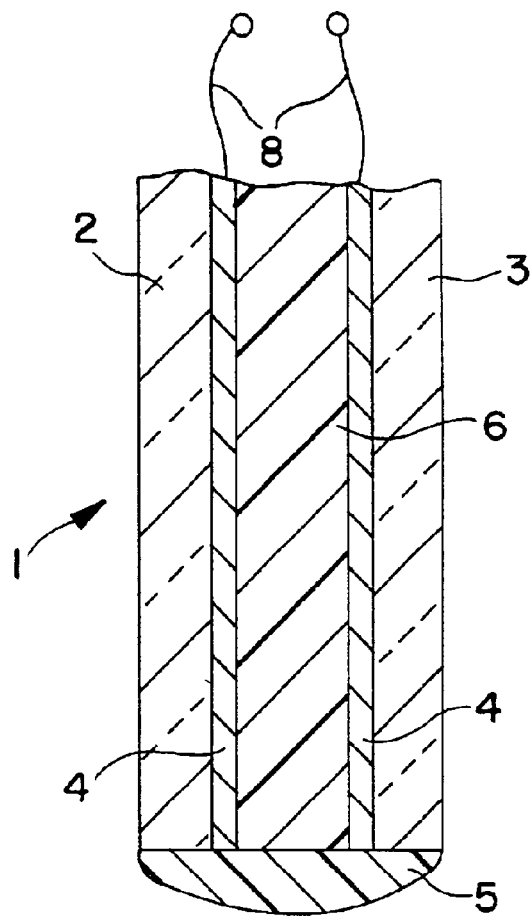
FIG. 1 depicts a sectional view of an electrochromic device employing an electrochromic polymeric solid film according to the present invention.

The depictions in these figures are for illustrative purposes and thus are not drawn to scale.

DETAILED DESCRIPTION OF THE INVENTION

In accordance with the teaching of the present invention, polychromic solid films may be prepared by exposing an electrochromic monomer composition to electromagnetic radiation for a time sufficient to transform the electrochromic monomer composition into a polychromic solid film. This in situ curing process initiates polymerization of, and typically completely polymerizes, an electrochromic monomer composition, normally in a liquid state, by exposure to electromagnetic radiation to form a polychromic solid film, whose surface and cross-sections are substantially tack-free.

The electrochromic monomer compositions are comprised of anodic electrochromic compounds, cathodic electrochromic compounds, each of which are organic or organometallic compounds, a monomer component and a plasticizer. In addition, cross-linking agents, photoinitiators, photosensitizers, ultraviolet stabilizing agents, electrolytic materials, coloring agents, spacers, anti-oxidizing agents, flame retarding agents, heat stabilizing agents, compatibilizing agents, adhesion promoting agents, coupling agents, humectants and lubricating agents and combinations thereof may also be added. In the preferred electrochromic monomer compositions, the chosen monomer component may be a polyfunctional monomer, such as a difunctional monomer, trifunctional monomer, or a higher functional monomer, or a combination of monofunctional monomer and difunctional monomer or monofunctional monomer and cross-linking agent. Those of ordinary skill in the art may choose a particular monomer component or combination of monomer components from those recited in view of the intended application so as to impart the desired beneficial properties and characteristics to the polychromic solid film.

An anodic electrochromic compound suitable for use in the present invention may be selected from the class of chemical compounds represented by the following formulae:

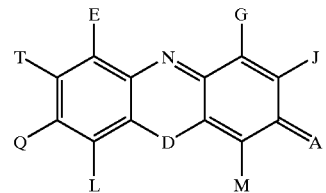

I wherein A is O, S or $NRR_1$;

wherein R and $R_1$ may be the same or different, and each may be selected from the group consisting of H or any straight- or branched-chain alkyl constituent having from about one carbon atom to about eight carbon atoms, such as $CH_3$, $CH_2CH_3$, $CH_2CH_2CH_3$, $CH(CH_3)_2$, $C(CH_3)_3$ and the like; provided that when A is $NRR_1$, Q is H, OH or $NRR_1$; further provided that when A is $NRR_1$, a salt may be associated therewith; still further provided that when both A and Q are $NRR_1$, A and Q need not, but may, be the same functional group;

D is O, S, $NR_1$ or Se;

E is $R_1$, COOH or $CONH_2$; or, E and T, when taken together, represent an aromatic ring structure having six ring carbon atoms when viewed in conjunction with the ring carbon atoms to which they are attached;

G is H;

J is H, any straight- or branched-chain alkyl constituent having from about one carbon atom to about eight carbon atoms, such as $CH_3$, $CH_2CH_3$, $CH_2CH_2CH_3$, $CH(CH_3)_2$, $C(CH_3)_3$ and the like, $NRR_1$,

$OR_1$, phenyl, 2,4-dihydroxyphenyl or any halogen; or, G and J, when taken together, represent an aromatic ring structure having six ring carbon atoms when viewed in conjunction with the ring carbon atoms to which they are attached;

L is H or OH;

M is H or any halogen;

T is $R_1$, phenyl or 2,4-dihydroxyphenyl; and

Q is H, OH or $NRR_1$;

provided that when L and/or Q are OH, L and/or Q may also be salts thereof; further provided that in order to render it electrochemically active in the present context, anodic electrochromic compound I has been previously contacted with a redox agent;

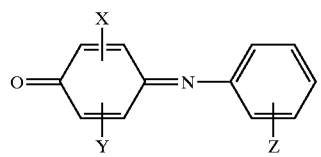

II wherein X and Y may be the same or different, and each may be selected from the group consisting of H, any halogen or $NRR_1$, wherein R and $R_1$ may be the same or different, and are as defined supra; or, X and Y, when taken together, represent an aromatic ring structure having six ring carbon atoms when viewed in conjunction with the ring carbon atoms to which they are attached; and Z is OH or $NRR_1$, or salts thereof; provided that in order to render it electrochemically active in the present context, anodic electrochromic compound II has been previously contacted with a redox agent;

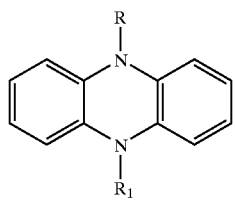

III derivatives of 5,10-dihydrophenazine wherein R and $R_1$ may be the same or different, and are defined supra;

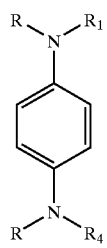

IV derivatives of 1,4-phenylenediamine wherein R and $R_1$ may be the same or different, and are defined supra;

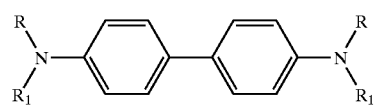

V derivatives of benzidine wherein R and $R_1$ may be the same or different, and are defined supra;

Metallocenes suitable for use as a component of the electrochromic monomer composition include, but are not limited to the following:

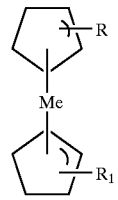

VI metallocenes and their derivatives wherein R and $R_1$ may be the same or different, and each may be selected from the group consisting of H; any straight- or branched-chain alkyl constituent having from about 1 carbon atom to about 8 carbon atoms, such as $CH_3$, $CH_2CH_3$, $CH_2CH_2CH_3$, $CH(CH_3)_2$, $C(CH_3)_3$ and the like; acetyl; vinyl; allyl; $—(CH_2)_n—OH$, wherein n may be an integer in the range of 0 to about 20;

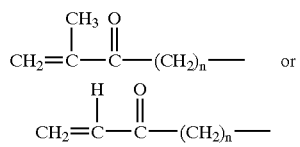

wherein n may be an integer in the range of 0 to about 20; $—(CH_2)_n—COOR_2$, wherein n may be an integer in the range of 0 to about 20 and $R_2$ may be any straight- or branched-chain alkyl constituent having from about 1 carbon atom to about 20 carbon atoms, hydrogen, lithium, sodium,

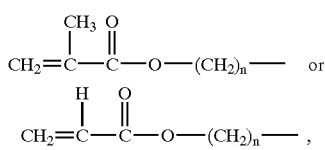

wherein n may be an integer from 0 to about 20, $—(CH_2)_{n'}—OR_3$, wherein n' may be an integer in the range of 1 to about 12 and $R_3$ may be any straight- or branched-chain alkyl constituent having from about 1 carbon atom to about 8 carbon atoms,

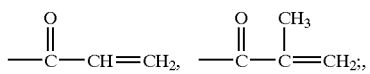

and $—(CH_2)_{n'}—N^+(CH_3)_3X^-$, wherein n' may be an integer in the range of 1 to about 12; X may be $Cl^-$, $Br^-$, I⁻, PF₆⁻, ClO₄⁻ or BF₄⁻; and wherein $M_e$ is Fe, Ni, Ru, Co, Ti, Cr, W, Mo and the like;

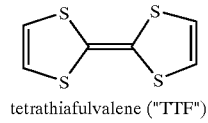

tetrathiafulvalene ("TTF")

VII and combinations thereof.

Phenothiazines suitable for use as a component of the electrochromic monomer composition include, but are not limited to, those represented by the following structures:

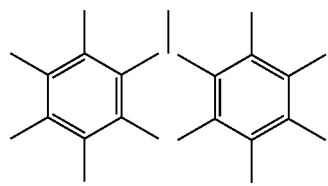

phenothiazines

1-A where $R_9$ may be selected from the group consisting of H; any straight- or branched-chain alkyl constituent having from about 1 carbon atom to about 10 carbon atoms; phenyl; benzyl; —(CH₂)₂—CN; —(CH₂)₂—COOH;

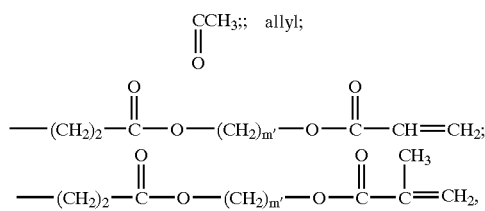

wherein m' may be an integer in the range of 1 to about 8;

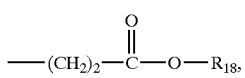

wherein $R_{18}$ may be any straight- or branched-chain alkyl constituent having from about 1 carbon atom to about 8 carbon atoms; and $R_{10}R_{11}$, $R_{12}$, $R_{13}$, $R_{14}$, $R_{15}$, $R_{16}$, and $R_{17}$ may be selected from H, Cl, Br, CF₃, CH₃, NO₂, COOH, OH, SCH₃, OCH₃, O₂CCH₃

and $R_9$ and $R_{17}$, when taken together, form a ring with six atoms (five of which being carbon) having a carbonyl substituent on one of the carbon atoms.

Preferred among phenothiazines 1-A is phenothiazines 2-A to 4-A as depicted in the following structure:

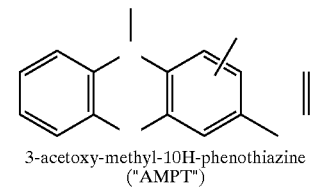

3-acetoxy-methyl-10H-phenothiazine ("AMPT")

2-A

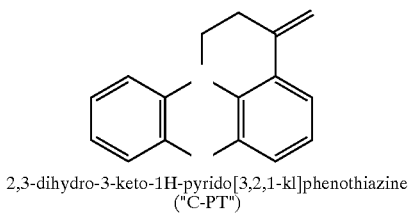

2,3-dihydro-3-keto-1H-pyrido[3,2,1-kl]phenothiazine ("C-PT")

3-A

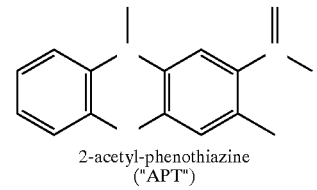

2-acetyl-phenothiazine ("APT")

4-A

An example of a desirable quinone for use as component in the electrochromic monomer composition include, but is not limited to the following structure:

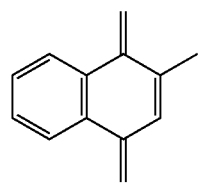

2-hydroxy-naphthoquinone

5-A

Combinations of components in the electrochromic monomer composition may be selectively chosen to achieve a desired substantially non-spectral selectivity when the electrochromic element (and the mirror in which the electrochromic element is to function) is dimmed to a colored state.

To render anodic electrochromic compounds I and II electrochemically active in the context of the present invention, a redox pre-contacting procedure must be used. Such a redox pre-contacting procedure is described in the context of preparing anodic compounds for electrochemichromic solutions in Varaprasad IV and commonly assigned U.S. patent application Ser. No. 07/935,784 (filed Aug. 27, 1992) and now U.S. Pat. No. 5,500,760.

Preferably, anodic electrochromic compound I may be selected from the group consisting of the class of chemical compounds represented by the following formulae:

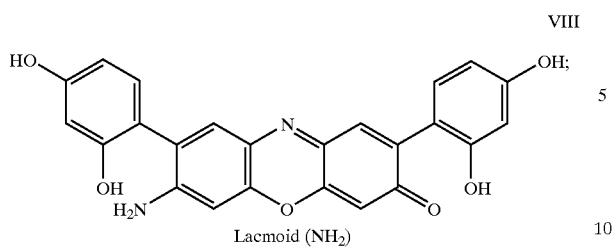

Lacmoid (NH₂)  VIII

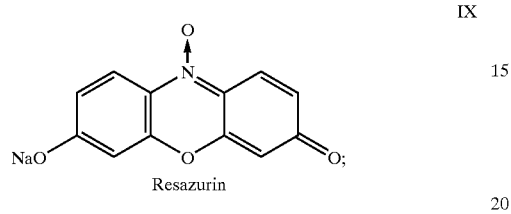

Resazurin  IX

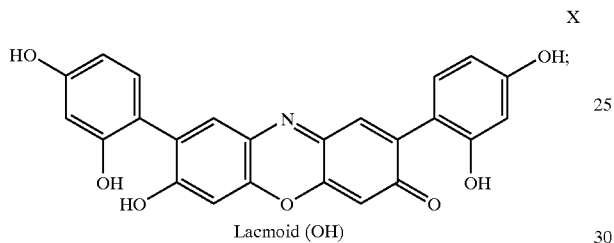

Lacmoid (OH)  X

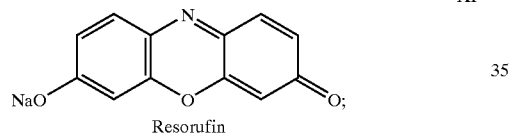

Resorufin  XI

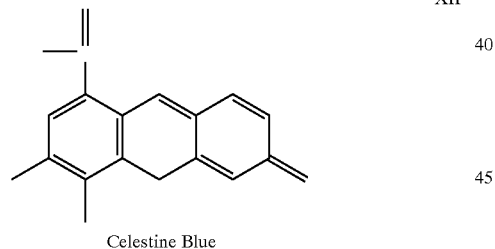

Celestine Blue  XII

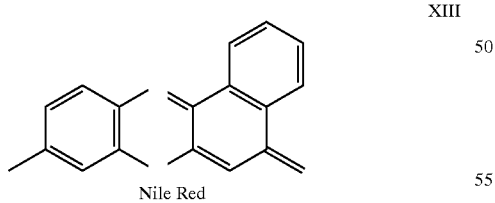

Nile Red  XIII

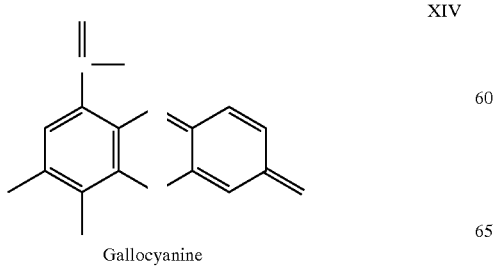

Gallocyanine  XIV

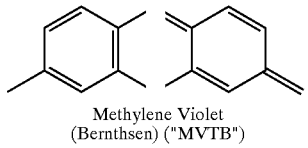

Methylene Violet (Bernthsen) ("MVTB")  XV

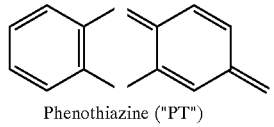

Phenothiazine ("PT")  XVI

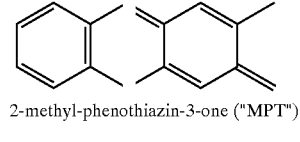

2-methyl-phenothiazin-3-one ("MPT")  XVII

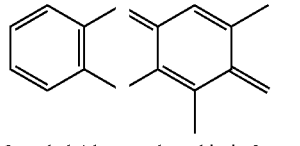

2-methyl-4-bromo-phenothiazin-3-one ("BMPT")  XVIII

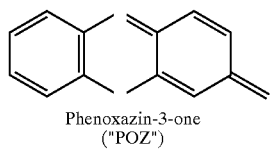

Phenoxazin-3-one ("POZ")  XIX

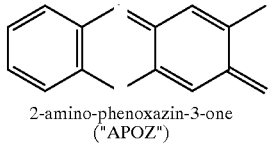

2-amino-phenoxazin-3-one ("APOZ")  XX

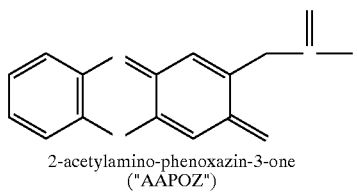

2-acetylamino-phenoxazin-3-one ("AAPOZ")  XXI

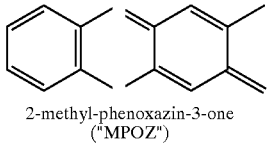

2-methyl-phenoxazin-3-one ("MPOZ")  XXII

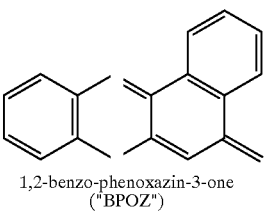

1,2-benzo-phenoxazin-3-one ("BPOZ")  XXIII

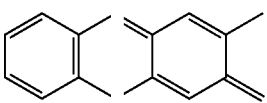

2-hydroxy-phenoxazin-3-one
("HPOZ")

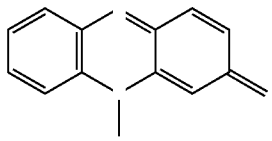

2-keto-N-ethyl-phenazine
("KEPA")

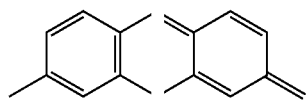

Azure A ("AA")

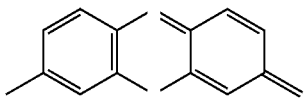

Azure B ("AB")

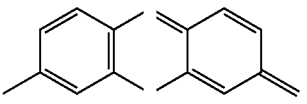

Azure C ("AC")

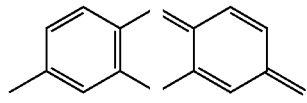

Methylene Blue ("MB")

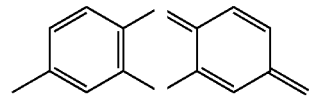

Thionin ("TH")

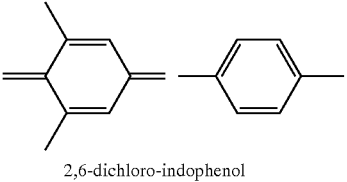

2,6-dichloro-indophenol
("DCI")

and combinations thereof.

Among the especially preferred anodic electrochromic compounds I are MVTB (XV), PT (XVI), MPT (XVII), and POZ (XIX), with MVTB and MPT being most preferred. Also preferred is the reduced form of MPT which results from the redox pre-contacting procedure referred to above, and has been thereafter isolated. This reduced and isolated form of MPT—RMPT [XVII(a)]—is believed to be 2-methyl-3-hydroxyphenathiazine, which is represented by the following chemical formula

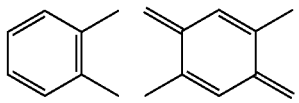

("RMPT")

and salts thereof.

In addition, a preferred anodic electrochromic compound II is

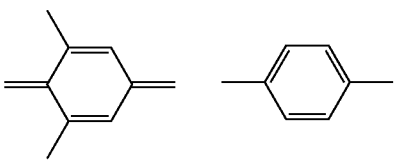

2,6-dichloro-indophenol("DCI")

and salts thereof.

Likewise, preferred among anodic electrochromic compound III are 5,10-dihydro-5,10-dimethylphenazine ("DMPA") and 5,10-dihydro-5,10-diethylphenazine ("DEPA"), with DMPA being particularly preferred.

As a preferred anodic electrochromic compound VI, metallocenes, such as ferrocene, wherein $M_e$ is iron and R and $R_1$ are each hydrogen, and alkyl derivatives thereof, may also be used advantageously in the context of the present invention.

The salts referred to in connection with the anodic electrochromic compounds include, but are not limited to, alkali metal salts, such as lithium, sodium, potassium and the like. In addition, when A is $NRR_1$, tetrafluoroborate ("$BF_4^-$"), perchlorate ("$ClO_4^-$"), trifluoromethane sulfonate ("$CF_3SO_3^-$"), hexafluorophosphate ("$PF_6^-$"), acetate ("$Ac^-$") and any halogen may be associated therewith. Moreover, the ring nitrogen atom in anodic electrochromic compound I may also appear as an N-oxide.

Any one or more of anodic electrochromic compounds I, II, III, IV, V, VI or VII may also be advantageously combined, in any proportion, within an electrochromic monomer composition and thereafter transformed into a polychromic solid film to achieve the results so stated herein. Of course, as regards anodic electrochromic compounds I and II, it is necessary to contact those compounds with a redox agent prior to use so as to render them electrochemically active in the present invention. Upon the application of a potential thereto, such combinations of anodic electrochromic compounds within a polychromic solid film may often generate color distinct from the color observed from polychromic solid films containing individual anodic electrochromic compounds. A preferred combination of anodic electrochromic compounds in this invention is the combination of anodic electrochromic compounds III and VI. Nonetheless, those of ordinary skill in the art may make appropriate choices among individual anodic electrochromic compounds and combinations thereof, to prepare a polychromic solid film capable of generating a color suitable for a particular application.

A choice of a cathodic electrochromic compound for use herein should also be made. The cathodic electrochromic compound may be selected from the class of chemical compounds represented by the following formulae:

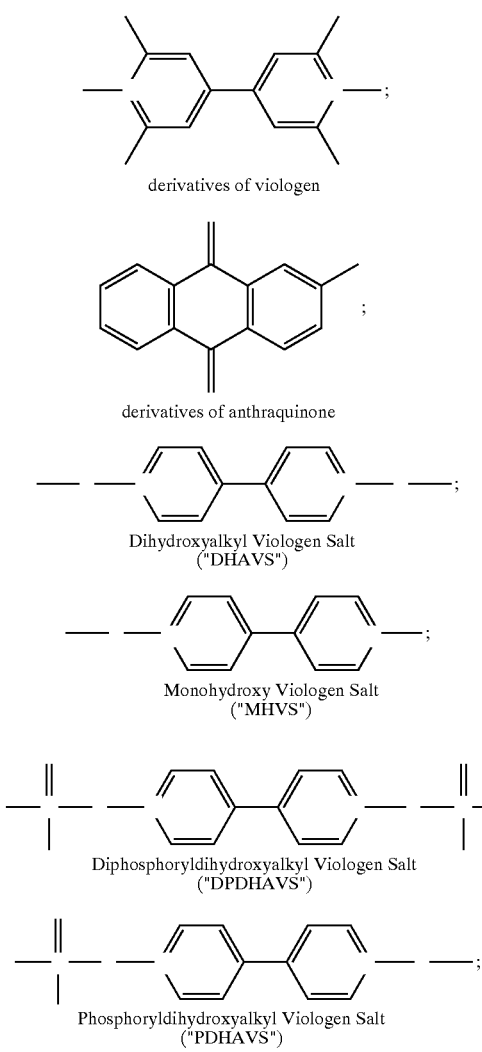

derivatives of viologen XXXII derivatives of anthraquinone XXXIII

Dihydroxyalkyl Viologen Salt ("DHAVS") 6-A

Monohydroxy Viologen Salt ("MHVS") 7-A

Diphosphoryldihydroxyalkyl Viologen Salt ("DPDHAVS") 8-A

Phosphoryldihydroxyalkyl Viologen Salt ("PDHAVS") 9-A wherein $R_3$, $R_4$, $R_{21}$, $R_{22}$, $R_{23}$ and $R_{24}$ may be the same or different and each may be selected from the group consisting of H, any straight- or branched-chain alkyl constituent having from about one carbon atom to about eight carbon atoms, or any straight- or branched-chain alkyl- or alkoxy-phenyl, wherein the alkyl or alkoxy constituent contains from about one carbon atom to about eight carbon atoms;

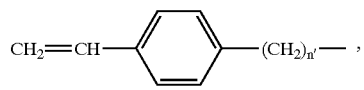

wherein n' may be an integer in the range of 1 to 12;

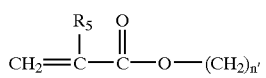

wherein $R_5$ may be H or $CH_3$, and n' may be an integer in the range of 1 to 12; HO—$(CH_2)_{n'}$—, wherein n, may be an integer in the range of 1 to 12; and HOOC—$(CH_2)_{n'}$—, wherein n' may be an integer in the range of 1 to 12;

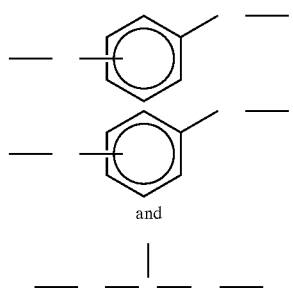

and wherein q may be an integer in the range of 0 to 12; wherein each p is independently an integer from 1 to 12; and wherein X is selected from the group consisting of $BF_4^-$, $ClO_4^-$, $CF_3SO_3^-$, styrylsulfonate ("SS$^-$"), 2-acrylamido-2--methylpropane-sulfonate, acrylate, methacrylate, 3-sulfopropylacrylate, 3-sulfopropylmethacrylate, $PF_6^-$, $Ac^-$, HO—$(R_{25})$—$SO_3^-$ and HOOC—$(R_{25})$—$SO_3^-$ wherein $R_{25}$ can be any straight- or branched-chain alkyl constituent having from about 1 carbon atom to about 8 carbon atoms, an aryl or a functionalized aryl, an alkyl or aryl amide, a branched or linear chain polymer, such as polyvinyls, polyethers and polyesters bearing at least one and preferably multiple, hydroxyl and sulphonate functionalities and any halide; and combinations thereof.

In one preferred embodiment $R_{25}$ can be:

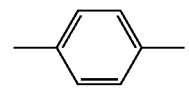

4-hydroxyphenylsulfonate (or its isomers)

or the copolymer derived from acrylamidomethylpropanesulfonic acid (AMPS) and caprolactone acrylate.

Specific cathodic electrochromic compounds useful in the context of the present invention include:

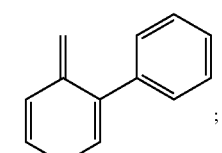

Phenyl-1,4-benzoquinone XXXIV

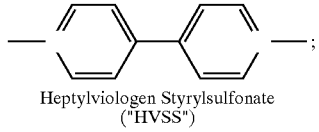

Heptylviologen Styrylsulfonate ("HVSS") XXXV

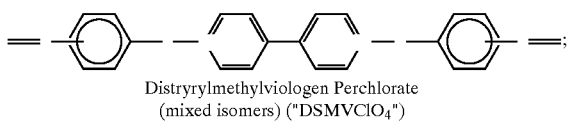

Distryrylmethylviologen Perchlorate (mixed isomers) ("DSMVClO$_4$") XXXVI

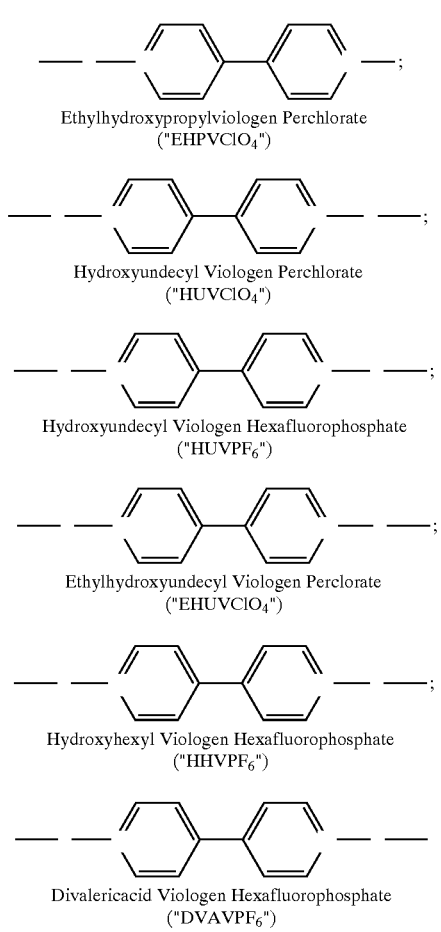

Ethylhydroxypropylviologen Perchlorate ("EHPVClO$_4$") XXXVII

Hydroxyundecyl Viologen Perchlorate ("HUVClO$_4$") XXXVIII

Hydroxyundecyl Viologen Hexafluorophosphate ("HUVPF$_6$") XXXIX

Ethylhydroxyundecyl Viologen Perclorate ("EHUVClO$_4$") XXXX

Hydroxyhexyl Viologen Hexafluorophosphate ("HHVPF$_6$") XXXXI

Divalericacid Viologen Hexafluorophosphate ("DVAVPF$_6$") XXXXII

Preferably, R$_3$ and R$_4$ are ethyl, n-heptyl, hydroxyhexyl or hydroxyundecyl. Thus, when X is PF$_6^-$, ClO$_4^-$ or BF$_4^-$, preferred cathodic electrochromic compounds are ethylviologen perchlorate ("EVClO$_4$"), heptylviologen tetrafluoroborate ("HVBF$_4$"), hydroxyundecyl viologen hexafluorophosphate ("HUVPF$_6$"), ethylhydroxyundecyl viologen perdorate ("EHUVClO$_4$"), hydroxyhexyl viologen hexafluorophosphate ("HHVPF$_6$"), and divalericacid viologen hexafluorophosphate ("DVAVPF$_6$").

The above anodic electrochromic compounds and cathodic electrochromic compounds may be chosen so as to achieve a desired color when the polychromic solid film in which they are present (and the device in which the polychromic solid film is contained) is colored to a dimmed state. For example, electrochromic automotive mirrors manufactured with polychromic solid films should preferably bear a blue or substantially neutral color when colored to a dimmed state. And, electrochromic optically attenuating contrast filters, such as contrast enhancement filters, manufactured with polychromic solid films should preferably bear a substantially neutral color when colored to a dimmed state.

The plasticizer chosen for use in the present invention should maintain the homogeneity of the electrochromic monomer compositions while being prepared, used and stored, and prior to, during and after exposure to electromagnetic radiation. As a result of its combination within the electrochromic monomer composition or its exposure to electromagnetic radiation, the plasticizer of choice should not form by-products that are capable of hindering, or interfering with, the homogeneity and the electrochemical efficacy of the resulting polychromic solid film. The occurrence of any of these undesirable events during the in situ curing process, whether at the pre-cure, cure or post-cure phase of the process for preparing polychromic solid films, may interfere with the process itself, and may affect the appearance and effectiveness of the resulting polychromic solid films, and the electrochromic devices manufactured with the same. The plasticizer also may play a role in defining the physical properties and characteristics of the polychromic solid films of the present invention, such as toughness, flex modulus, coefficient of thermal expansion, elasticity, elongation and the like.

Suitable plasticizers for use in the present invention include, but are not limited to, triglyme, tetraglyme, acetonitrile, benzylacetone, 3-hydroxypropionitrile, methoxypropionitrile, 3-ethoxypropionitrile, butylene carbonate, propylene carbonate, ethylene carbonate, glycerine carbonate, 2-acetylbutyrolactone, cyanoethyl sucrose, γ-butyrolactone, 2-methylglutaronitrile, N,N'-dimethylformamide, 3-methylsulfolane, methylethyl ketone, cyclopentanone, cyclohexanone, 4-hydroxy-4-methyl-2-pentanone, acetophenone, glutaronitrile, 3,3'-oxydipropionitrile, 2-methoxyethyl ether, triethylene glycol dimethyl ether and combinations thereof. Particularly preferred plasticizers among that group are benzylacetone, 3-hydroxypropionitrile, propylene carbonate, ethylene carbonate, 2-acetylbutyrolactone, cyanoethyl sucrose, triethylene glycol dimethyl ether, 3-methylsulfolane and combinations thereof.

To prepare a polychromic solid film, a monomer should be chosen as a monomer component that is capable of in situ curing through exposure to electromagnetic radiation, and that is compatible with the other components of the electrochromic monomer composition at the various stages of the in situ curing process. The combination of a plasticizer with a monomer component (with or without the addition of a difunctional monomer or a cross-linking agent) should preferably be in an equivalent ratio of between about 75:25 to about 10:90 to prepare polychromic solid films with superior properties and characteristics. Of course, the art-skilled should bear in mind that the intended application of a polychromic solid film will often dictate its particular properties and characteristics, and that the choice and equivalent ratio of the components within the electrochromic monomer composition may need to be varied to attain a polychromic solid film with the desired properties and characteristics.

Among the monomer components that may be advantageously employed in the present invention are monomers having at least one reactive functionality rendering the compound capable of polymerization or further polymerization by an addition mechanism, such as vinyl polymerization or ring opening polymerization. Included among such monomers are oligomers and polymers that are capable of further polymerization. For monomers suitable for use herein, see generally those commercially available from Monomer-Polymer Labs., Inc., Philadelphia, Pa.; Sartomer Co., Exton, Pa.; and Polysciences, Inc., Warrington, Pa.

Monomers capable of vinyl polymerization, suitable for use herein, have as a commonality the ethylene functionality, as represented below:

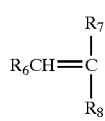

wherein $R_6$, $R_7$ and $R_8$ may be the same or different, and are each selected from a member of the group consisting of hydrogen; halogen; alkyl, cycloalkyl, polycycloalkyl, heterocycloalkyl and alkyl and alkenyl derivatives thereof; alkenyl, cycloalkenyl, cycloalkadienyl, polycycloalkadienyl and alkyl and alkenyl derivatives thereof; hydroxyalkyl; hydroxyalkenyl; alkoxyalkyl; alkoxyalkenyl; cyano; amido; phenyl; benzyl and carboxylate, and derivatives thereof.

Preferred among these vinyl monomers are the ethylene carboxylate derivatives known as acrylates—i.e., wherein at least one of $R_6$, $R_7$ and $R_8$ are carboxylate groups or derivatives thereof. Suitable carboxylate derivatives include, but are not limited to alkyl, cycloalkyl, poly-cycloalkyl, heterocycloalkyl and alkyl and alkenyl derivatives thereof; alkenyl, cycloalkenyl, poly-cycloalkenyl and alkyl and alkenyl derivatives thereof; mono- and poly-hydroxyalkyl; mono- and poly-hydroxyalkenyl; alkoxyalkyl; alkoxyalkenyl and cyano.

Among the acrylates that may be advantageously employed herein are mono- and poly-acrylates (bearing in mind that poly-acrylates function as cross-linking agents as well, see infra), such as 2-hydroxyethyl acrylate, 2-hydroxyethyl methacrylate, methylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate, 2,3-dihydroxypropyl methacrylate, methyl acrylate, ethyl acrylate, n-propyl acrylate, i-propyl acrylate, n-butyl acrylate, s-butyl acrylate, n-pentyl acrylate, 2-ethylhexyl acrylate, methyl methacrylate, ethyl methacrylate, n-propyl methacrylate, i-propyl methacrylate, n-butyl methacrylate, s-butyl methacrylate, n-pentyl methacrylate, s-pentyl methacrylate, methoxyethyl acrylate, methoxyethyl methacrylate, triethylene glycol monoacrylate, glycerol monoacrylate, glycerol monomethacrylate, allyl methacrylate, benzyl acrylate, caprolactone acrylate, cyclohexyl acrylate, cyclohexyl methacrylate, 2-ethoxyethyl acrylate, 2-ethoxyethyl methacrylate, 2-(2-ethoxyethoxy)ethylacrylate, glycidyl methacrylate, n-hexyl acrylate, n-hexyl methacrylate, isobornyl acrylate, isobornyl methacrylate, i-decyl acrylate, i-decyl methacrylate, i-octyl acrylate, lauryl acrylate, lauryl methacrylate, 2-methoxyethyl acrylate, n-octyl acrylate, 2-phenoxyethyl acrylate, 2-phenoxyethyl methacrylate, stearyl acrylate, stearyl methacrylate, tetrahydrofurfuryl acrylate, tetrahydrofurfuryl methacrylate, tridecyl methacrylate, 1,4-butanediol diacrylate, 1,4-butanediol dimethacrylate, 1,3-butylene glycol diacrylate, 1,3-butylene glycol dimethacrylate, diethylene glycol diacrylate, diethylene glycol dimethacrylate, ethylene glycol diacrylate, ethoxylated bisphenol A dimethacrylate, ethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol diacrylate, tetraethylene glycol dimethacrylate, triethylene glycol diacrylate, triethylene glycol dimethacrylate, tripropylene glycol diacrylate, dipentaerythritol pentaacrylate, ethoxylated pentaerythritol triacrylate, pentaerythritol tetraacrylate, pentaerythritol triacrylate, trimethylolpropane triacrylate, trimethylolpropane trimethacrylate, tris(2-hydroxyethyl)-isocyanurate triacrylate, tris(2-hydroxyethyl)-isocyanurate trimethacrylate, polyethylene glycol monoacrylate, polyethylene glycol monomethacrylate, polypropylene glycol monoacrylate, polypropylene glycol monomethacrylate, hydroxyethyl cellulose acrylate, hydroxyethyl cellulose methacrylate, methoxy poly(ethyleneoxy) ethylacrylate, methoxy poly (ethyleneoxy) ethylmethacrylate and combinations thereof. For a further recitation of suitable acrylates for use herein, see those acrylates available commercially from Monomer-Polymer Labs, Inc.; Polysciences, Inc. and Sartomer Co. Also, those of ordinary skill in the art will appreciate that derivatized acrylates in general should provide beneficial properties and characteristics to the resulting polychromic solid film.

Other monomers suitable for use herein include styrenes, unsaturated polyesters, vinyl ethers, acrylamides, methyl acrylamides and the like.

Other monomers capable of addition polymerization include isocyanates, polyols, amines, polyamines, amides, polyamides, acids, polyacids, compounds comprising an active methylene group, ureas, thiols, etc. Preferably, such monomers have a functionality of 2 or greater. For example, the monomer composition can include isocyanates such as hexamethylene diisocyanate (HDI); toluene diisocyanate (TDI including 2, 4 and 2, 6 isomers); diphenylmethane diisocyanate (MDI); isocyanate tipped prepolymers such as those prepared from a diisocyanate and a polyol; condensates produced from hexamethylene diisocyanate including biuret type and trimer type (also known as isocyanurate), as is known in the urethane chemical art. A recitation of various monomers suitable to use in the electrochromic monomer composition is given in the following Table 1.

TABLE 1

Monomers suitable to use in the electrochromic monomer composition

| Type | Trade Name | Product No: | Supplier | Location |
|---|---|---|---|---|
| Isocyanate | Tolonate | HDT (Isocyanurate) | Rhone-Poulenc Inc. | Princeton, NJ |
| Isocyanate | Tolonate | HDB (Biuret) | Rhone-Poulenc Inc. | Princeton, NJ |
| Isocyanate | ISONATE | modified MDI | Dow Chemical | Midland, MI |
| Isocyanate | PAPI | polymeric MDI | Dow Chemical | Midland, MI |
| Isocyanate | RUBINATE | 9043 MDI | ICI | Sterling Heights, MI |
| Isocyanate | DESMODUR | N-100 | Miles | Pittsburgh, PA |
| Isocyanate | TYCEL | 7351 | Liofol Co. | Cary, NC |
| Polyol | VORANOL | polyether polyols | Dow Chemical | Midland, MI |
| Polyol | VORANOL | copolymer polyols | Dow Chemical | Midland, MI |
| Polyol | ARCOL | E-786 | Arco Chemical | Hinsdale, IL |

TABLE 1-continued

Monomers suitable to use in the electrochromic monomer composition

| Type | Trade Name | Product No: | Supplier | Location |
|---|---|---|---|---|
| Polyol | ARCOL | LHT-112 | Arco Chemical | Hinsdale, IL |
| Polyol | ARCOL | E-351 | Arco Chemical | Hinsdale, IL |
| Polyol | LEXOREZ | 1931-50 | Inolex Chemical Co. | Philadelphia, PA |
| Polyol | LEXOREZ | 1842-90 | Inolex Chemical Co. | Philadelphia, PA |
| Polyol | LEXOREZ | 1405-65 | Inolex Chemical Co. | Philadelphia, PA |
| Polyol | LEXOREZ | 1150-110 | Inolex Chemical Co. | Philadelphia, PA |
| Polyol | DESMOPHEN | 1700 | Miles | Pittsburgh, PA |
| Tin Catalyst | DABCO | T-9 | Air Products and Chemical Inc. | Allentown, PA |
| Tin Catalyst | DABCO | T-1 | Air Products and Chemical Inc. | Allentown, PA |
| Tin Catalyst | DABCO | T-120 | Air Products and Chemical Inc. | Allentown, PA |

In situ cure can be facilitated by inclusion of organometallic catalysts in the electrochromic monomer composition. Examples of such catalysts include dibutyl tin dilaurate, dibutyl tin diacetate, and dibutyl tin dioctoate. Other catalysts can include organometallic compounds of bismuth, iron, tin, titanium, cobalt, nickel, antimony, vanadium, cadmium, mercury, aluminum, lead, zinc, barium, and thorium. Also, amines such as tertiary amines can be used.

Monomers capable of ring opening polymerization suitable for use herein include epoxides, lactones, lactams, dioxepanes, spiro orthocarbonates, unsaturated spiro orthoesters and the like.

Preferred among these ring opening polymerizable monomers are epoxides and lactones. Of the epoxides suitable for use herein, preferred are cyclohexene oxide, cyclopentene oxide, glycidyl i-propyl ether, glycidyl acrylate, furfuryl glycidyl ether, styrene oxide, ethyl-3-phenyl glycidate, 1,4-butanediol glycidyl ether, 2,3-epoxypropyl-4-(2,3-epoxypropoxy) benzoate, 4,4'-bis-(2,3-epoxypropoxy) biphenyl and the like.

Also, particularly preferred are the cycloalkyl epoxides sold under the "CYRACURE" tradename by Union Carbide Chemicals and Plastics Co., Inc., Danbury, Conn., such as the "CYRACURE" resins UVR-6100 (mixed cycloalkyl epoxides), UVR-6105 (3,4-epoxycyclohexylmethyl-3,4-epoxycyclohexane carboxylate), UVR-6110 (3,4-epoxycyclohexylmethyl-3,4-epoxycyclohexane carboxylate) and UVR-6128 [bis-(3,4-epoxycyclohexyl) adipate), and the "CYRACURE" diluents UVR-6200 (mixed cycloalkyl epoxides) and UVR-6216 (1,2-epoxyhexadecane); those epoxides commercially available from Dow Chemical Co., Midland, Mich., such as D.E.R. 736 epoxy resin (epichlorohydrin-polyglycol reaction product), D.E.R. 755 epoxy resin (diglycidyl ether of bisphenol A-diglycidyl ether of polyglycol) and D.E.R. 732 epoxy resin (epichlorohydrin-polyglycol reaction product), and the NOVOLAC epoxy resins such as D.E.N. 431, D.E.N. 438 and D.E.N. 439 (phenolic epoxides), and those epoxides commercially available from Shell Chemical Co., Oak Brook, Ill., like the "EPON" resins 825 and 1001F (epichlorohydrin-bisphenol A type epoxy resins).

Other commercially available epoxide monomers that are particularly well-suited for use herein include those commercially available under the "ENVIBAR" tradename from Union Carbide Chemicals and Plastics Co., Inc., Danbury, Conn., such as "ENVIBAR" UV 1244 (cycloalkyl epoxides).

In addition, derivatized urethanes, such as acrylated (e.g., mono- or poly-acrylated) urethanes; derivatized heterocycles, such as acrylated (e.g., mono- or poly-acrylated) heterocycles, like acrylated epoxides, acrylated lactones, acrylated lactams; and combinations thereof, capable of undergoing addition polymerizations, such as vinyl polymerizations and ring opening polymerizations, are also well-suited for use herein.

Many commercially available ultraviolet curable formulations are well-suited for use herein as a monomer component in the electrochromic monomer composition. Among those commercially available ultraviolet curable formulations are acrylated urethanes, such as the acrylated alkyl urethane formulations commercially available from Sartomer Co., including Low Viscosity Urethane Acrylate (Flexible) (CN 965), Low Viscosity Urethane Acrylate (Resilient) (CN 964), Urethane Acrylate (CN 980), Urethane Acrylate/TPGDA (CN 966 A80), Urethane Acrylate/IBOA (CN 966 J75), Urethane Acrylate/EOEOEA (CN 966 H90), Urethane Acrylate/TPGDA (CN 965 A80), Urethane Acrylate/EOTMPTA (CN 964 E75), Urethane Acrylate/EOEOEA (CN 966 H90), Urethane Acrylate/TPGDA (CN 963 A80), Urethane Acrylate/EOTMPTA (CN 963 E75), Urethane Acrylate (Flexible) (CN 962), Urethane Acrylate/EOTMPTA (CN 961 E75), Urethane Acrylate/EOEOEA (CN 961 H90), Urethane Acrylate (Hard) (CN 955), Urethane Acrylate (Hard) (CN 960) and Urethane Acrylate (Soft) (CN 953), and acrylated aromatic urethane formulations, such as those sold by Sartomer Co., may also be used herein, including Hydrophobic Urethane Methacrylate (CN 974), Urethane Acrylate/TPGDA (CN 973 A80), Urethane Acrylate/IBOA (CN 973 J75), Urethane Acrylate/EOEOEA (CN 973 H90), Urethane Acrylate (Flexible) (CN 972), Urethrane Acrylate (Resilient) (CN 971), Urethane Acrylate/TPGDA (CN 971 A80), Urethane Acrylate/TPGDA (CN 970 A60), Urethane Acrylate/EOTMPTA (CN 970 E60) and Urethane Acrylate/EOEOEA (CN 974 H75). Other acrylated urethane formulations suitable for use herein may be obtained commercially from Monomer-Polymer Labs, Inc. and Polysciences, Inc.

Other ultraviolet curable formulations that may be used herein are the ultraviolet curable acrylated epoxide formulations commercially available from Sartomer Co., such as Epoxidized Soy Bean Oil Acrylate (CN 111), Epoxy Acrylate (CN 120), Epoxy Acrylate/TPGDA (CN 120 A75), Epoxy Acrylate/HDDA (CN 120 B80), Epoxy Acrylate/TMPTA (CN 120 C80), Epoxy Acrylate/GPTA (CN 120 D80), Epoxy Acrylate/Styrene (CN 120 S85), Epoxy Acrylate (CN 104), Epoxy Acrylate/GPTA (CN 104 D80), Epoxy Acrylate/HDDA (CN 104 B80), Epoxy Acrylate/TPGDA (CN 104 A80), Epoxy Acrylate/TMPTA (CN 104 C75), Epoxy Novolac Acrylate/TMPTA (CN 112 C60), Low Viscosity Epoxy Acrylate (CN 114), Low Viscosity Epoxy Acrylate/EOTMPTA (CN 114 E80), Low Viscosity Epoxy Acrylate/GPTA (CN 114 D75) and Low Viscosity Epoxy Acrylate/TPGDA (CN 114 A80).

In addition, "SARBOX" acrylate resins, commercially available from Sartomer Co., like Carboxylated Acid Terminated (SB 400), Carboxylated Acid Terminated (SB 401), Carboxylated Acid Terminated (SB 500), Carboxylated Acid Terminated (SB 500E50), Carboxylated Acid Terminated (SB 500K60), Carboxylated Acid Terminated (SB 501), Carboxylated Acid Terminated (SB 510E35), Carboxylated Acid Terminated (SB 520E35) and Carboxylated Acid Terminated (SB 600) may also be advantageously employed herein.

Also well-suited for use herein are ultraviolet curable formulations like the ultraviolet curable conformational coating formulations commercially available under the "QUICK CURE" trademark from the Specialty Coating Systems subsidiary of Union Carbide Chemicals & Plastics Technology Corp., Indianapolis, Ind., and sold under the product designations B-565, B-566, B-576 and BT-5376; ultraviolet curing adhesive formulations commercially available from Loctite Corp., Newington, Conn. under the product names UV OPTICALLY CLEAR ADH, MULTI PURPOSE UV ADHESIVE, "IMPRUV" LV POTTING COMPOUND and "LOCQUIC" ACTIVATOR 707; ultraviolet curable urethane formulations commercially available from Norland Products, Inc., New Brunswick, N.J., and sold under the product designations "NORLAND NOA 61", "NORLAND NOA 65" and "NORLAND NOA 68"; and ultraviolet curable acrylic formulations commercially available from Dymax Corp., Torrington, Conn., including "DYMAX LIGHT-WELD 478".

By employing polyfunctional monomers, like difunctional monomers, or cross-linking agents, cross-linked polychromic solid films may be advantageously prepared. Such cross-linking tends to improve the physical properties and characteristics (e.g., mechanical strength) of the resulting polychromic solid films. Cross-linking during cure to transform the electrochromic monomer composition into a polychromic solid film may be achieved by means of free radical ionic initiation by the exposure to electromagnetic radiation. This may be accomplished by combining together all the components of the particular electrochromic monomer composition and thereafter effecting cure. Alternatively, cross-links may be achieved by exposing to electromagnetic radiation the electrochromic monomer composition for a time sufficient to effect a partial cure, whereupon further electromagnetic radiation and/or a thermal influence may be employed to effect a more complete in situ cure and transformation into the polychromic solid film.

Suitable polyfunctional monomers for use in preparing polychromic films should have at least two reactive functionalities, and may be selected from, among others, ethylene glycol diacrylate, ethylene glycol dimethacrylate, 1,2-butylene dimethacrylate, 1,3-butylene dimethacrylate, 1,4-butylene dimethacrylate, 1,3-propylene glycol diacrylate, propylene glycol dimethacrylate, diethylene glycol diacrylate, dipropylene glycol diacrylate, divinyl benzene, divinyl toluene, diallyl tartrate, allyl maleate, divinyl tartrate, triallyl melamine, glycerine trimethacrylate, diallyl maleate, divinyl ether, diallyl monomethylene glycol citrate, ethylene glycol vinyl allyl citrate, allyl vinyl maleate, diallyl itaconate, ethylene glycol diester of itaconic acid, polyester of maleic anhydride with triethylene glycol, polyallyl glucoses (e.g., triallyl glucose), polyallyl sucroses (e.g., pentaallyl sucrose diacrylate), glucose dimethacrylate, pentaerythritol tetraacrylate, sorbitol dimethacrylate, diallyl aconitate, divinyl citrasonate, diallyl fumarate, allyl methacrylate and polyethylene glycol diacrylate.

Ultraviolet radiation absorbing monomers may also be advantageously employed herein. Preferred among such monomers are 1,3-bis-(4-benzoyl-3-hydroxyphenoxy)-2-propylacrylate, 2-hydroxy-4-acryloxyethoxybenzophenone, 2-hydroxy-4-octoxybenzophenone and 4-methacryloxy-2-hydroxybenzophenone, as they perform the dual function of acting as a monomer component, or a portion thereof, and as an ultraviolet stabilizing agent.

Further, ultraviolet absorbing layers may be coated onto, or adhered to, the first substrate and/or second substrate, and preferably the substrate closest to the source of UV radiation, to assist in shielding the electrochromic device from the degradative effect of ultraviolet radiation. Suitable ultraviolet absorbing layers include those recited in U.S. Pat. No. 5,073,012 entitled "Anti-scatter, Ultraviolet Protected, Anti-misting Electro-optical Assemblies", filed Mar. 20, 1990, or as disclosed in U.S. patent application Ser. No. 08/547,578 filed Oct. 24, 1995 now U.S. Pat. No. 5,729,379, the disclosures of which are hereby incorporated by reference herein.

Examples of such layers include a layer of DuPont BE1028D which is a polyvinylbutyral/polyester composite available from E. I. DuPont de Nemours and Company, Wilmington, Del., and SORBALITE™ polymeric UV blockers (available from Monsanto Company, St. Louis, Mo.) which comprise a clear thin polymer film, with UV absorbing chromophores incorporated, such as by covalent bonding, in a polymer backbone. The SORBALITE™ clear thin polymer film when placed on a surface of the substrate closest to the source of UV radiation (such as the sun), efficiently absorbs UV light below about 370 nm with minimal effect on the visible region. Thickness of the SORBALITE™ film is desirably in the range of about 0.1 microns to 1000 microns (or thicker); preferably less than 100 microns; more preferably less than about 25 microns, and most preferably less than about 10 microns. Also, UV absorbing thin films or additives such as cerium oxide, iron oxide, nickel oxide and titanium oxide or such oxides with dopants can be used to protect the electrochromic device from UV degradation. Further as described above, UV absorbing chromophores can be incorporated, such as by covalent bonding, into the solid polymer matrix to impart enhanced resilience to UV radiation. Also near-infrared radiation absorbing species may be incorporated into the solid polymer matrix.

The density of the cross-link within the resulting polychromic solid film tends to increase with the amount and/or the degree of functionality of polyfunctional monomer present in the electrochromic monomer composition. Cross-linking density within a polychromic solid film may be achieved or further increased by adding to the electrochromic monomer composition cross-linking agents, which themselves are incapable of undergoing further polymerization. In addition to increasing the degree of cross-linking within the resulting polychromic solid film, the use of such cross-linking agents in the electrochromic monomer composition may enhance the prolonged coloration performance of the resulting polychromic solid film. Included among such cross-linking agents are polyfunctional hydroxy compounds, such as glycols and glycerol, polyfunctional primary or secondary amino compounds and polyfunctional mercapto compounds. Among the preferred cross-linking agents are pentaerythritol, 2-ethyl-2-(hydroxymethyl)-1,3-propanediol, the poly (caprolactone) diols having molecular weights of 1,250, 2,000 and 3,000, and polycarbonate diol available from Polysciences, Inc. and the polyfunctional hydroxy compounds commercially available under the "TONE" tradename from Union Carbide Chemicals and Plastics Co. Inc., Danbury, Conn., such as ε-caprolactone triols (known as "TONE" 0301, "TONE" 0305 and "TONE" 0310). Among the preferred glycols are the poly(ethylene glycols), like those sold under the "CARBOWAX" tradename by the Industrial Chemical division of Union Carbide Corp., Danbury, Conn. such as "CARBOWAX" PEG 200, PEG 300, PEG 400, PEG 540 Blend, PEG 600, PEG 900, PEG 1000, PEG 1450, PEG 3350, PEG 4600, and PEG 8000, with "CARBOWAX" PEG 1450 being the most preferred among this group, and those available from Polysciences, Inc.

Polychromic solid films that perform well under prolonged coloration may be prepared from electrochromic monomer compositions that contain as a monomer component at least some portion of a polyfunctional monomer—e.g., a difunctional monomer. By preferably using polyfunctional monomers having their functional groups spaced apart to such an extent so as to enhance the flexibility of the resulting polychromic solid film, polychromic solid films may be prepared with a minimum of shrinkage during the transformation process and that also perform well under prolonged coloration.

While it is preferable to have electrochromic monomer compositions which contain a monomer component having polyfunctionality in preparing polychromic solid films that perform well under prolonged coloration, electrochromic monomer compositions that exhibit enhanced resistance to shrinkage when transformed into polychromic solid films preferably contain certain monofunctional monomers. In this regard, depending on the specific application, some physical properties and characteristics of polychromic solid films may be deemed of greater import than others. Thus, superior performance in terms of resistance to shrinkage during in situ curing of the electrochromic monomer composition to the polychromic solid film may be balanced with the prolonged coloration performance of the resulting polychromic solid film to achieve the properties and characteristics desirable of that polychromic solid film.

Those of ordinary skill in the art may make appropriate choices among the herein described monomers—monofunctional and polyfunctional, such as difunctional—and cross-linking agents to prepare a polychromic solid film having beneficial properties and characteristics for the specific application by choosing such combinations of a monofunctional monomer to a polyfunctional monomer or a monofunctional monomer to a cross-linking agent in an equivalent ratio of about 1:1 or greater.

In the preferred electrochromic monomer compositions, photoinitiators or photosensitizers may also be added to assist the initiation of the in situ curing process. Such photoinitiators or photosensitizers enhance the rapidity of the curing process when the electrochromic monomer compositions are exposed to electromagnetic radiation. These materials include, but are not limited to, radical initiation type and cationic initiation type polymerization initiators such as benzoin derivatives, like the n-butyl, i-butyl and ethyl benzoin alkyl ethers, and those commercially available products sold under the "ESACURE" tradename by Sartomer Co., such as "ESACURE" TZT (trimethyl benzophenone blend), KB1 (benzildimethyl ketal), KB60 (60% solution of benzildimethyl ketal), EB3 (mixture of benzoin n-butyl ethers), KIP 100F (α-hydroxy ketone), KT37 (TZT and α-hydroxy ketone blend), ITX (i-propylthioxanthone), X15 (ITX and TZT blend), and EDB [ethyl-4-(dimethylamino)-benzoate]; those commercially available products sold under the "IRGACURE" and "DAROCURE" tradenames by Ciba Geigy Corp., Hawthorne, N.Y., specifically "IRGACURE" 184, 907, 369, 500, 651, 261, 784 and "DAROCURE" 1173 and 4265, respectively; the photoinitiators commercially available from Union Carbide Chemicals and Plastics Co. Inc., Danbury, Conn., under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiator, dl-camphorquinone.

Of course, when those of ordinary skill in the art choose a commercially available ultraviolet curable formulation, it may no longer be desirable to include as a component within the electrochromic monomer composition an additional monomer to that monomer component already present in the commercial formulation. And, as many of such commercially available ultraviolet curable formulations contain a photoinitiator or photosensitizer, it may no longer be desirable to include this optional component in the electrochromic monomer composition. Nevertheless, a monomer, or a photoinitiator or a photosensitizer, may still be added to the electrochromic monomer composition to achieve beneficial results, and particularly when specific properties and characteristics are desired of the resulting polychromic solid film.

With an eye toward maintaining the homogeneity of the electrochromic monomer composition and the polychromic solid film which results after in situ cure, those of ordinary skill in the art should choose the particular components dispersed throughout, and their relative quantities, appropriately. One or more compatibilizing agents may be optionally added to the electrochromic monomer composition so as to accomplish this goal. Such compatibilizing agents include, among others, combinations of plasticizers recited herein, a monomer component having polyfunctionality and cross-linking agents that provide flexible cross-links. See supra.

Further, monomer compositions can be formed comprising both organic and inorganic monomers. For example, inorganic monomers such as tetraethylorthosilicate, titanium isopropoxide, metal alkoxides, and the like may be included in the monomer composition, and formation of the solid matrix (be it an organic polymer matrix, an inorganic polymer matrix or an organic/inorganic polymer matrix) can proceed via a variety of reaction mechanisms, including hydrolysis/condensation reactions. Also, transition metal-peroxy acid products (such as tungsten peroxy acid product) can be reacted with alcohol to form a peroxy-transition metal derivative (such as peroxytungstic ester derivative), with a recitation of such species being found in U.S. Pat. No. 5,457,218 entitled "Precursor and Related Method of Forming Electrochromic Coatings", invented by J. Cronin et al and issued Oct. 10, 1995, the disclosure of which is hereby incorporated by reference herein, and can be used as a component of the electrochromic monomer composition. Also, the polychromic solid films may optionally be combined with inorganic and organic films such as those of metal oxides (e.g., $WO_3$, $NiO$, $IrO_2$, etc.) and organic films such a polyaniline. Examples of such films are found in U.S. patent application Ser. No. 08/429,643 filed Apr. 27, 1995, now U.S. Pat. No. 5,724,187, U.S. patent application Ser. No. 08/547,578 filed Oct. 24, 1995, now U.S. Pat. No. 5,729,379, and U.S. patent application Ser. No. 08/330,090 filed Oct. 26, 1994, now U.S. Pat. No. 5,780,160, the disclosures of which are hereby incorporated by reference herein. Also, the devices of this present invention can benefit from the use of elemental semiconductors layers or stacks, PRM, anti-wetting adaption, synchronous manufacturing, multi-layer transparent conducting stacks incorporating a thin metal layer overcoated with a conducting metal oxide (such as a high reflectivity reflector comprising around 1000 Å of silver metal or aluminum metal, overcoated with about 1500 Å of ITO and with a reflectivity greater than 70% R and a sheet resistance below 5 ohms/square), conducting seals, variable intensity band pass filters, isolation valve vacuum backfilling, cover sheets and on demand displays such as are disclosed in U.S. patent application Ser. No. 08/429,643 filed Apr. 27, 1995, now U.S. Pat. No. 5,729,187, the disclosure of which is hereby incorporated by reference herein. Also, as further disclosed in U.S. patent application Ser. No. 08/429,643, now U.S. Pat. No. 5,724,187, the solid polymer films of this present invention may comprise within their structure electrochromatically active phthalocyanine-based and/or phthalocyanine-derived moieties including transition metal phthalocyanines such as zirconium phthalocyanine and molybdenum phthalocyanine. Also, the solid polymer films of this invention can be combined with an electron donor (e.g. $TiO_2$)—spacer (salicylic acid or phosphoric acid bound to the $TiO_2$)— electron acceptor (a viologen bound to the salicylic acid or to the phosphoric acid) heterodyad such as described also in U.S. patent application Ser. No. 08/429,643 (now U.S. Pat. No. 5,724,187). Such donor-spacer-acceptor solid films can function as an electrochromic solid film in combination with the polychromic solid films of the present invention. Further, such as described in U.S. Pat. No. 5,724,187, such chemically modified nanoporous-nanocrystalline films, such as of $TiO_2$ with absorbed redox chromophores, can be used in a variety of electrochromic devices and device constructions, including rearview mirrors, glazings, architectural and vehicular glazings, displays, filters, contrast enhancement filters and the like.

Many electrochromic compounds absorb electromagnetic radiation in the about 290 nm to about 400 nm ultraviolet region. Because solar radiation includes an ultraviolet region between about 290 nm to about 400 nm, it is often desirable to shield such electrochromic compounds from ultraviolet radiation in that region. By so doing, the longevity and stability of the electrochromic compounds may be improved. Also, it is desirable that the polychromic solid film itself be stable to electromagnetic radiation, particularly in that region. This may be accomplished by adding to the electrochromic monomer composition an ultraviolet stabilizing agent (and/or a self-screening plasticizer which may act to block or screen such ultraviolet radiation) so as to extend the functional lifetime of the resulting polychromic solid film. Such ultraviolet stabilizing agents (and/or self-screening plasticizers) should be substantially transparent in the visible region and function to absorb ultraviolet radiation, quench degradative free radical reaction formation and prevent degradative oxidative reactions.

As those of ordinary skill in the art will readily appreciate, the preferred ultraviolet stabilizing agents, which are usually employed on a by-weight basis, should be selected so as to be compatible with the other components of the electrochromic monomer composition, and so that the physical, chemical or electrochemical performance of, as well as the transformation into, the resulting polychromic solid film is not adversely affected.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3-diphenylacrylate (BASF Corp.)], "UVINUL" N 539 [2-ethylhexyl-2-cyano-3,3'-diphenylacrylate (BASF Corp.)], "UVINUL" M 40 [2-hydroxy-4-methoxybenzophenone (BASF Corp.)], "UVINUL" M 408 [2-hydroxy-4-octoxybenzophenone (BASF Corp.)], "TINUVIN" P [2-(2'-hydroxy-5'-methylphenyl)-triazole] (Ciba Geigy Corp.)], "TINUVIN" 327 [2-(3',5'-di-t-butyl-2'-hydroxyphenyl)-5-chlorobenzotriazole (Ciba Geigy Corp.)], "TINUVIN" 328 [2-(3', 5'-di-n-pentyl-2'-hydroxyphenyl)-benzotriazole (Ciba Geigy Corp.)] and "CYASORB UV" 24 [2,2'-dihydroxy-4-methoxy-benzophenone (manufactured by American Cyanamid Co., Wayne, N.J.)], with "UVINUL" M 40, "UVINUL M" 408, "UVINUL" N 35 and "UVINUL" N 539 being the most preferred ultraviolet stabilizing agents when used in a by-weight range of about 0.1% to about 15%, with about 4% to about 10% being preferred.

Since solar radiation includes an ultraviolet region only between about 290 nm and 400 nm, the cure wave length of the electrochromic monomer composition, the peak intensity of the source of electromagnetic radiation, and the principle absorbance maxima of the ultraviolet stabilizing agents should be selected to provide a rapid and efficient transformation of the electrochromic monomer compositions into the polychromic solid films, while optimizing the continued long-term post-cure stability to outdoor weathering and all-climate exposure of polychromic solid films.

An electrolytic material may also be employed in the electrochromic monomer composition to assist or enhance the conductivity of the electrical current passing through the resulting polychromic solid film. The electrolytic material may be selected from a host of known materials, preferred of which are tetraethylammonium perchlorate, tetrabutylammonium tetrafluoroborate, tetrabutylammonium hexafluorophosphate, tetrabutylammonium trifluoromethane sulfonate, lithium salts and combinations thereof, with tetrabutylammonium hexafluorophosphate and tetraethylammonium perchlorate being the most preferred.

In addition, adhesion promoting agents or coupling agents may be used in the preferred electrochromic monomer compositions to further enhance the degree to which the resulting polychromic solid films adhere to the contacting surfaces. Adhesion promoting or coupling agents, which promote such enhanced adhesion, include silane coupling agents, and commercially available adhesion promoting agents like those sold by Sartomer Co., such as Alkoxylated Trifunctional Acrylate (9008), Trifunctional Methacrylate Ester (9010 and 9011), Trifunctional Acrylate Ester (9012), Aliphatic Monofunctional Ester (9013 and 9015) and Aliphatic Difunctional Ester (9014). Moreover, carboxylated vinyl monomers, such as methacrylic acid, vinyl carboxylic acid and the like may be used to further assist the development of good adhesion to the contacting surfaces.

And, coloring agents, spacers, anti-oxidizing agents, flame retarding agents, heat stabilizing agents and combinations thereof may be added to the electrochromic monomer compositions, choosing of course those materials in appropriate quantities depending upon the specific application of the resulting polychromic solid film. For instance, a blue-tinted electrochromic automotive mirror, such as described herein, may be prepared by dispersing within the electrochromic monomer composition a suitable ultraviolet stable coloring agent, such as "NEOZAPON" BLUE™ 807 (a phthalocyanine blue dye, available commercially from BASF Corp., Parsippany, N.J.) and "NEOPEN" 808 (a phthalocyanine blue dye, available commercially from BASF Corp.).

Polychromic solid films may be prepared within an electrochromic device by introducing an electrochromic monomer composition to a film forming means, such as the vacuum backfilling technique, which fills a cavity of an assembly by withdrawing into the cavity the electrochromic monomer composition while the assembly is in an environment of reduced atmospheric pressure [see e.g., Varaprasad II], the two hole filling technique, where the electrochromic monomer composition is dispensed under pressure into the assembly through one hole while a gentle vacuum is applied at the other hole [see e.g., Varaprasad III], or with the sandwich lamination technique, which contemporaneously creates and fills a cavity of an assembly by placing on one or both substrates either a thermoplastic sealing means to act as a spacing means [see commonly assigned U.S. Pat. No. 5,233,461 (Dornan)] or glass beads of nominal diameter, and then exposing to electromagnetic radiation at least one clear substrate of the assembly constructed by any of the above manufacturing techniques (containing the low viscosity electrochromic monomer composition) for a time sufficient to transform the electrochromic monomer composition into a polychromic solid film.

In connection with such film forming means, spacers, such as glass beads, may be dispensed across the conductive surface of one or both substrates, or dispersed throughout the electrochromic monomer composition which may then be dispensed onto the conductive surface of one or both substrates, to assist in preparing a polychromic solid film which contacts, in abutting relationship, the conductive surface of the two substrates. Similarly, a pre-established spacing means of solid material, such as tape, pillars, walls, ridges and the like, may also be employed to assist in determining the interpane distance between the substrates in which a polychromic solid film may be prepared to contact, in abutting relationship with, the conductive surface of the two substrates.

Polychromic solid films may also be prepared separately from the electrochromic device, and thereafter placed between, and in abutting relationship with, the conductive surface of the two substrates used in constructing the device. Many known film manufacturing processes may be employed as a film forming means to manufacture polychromic solid films. Included among these processes are calendering, casting, rolling, dispensing, coating, extrusion and thermoforming. For a non-exhaustive description of such processes, see *Modern Plastics Encyclopedia* 1988, 203–300, McGraw-Hill Inc., N.Y. (1988). For instance, the electrochromic monomer composition may be dispensed or coated onto the conductive surface of a substrate, using conventional techniques, such as curtain coating, spray coating, dip coating, spin coating, roller coating, brush coating or transfer coating.

As described above, polychromic solid films may be prepared as a self-supporting solid film which may thereafter be contacted with conductive substrates.

For instance, an electrochromic monomer composition may be continuously cast or dispensed onto a surface, such as a fluorocarbon surface and the like, to which the polychromic solid film, transformed therefrom by exposure to electromagnetic radiation, does not adhere. In this way, polychromic solid films may be continously prepared, and, for example, reeled onto a take-up roller and stored for future use. Thus, when a particular electrochromic device is desired, an appropriately shaped portion of the stored polychromic solid film may be cut from the roll using a die, laser, hot wire, blade or other cutting means. This now custom-cut portion of polychromic solid film may be contacted with the conductive substrates to form an electrochromic device.

For example, the custom-cut portion of the polychromic solid film may be laminated between the conductive surface of two transparent conductive coated substrates, such as ITO or tin oxide coated glass substrates, two ITO or tin oxide coated "MYLAR" [polyethylene terephthalate film (commercially available from E. I. du Pont de Nemours and Co., Wilmington, Del.)] substrates or one ITO or tin oxide coated glass substrate and one ITO or tin oxide coated "MYLAR" substrate. To this end, it may be desirable to allow for residual cure in the stored polychromic solid film so that adhesion to the conductive substrates in the laminate to be formed is facilitated and optimized.

In this regard, a polychromic solid film may be prepared by the film forming means of extrusion or calendaring wherein the electrochromic monomer composition is transformed into the polychromic solid film by exposure to electromagnetic radiation prior to, contemporaneously with, or, if the electrochromic monomer composition is sufficiently viscous, after passing through the extruder or calendar. Thereafter, the polychromic solid film may be placed between, and in abutting relationship with, the conductive surface of the substrates, and then construction of the electrochromic device may be completed.

While preparing polychromic solid films, the viscosity of the electrochromic monomer composition may be controlled to optimize its dispensibility by adjusting the temperature of (1) the electrochromic monomer composition itself, (2) the substrates on which the electrochromic monomer composition may be placed to assemble the electrochromic device or (3) the processing equipment used to prepare polychromic solid films (if the polychromic film is to be prepared independently from the substrates of the electrochromic devices). For example, the temperature of the electrochromic monomer composition, the substrates or the equipment or combinations thereof may be elevated to decrease the viscosity of the electrochromic monomer composition. Similarly, the uniformity on the substrate of the dispensed electrochromic monomer composition may be enhanced using lamination techniques, centrifuge techniques, pressure applied from the atmosphere (such as with vacuum bagging), pressure applied from a weighted object, rollers and the like.

The substrates employed in the electrochromic devices of the present invention may be constructed from materials that are substantially inflexible as well as flexible depending on the application to which they are to be used. In this regard, the substrates may be constructed from substantially inflexible substrates, such as glass, laminated glass, tempered glass, optical plastics, such as polycarbonate, acrylic and polystyrene, and flexible substrates, such as "MYLAR" film. Also, the glass substrates suitable for use herein may be tinted specialized glass which is known to significantly reduce ultraviolet radiation transmission while maintaining high visible light transmission. Such glass, often bearing a blue colored tint, provides a commercially acceptable silvery reflection to electrochromic automotive mirrors even when the polychromic solid film is prepared containing an ultraviolet stabilizing agent or other component which may have a tendency to imbue a yellowish appearance to the polychromic solid film. Preferably, blue tinted specialized glass may be obtained commercially from Pittsburgh Plate Glass Industries, Pittsburgh, Pa. as "SOLEXTRA" 7010; Ford Glass Co., Detroit, Mich. as "SUNGLAS" Blue; or Asahi Glass Co., Tokyo, Japan under the "SUNBLUE" tradename. Whether the chosen substrate is substantially inflexible or flexible, a transparent conductive coating, such as indium tin oxide ("ITO") or doped-tin oxide, is coated on a surface of the substrate making that surface suitable for placement in abutting relationship with a polychromic solid film.

The choice of substrate may influence the choice of processing techniques used to prepare the polychromic solid film or the type of electrochromic device assembled. For example, when assembling an electrochromic device from flexible substrates, an electrochromic monomer composition may be advantageously applied to such flexible substrates using a roll-to-roll system where the flexible substrates are released from rolls (that are aligned and rotate in directions opposite to one another), and brought toward one another in a spaced-apart relationship. In this way, the electrochromic monomer composition may be dispensed or injected onto one of the flexible substrates at the point where the two flexible substrates are released from their respective rolls and brought toward one another, while being contemporaneously exposed to electromagnetic radiation for a time sufficient to transform the electrochromic monomer composition into a polychromic solid film.

The dispensing of the electrochromic monomer composition may be effected through a first injection nozzle positioned over one of the rolls of flexible substrate. A weathering barrier forming material, such as a curing epoxide like an ultraviolet curing epoxide, may be dispensed in an alternating and synchronized manner onto that flexible substrate through a second injection nozzle positioned adjacent to the first injection nozzle. By passing in the path of these nozzles as a continuously moving ribbon, a flexible substrate may be contacted with the separate polymerizable compositions in appropriate amounts and positions on the flexible substrate.

In manufacturing flexible electrochromic assemblies having a dimension the full width of the roll of flexible substrate, a weathering barrier forming material may be dispensed from the second injection nozzle which may be positioned inboard (typically about 2 mm to about 25 mm) from the leftmost edge of the roll of flexible substrate. The first injection nozzle, positioned adjacent to the second injection nozzle, may dispense the electrochromic monomer composition onto most of the full width of the roll of flexible substrate. A third injection nozzle, also dispensing weathering barrier forming material, may be positioned adjacent to, but inboard from, the rightmost edge of that roll of flexible substrate (typically about 2 mm to about 25 mm). In this manner, and as described above, a continuous ribbon of a flexible electrochromic assembly may be formed (upon exposure to electromagnetic radiation) which, in turn, may be taken up onto a take-up roller. By so doing, a flexible electrochromic assembly having the width of the roll of flexible substrate, but of a particular length, may be obtained by unrolling and cutting to length an electrochromic assembly of a particular size.

Should it be desirable to have multiple flexible electrochromic assemblies positioned in the same taken-up roll, multiple nozzles may be placed appropriately at positions throughout the width of one of the rolls of flexible substrate, and the dispensing process carried out accordingly.

In that regard, a small gap (e.g., about 5 mm to about 50 mm) should be maintained where no dispensing occurs during the introduction of the electrochromic monomer composition and the weathering barrier forming material onto the substrate so that a dead zone is created where neither the electrochromic monomer composition nor the weathering barrier forming material is present. Once the weathering barrier and polychromic solid film have formed (see infra), the electrochromic assembly may be isolated by cutting along the newly created dead zones of the flexible assemblies. This zone serves conveniently as a cutting area to form electrochromic assemblies of desired sizes.

And, the zones outboard of the respective weathering barriers serve as convenient edges for attachment of a means for introducing an applied potential to the flexible electrochromic assemblies, such as bus bars.

Similarly, the bisection of the dead zones establishes a convenient position onto which the bus bars may be affixed.

While each of the weathering barrier forming material and the electrochromic monomer composition may be transformed into a weathering barrier and a polychromic solid film, respectively, by exposure to electromagnetic radiation, the required exposures to complete the respective transformations may be independent from one another. The weathering barrier forming material may also be thermally cured to form the weathering barrier.

The choice of a particular electromagnetic radiation region to effect in situ cure may depend on the particular electrochromic monomer composition to be cured. In this regard, typical sources of electromagnetic radiation, such as ultraviolet radiation, include: mercury vapor lamps; xenon arc lamps; "H", "D", "X", "M", "V" and "A" fusion lamps (such as those commercially available from Fusion UV Curing Systems, Buffalo Grove, Ill.); microwave generated ultraviolet radiation; solar power and fluorescent light sources. Any of these electromagnetic radiation sources may use in conjunction therewith reflectors and filters, so as to focus the emitted radiation within a particular electromagnetic region. Similarly, the electromagnetic radiation may be generated directly in a steady fashion or in an intermittent fashion so as to minimize the degree of heat build-up. Although the region of electromagnetic radiation employed to in situ cure the electrochromic monomer compositions into polychromic solid films is often referred to herein as being in the ultraviolet region, that is not to say that other regions of radiation within the electromagnetic spectrum may not also be suitable. For instance, in certain situations, visible radiation may also be advantageously employed.

Bearing in mind that some or all of the components of the electrochromic monomer composition may inhibit, retard or suppress the in situ curing process, a given source of electromagnetic radiation should have a sufficient intensity to overcome the inhibitive effects of those components so as to enable to proceed successfully the transformation of the electrochromic monomer composition into the polychromic solid film. By choosing a lamp with a reflector and, optionally, a filter, a source which itself produces a less advantageous intensity of electromagnetic radiation may suffice. In any event, the chosen lamp preferably has a power rating of at least about 100 watts per inch (about 40 watts per cm), with a power rating of at least about 300 watts per inch (about 120 watts per cm) being particularly preferred. Most preferably, the wavelength of the lamp and its output intensity should be chosen to accommodate the presence of ultraviolet stabilizing agents incorporated into electrochromic monomer compositions. Also, a photoinitiator or photosensitizer, if used, may increase the rate of in situ curing or shift the wavelength within the electromagnetic radiation spectrum at which in situ curing will occur in the transformation process.

During the in situ curing process, the electrochromic monomer composition will be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbance of electromagnetic radiation by any intervening materials, such as substrates, conductive coatings and the like; and the distance the electrochromic monomer composition lies from the source of radiation. Those of ordinary skill in the art will readily appreciate that the polychromic solid film transformation may be optimized by choosing appropriate values for these parameters in view of the particular electrochromic monomer composition.

The source of electromagnetic radiation may remain stationary while the electrochromic monomer composition passes through its path. Alternatively, the electrochromic monomer composition may remain stationary while the source of electromagnetic radiation passes thereover or therearound to complete the transformation into a polychromic solid film. Still alternatively, both may traverse one another, or for that matter remain stationary, provided that the electrochromic monomer composition is exposed to the electrochromic radiation for a time sufficient to effect such in situ curing.

Commercially available curing systems, such as the Fusion UV Curing Systems F-300 B [Fusion UV Curing Systems, Buffalo Grove, Ill.], Hanovia UV Curing System [Hanovia Corp., Newark, N.J.] and RC-500 A Pulsed UV Curing System [xenon Corp., Woburn, Mass.], are well-suited to accomplish the transformation. Also, a Sunlighter UV chamber fitted with low intensity mercury vapor lamps and a turntable may accomplish the transformation.

Electromagnetic radiation in the near-infrared and far-infrared (including short and long wavelengths from 3 microns to 30 microns and beyond) regions of the electromagnetic spectrum can be used, as can radiation in other regions such as microwave radiation. Thus, for electrochromic monomer compositions responsive to energy input that includes thermal energy, radiant heaters that emit in the infrared region and couple energy into the monomer composition can be used. For compositions responsive to microwave energy, a microwave generator can be used. Also, for systems that respond, for example, to a combination of energy inputs from different regions of the electromagnetic spectrum, a combined energy radiator can be used. For example, the Fusion UV Curing System, Sunlight UV Chamber, Hanovia UV Curing System, and RC-500A Pulsed UV Curing System described above emit energy efficiently in both the ultraviolet region and the infrared region, and thus effect a cure both by photoinitiation and thermally. For systems responsive to thermal influences, ovens, lehrs, converyorized ovens, induction ovens, heater banks and the like can be used to couple energy into the electrochromic monomer composition by convection, conduction and/or radiation. Also, chemical initiators and catalysts, photo initiators, latent curing agents (such as are described in U.S. Pat. application Ser. No. 08/429,643, (now U.S. Pat. No. 5,724,187) the disclosure of which is hereby incorporated by reference herein) and similar chemical accelerants can be used to assist conversion of the electrochromic monomer composition into a cross-linked solid polymer matrix. By customizing and selecting the components of the electrochromic monomer composition, cure can be retarded/suppressed until after the composition is applied within the cavity of the electrochromic cell. Thereafter, by exposure to electromagnetic radiation or thermal influence, cure to the solid polymer matrix polychromic film can be accelerated. Since devices will not typically be consumer used until at least days (often weeks or months) after initial application of the monomer composition within the inter-pane cell cavity, electrochromic monomer compositions can be composed that in situ cure at room temperature (typically 15° to 30° C.) over time once established within the inter-pane cavity (for example, within 24 hours). Alternately, electrochromic devices can be thermally in situ cured in an oven at a temperature, for example, of 60° C. or higher for a time period of, for example, five minutes or longer with the particular oven temperature and oven dwell time being readily established by experimentation for any given electrochromic monomer composition. For example, we find good results by exposure of the tin catalyzed compositions of the Examples to about 80° C. in an oven for about two hours. If faster curing systems are desired, then the monomer composition can be appropriately adjusted, particularly by appropriate selection of the type and concentration of initiators, curing agents, catalysts, cross-linking agents, accelerants, etc.

The required amount of energy may be delivered by exposing the electrochromic monomer composition to a less powerful source of electromagnetic radiation for a longer period of time, through for example multiple passes, or conversely, by exposing it to a more powerful source of electromagnetic radiation for a shorter period of time. In addition, each of those multiple passes may occur with a source at different energy intensities. In any event, those of ordinary skill in the art should choose an appropriate source of electromagnetic radiation depending on the particular electrochromic monomer composition, and place that source at a suitable distance therefrom which, together with the length of exposure, optimizes the transformation process. Generally, a slower, controlled cure, such as that achieved by multiple passes using a less intense energy source, may be preferable over a rapid cure using a more intense energy source, for example, to minimize shrinkage during the transformation process. Also, it is desirable to use a source of electromagnetic radiation that is delivered in an intermittent fashion, such as by pulsing or strobing, so as to ensure a thorough and complete cure without causing excessive heat build-up.

In transforming electrochromic monomer compositions into polychromic solid films, shrinkage may be observed during and after the transformation process of the electrochromic monomer composition into a polychromic solid film. This undesirable event may be controlled or lessened to a large extent by making appropriate choices among the components of the electrochromic monomer composition. For instance, appropriately chosen polyfunctional monomers or cross-linking agents may enhance resistance to shrinkage during the transformation process. In addition, a conscious control of the type and amount of plasticizer used in the electrochromic monomer composition may also tend to enhance resistance to shrinkage. While shrinkage may also be observed with polychromic solid films that have been subjected to environmental conditions, especially conditions of environmental accelerated aging, such as thermal cycling and low temperature soak, a conscious choice of components used in the electrochromic monomer composition may tend to minimize this event as well. In general, shrinkage may be decreased as the molecular weight of the monomer employed is increased, and by using index matched inert fillers, such as glass beads or fibres.

Electrochromic devices may be manufactured with polychromic solid films of a particular thickness by preparing partially-cured polychromic solid films between the glass substrates of electrochromic assemblies with spacers or a thermoplastic spacing means having been placed on one or both of the substrates. This partially-cured polychromic solid film should have a thickness slightly greater than that which the resulting polychromic solid film will desirably assume in the completed device. The electrochromic assemblies should then be subjected to compression, such as that provided by an autoclave/vacuum bagging process, and thereafter be exposed to electromagnetic radiation to complete the transformation into a polychromic solid film with the desired film thickness.

Figure 2:
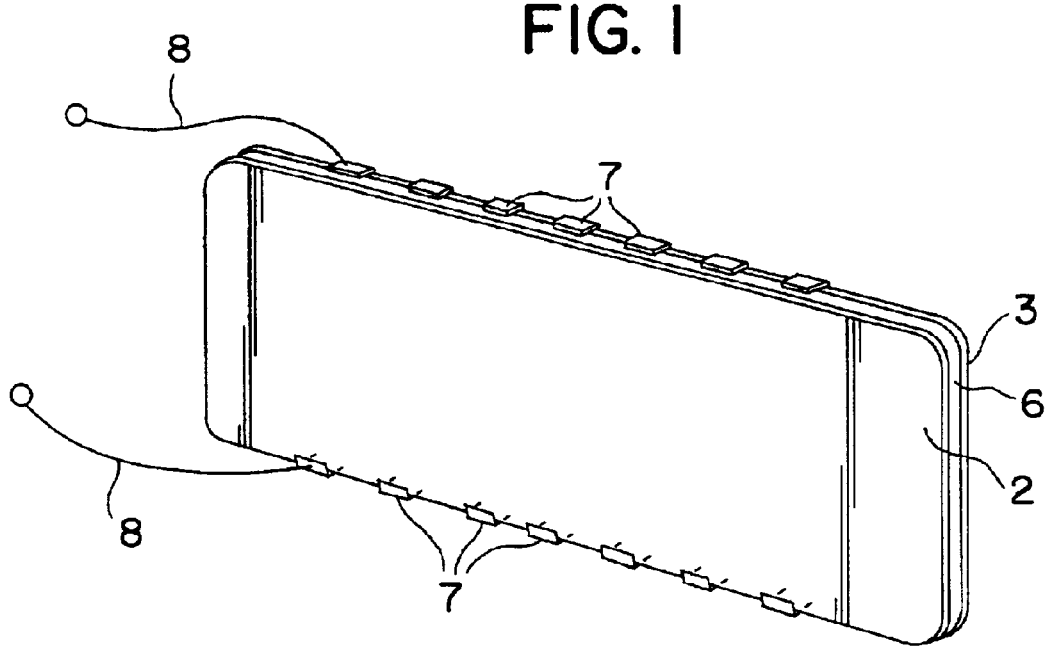
FIG. 2 depicts a perspective view of an electrochromic glazing assembly according to the present invention.

FIGS. 1 and 2 show an electrochromic device assembled from the polychromic solid films of the present invention. The electrochromic assembly 1 includes two substantially planar substrates 2, 3 positioned substantially parallel to one another. It is preferable that these substrates 2, 3 be positioned as close to parallel to one another as possible so as to avoid double imaging, which is particularly noticeable in mirrors, especially when the electrochromic media—i.e., the polychromic solid film—is colored to a dimmed state.

A source of an applied potential need be introduced to the electrochromic assembly 1 so that polychromic solid film 6 may color in a rapid, intense and uniform manner. That source may be connected by electrical leads 8 to conducting strips, such as bus bars 7. The bus bars 7 may be constructed of a metal, such as copper, stainless steel, aluminum or solder, or of conductive frits and epoxies, and should be affixed to a conductive coating 4, coated on a surface of each of the substrates 2, 3. An exposed portion of the conductive coating 4 should be provided for the bus bars 7 to adhere by the displacement of the coated substrates 2, 3 in opposite directions relative to each other—lateral from, but parallel to—, with polychromic solid film 6 positioned between, and in abutting relationship with, the conductive surface of the two substrates.

As noted above, coated on a surface of each of these substrates 2, 3 is a substantially transparent conductive coating 4. The conductive coating 4 is generally from about 300 Å to about 10,000 Å in thickness, having a refractive index in the range of about 1.6 to about 2.2. Preferably, a conductive coating 4 with a thickness of about 1,200 Å to about 2,300 Å, having a refractive index of about 1.7 to about 1.9, is chosen depending on the desired appearance of the substrate when the polychromic solid film situated therebetween is colored.

The conductive coating 4 should also be highly and uniformly conductive in each direction to provide a substantially uniform response as to film coloring once a potential is applied. The sheet resistance of these transparent conductive substrates 2, 3 may be below about 100 ohms per square, with about 6 ohms per square to about 20 ohms per square being preferred. Such substrates 2, 3 may be selected from among those commercially available as glass substrates, coated with indium tin oxide ("ITO") from Donnelly Corporation, Holland, Mich., or tin oxide-coated glass substrates sold by the LOF Glass division of Libbey-Owens-Ford Co., Toledo, Ohio under the tradename of "TEC-Glass" products, such as "TEC 10" (10 ohms per square sheet resistance), "TEC 12" (12 ohms per square sheet resistance), "TEC 15" (15 ohms per square sheet resistance) and "TEC 20" (20 ohms per square sheet resistance) tin oxide-coated glass. Moreover, tin oxide coated glass substrates, commercially available from Pittsburgh Plate Glass Industries, Pittsburgh, Pa. under the "SUNGATE" tradename, may be advantageously employed herein. Also, substantially transparent conductive coated flexible substrates, such as ITO deposited onto substantially clear or tinted "MYLAR", may be used. Such flexible substrates are commercially available from Southwall Corp., Palo Alto, Ca.

The conductive coating 4 coated on each of the substrates 2, 3 may be constructed from the same material or different materials, including tin oxide, ITO, ITO-FW, ITO-HW, ITO-HWG, doped tin oxide, such as antimony-doped tin oxide and fluorine-doped tin oxide, doped zinc oxide, such as antimony-doped zinc oxide and aluminum-doped zinc oxide, with ITO being preferred.

The substantially transparent conductive coated substrates 2, 3 may be of the full-wave length-type ("FW") (about 6 ohms per square to about 8 ohms per square sheet resistance), the half-wave length-type ("HW") (about 12 ohms per square to about 15 ohms per square sheet resistance) or the half-wave length green-type ("HWG") (about 12 ohms per square to about 15 ohms per square sheet resistance). The thickness of FW is about 3,000 Å in thickness, HW is about 1,500 Å in thickness and HWG is about 1,960 Å in thickness, bearing in mind that these substantially transparent conductive coated substrates 2, 3 may vary as much as about 100 to about 200 Å. HWG has a refractive index of about 1.7 to about 1.8, and has an optical thickness of about five-eighths wave to about two-thirds wave. HWG is generally chosen for electrochromic devices, especially reflective devices, such as mirrors, whose desired appearance has a greenish hue in color when a potential is applied. Optionally, and for some applications desireably, the spaced-apart substantially transparent conductive coated substrates 2, 3 may have a weather barrier 5 placed therebetween or therearound. The use of a weather barrier 5 in the electrochromic devices of the present invention is for the purpose of preventing environmental contaminants from entering the device during long-term use under harsh environmental conditions rather than to prevent escape of electrochromic media, such as with an electrochemichromic device. Weather barrier 5 may be made from many known materials, with epoxy resins coupled with spacers, plasticized polyvinyl butyral (available commercially under the "SAFLEX" tradename from Monsanto Co., St. Louis, Mo.), ionomer resins (available commercially under the "SURLYN" tradename from E. I. du Pont de Nemours and Co., Wilmington, Del.) and "KAPTON" high temperature polyamide tape (available commercially from E. I. du Pont de Nemours and Co., Wilmington, Del.) being preferred. In general, it may be desirable to use within the electrochromic device, and particularly for weather barrier 5, materials such as nitrile containing polymers and butyl rubbers that form a good barrier against oxygen permeation from environmental exposure.

A further recitation of weather barrier materials and types (including single and double weather barrier constructions) is found in U.S. patent application Ser. No. 08/429,643 filed Apr. 27, 1995, (now U.S. Pat. No. 5,724,187) the disclosure of which is hereby incorporated by reference herein, including flexible weather barrier materials that are beneficial when the polychromic solid film devices of this invention are exposed to wide and rapid oscillation between temperature extremes, such as the thermal shocks experienced during normal use in or on a vehicle in regions of climate extremes. Also, devices, such as electrochromic rearview mirrors utilizing a polychromic solid film, can be constructed suitable for use on automobiles, and suitable to withstand accelerated aging testing such as boiling in water for an extended period (such as 96 hours or longer); exposure to high temperature/high humidity for an extended period (for example, 85° C./85% relative humidity for 720 hours or longer); exposure within a steam autoclave for extended periods (for example, 121° C.; 15–18 psi steam for 144 hours or longer).

In the sandwich lamination technique, see supra, it is the thickness of the polychromic solid film itself, especially when a highly viscous electrochromic monomer composition is used, optionally coupled with either spacers or a thermoplastic spacing means, assembled within the electrochromic devices of the present invention that determines the interpane distance of the spaced-apart relationship at which the substrates are positioned. This interpane distance may be influenced by the addition of spacers to the electrochromic monomer composition, which spacers, when added to an electrochromic monomer composition, assist in defining the film thickness of the resulting polychromic solid film. And, the thickness of the polychromic solid film may be about 10 $\mu$m to about 1000 $\mu$m, with about 20 $\mu$m to about 200 $\mu$m being preferred, a film thickness of about 37 $\mu$m to about 74 $\mu$m being particularly preferred, and a film thickness of about 53 $\mu$m being most preferred depending of course on the chosen electrochromic monomer composition and the intended application.

By taking appropriate measures, electrochromic devices manufactured with polychromic solid films may operate so that, upon application of a potential thereto, only selected portions of the device—i.e., through the polychromic solid film—will color in preference to the remaining portions of the device. In such segmented electrochromic devices, lines may be scored or etched onto the conductive surface of either one or both of substrates 2, 3, in linear alignment so as to cause a break in electrical continuity between regions immediately adjacent to the break, by means such as chemical etching, mechanical scribing, laser etching, sand blasting and other equivalent means. By so doing, an addressable pixel may be created by the break of electrical continuity when a potential is applied to a pre-determined portion of the electrochromic device. The electrochromic device colors in only that pre-determined portion demonstrating utility, for example, as an electrochromic mirror, where only a selected portion of the mirror advantageously colors to assist in reducing locally reflected glare or as an electrochromic information display device.

To prepare an electrochromic device containing a polychromic solid film, the electrochromic monomer composition may be dispensed onto the conductive surface of one of the substrates 2 or 3. The conductive surface of the other substrate may then be placed thereover so that the electrochromic monomer composition is dispersed uniformly onto and between the conductive surface of substrates 2, 3.

This assembly may then be exposed, either in a continuous or intermittent manner, to electromagnetic radiation, such as ultraviolet radiation in the region between about 200 nm to about 400 nm for a period of about 2 seconds to about 10 seconds, so that the electrochromic monomer composition is transformed by in situ curing into polychromic solid film 6. The intermittent manner may include multiple exposures to such energy.

Once the electrochromic device is assembled with polychromic solid film 6, a potential may be applied to the bus bars 7 in order to induce film coloring. The applied potential may be supplied from a variety of sources including, but not limited to, any source of alternating current ("AC") or direct current ("DC") known in the art, provided that, if an AC source is chosen, control elements, such as diodes, should be placed between the source and each of the conductive coatings 4 to ensure that the potential difference between the conductive coatings 4 does not change polarity with variations in polarity of the applied potential from the source. Suitable DC sources are storage batteries, solar thermal cells, photovoltaic cells or photoelectrochemical cells.

An electrochromic device, such as an electrochromic shade band where a gradient opacity panel may be constructed by positioning the bus bars 7 along the edges of the substrates in such a way so that only a portion—e.g., the same portion—of each of the substrates 2, 3 have the bus bars 7 affixed thereto. Thus, where the bus bars 7 are aligned with one another on opposite substrates 2, 3, the introduction of an applied potential to the electrochromic device will cause intense color to be observed in only that region of the device onto which an electric field has been created—i.e., only that region of the device having the bus bars 7 so aligned. A portion of the remaining bleached region will also exhibit color extending from the intensely colored region at the bus bar/non-bus bar transition gradually dissipating into the remaining bleached region of the device.

The applied potential generated from any of these sources may be introduced to the polychromic solid film of the electrochromic device in the range of about 0.001 volts to about 5.0 volts. Typically, however, a potential of about 0.2 volts to about 2.0 volts is preferred, with about 1 volt to about 1.5 volts particularly preferred, to permit the current to flow across and color the polychromic solid film 6 so as to lessen the amount of light transmitted therethrough. The extent of coloring—i.e., high transmittance, low transmittance and intermediate transmittance levels—at steady state in a particular device will often depend on the potential difference between the conductive surface of the substrates 2, 3, which relationship permits the electrochromic devices of the present invention to be used as "gray-scale" devices, as that term is used by those of ordinary skill in the art.

A zero potential or a potential of negative polarity (i.e., a bleaching potential) may be applied to the bus bars 7 in order to induce high light transmittance through polychromic solid film 6. A zero potential to about −0.2 volts will typically provide an acceptable response time for bleaching; nevertheless, increasing the magnitude of the negative potential to about −0.7 volts will often enhance response times. And, a further increase in the magnitude of that potential to about −0.8 volts to about −0.9 volts, or a magnitude of even more negative polarity as the art-skilled should readily appreciate, may permit polychromic solid film 6 to form a light-colored tint while colored to a partial- or fully-dimmed state.

In electrochromic devices where the polychromic solid film is formed within the assembly by exposure to electromagnetic radiation, the performance of the device may be enhanced by applying the positive polarity of the potential to the substrate that faced the electromagnetic radiation during the transformation process. Thus, in the case of electrochromic mirrors manufactured in such a manner, the positive polarity of the potential should be applied to the conductive surface of the clear, front glass substrate, and the negative polarity of the potential applied to the conductive surface of the silvered, rear glass substrate, to observe such a beneficial effect.

In the context of an electrochromic mirror assembly, a reflective coating, having a thickness in the range of 250 Å to about 2,000 Å, preferably about 1,000 Å, should thereafter be applied to one of the transparent conductive coated glass substrates 2 or 3 in order to form a mirror. Suitable materials for this layer are aluminum, palladium, platinum, titanium, gold, chromium, silver and stainless steel, with silver being preferred. As an alternative to such metal reflectors, multi-coated thin film stacks of dielectric materials or a high index single dielectric thin film coating may be used as a reflector. Alternatively, one of the conductive coatings 4 may be a metallic reflective layer which serves not only as an electrode, but also as a mirror.

It is clear from the teaching herein that should a window, sun roof or the like be desirably constructed, the reflective coating need only be omitted from the assembly so that the light which is transmitted through the transparent panel is not further assisted in reflecting back therethrough.

Similarly, an electrochromic optically attenuating contrast filter may be manufactured in the manner described above, optionally incorporating into the electrochromic assembly an anti-reflective means, such as a coating, on the front surface of the outermost substrate as viewed by an observer (see e.g., Lynam V); an anti-static means, such as a conductive coating, particularly a transparent conductive coating of ITO, tin oxide and the like; index matching means to reduce internal and interfacial reflections, such as thin films of an appropriately selected optical path length; and/or light absorbing glass, such as glass tinted to a neutral density, such as "GRAYLITE" gray tinted glass (commercially available from Pittsburgh Plate Glass Industries, Pittsburgh, Pa.) and "SUNGLAS" Gray gray tinted glass (commercially available from Ford Glass Co., Detroit, Mich.), to augment contrast enhancement. Moreover, polymer interlayers, which may be tinted gray, such as those used in electrochromic constructions as described in Lynam III, may be incorporated into such electrochromic optically attenuating contrast filters.

Electrochromic optical attenuating contrast filters may be an integral part of a device or may be affixed to an already constructed device, such as cathode ray tube monitors. For instance, an optical attenuating contrast filter may be manufactured from a polychromic solid film and then affixed, using a suitable optical adhesive, to a device that should benefit from the properties and characteristics exhibited by the polychromic solid film. Such optical adhesives maximize optical quality and optical matching, and minimize interfacial reflection, and include plasticized polyvinyl butyral, various silicones, polyurethanes such as "NORLAND NOA 65" and "NORLAND NOA 68", and acrylics such as "DYMAX LIGHT-WELD 478". In such contrast filters, the electrochromic compounds are chosen for use in the polychromic solid film so that the electrochromic assembly may color to a suitable level upon the introduction of an applied potential thereto, and no undesirable spectral bias is exhibited. Preferably, the polychromic solid film should dim through a substantially neutral colored partial transmission state to a substantially neutral colored full transmission state.

Polychromic solid films may be used in electrochromic devices, particularly glazings and mirrors, whose functional surface is substantially planar or flat, or that are curved with a convex curvature, a compound curvature, a multi-radius curvature, a spherical curvature, an aspheric curvature, or combinations of such curvature. For example, flat electrochromic automotive mirrors may be manufactured using the polychromic solid films of the present invention. Also, convex electrochromic automotive mirrors may be manufactured, with radii of curvature typically in the range of about 25" to about 250", preferably in the range of about 35" to about 100", as are conventionally known. In addition, multi-radius automotive mirrors, such as those described in U.S. Pat. No. 4,449,786 (McCord), may be manufactured using the polychromic solid films of the present invention. Multi-radius automotive mirrors may be used typically on the driver-side exterior of an automobile to extend the driver's field of view and to enable the driver to safely see rearward and to avoid blind-spots in the rearward field of view. Generally, such mirrors comprise a higher radius (even flat) region closer to the driver and a lower radius (i.e., more curved) region outboard from the driver that serves principally as the blind-spot detection zone in the mirror. Indeed, such polychromic solid film-containing electrochromic multi-radius automotive mirrors may benefit from the prolonged coloration performance of polychromic solid films and/or from the ability to address individual segments in such mirrors. Often, a demarcation means, such as a silk-screened or otherwise applied line of black epoxy, may be used to separate the more curved, outboard blind-spot region from the less curved, inboard region of such mirrors.

The demarcation means may also include an etching of a deletion line or an otherwise established break in the electrical continuity of the transparent conductors used in such mirrors so that either one or both regions may be individually or mutually addressed. Optionally, this deletion line may itself be colored black. Thus, the outboard, more curved region may operate independently from the inboard, less curved region to provide an electrochromic mirror that operates in a segmented arrangement. Upon the introduction of an applied potential, either of such regions may color to a dimmed intermediate reflectance level, independent of the other region, or, if desired, both regions may operate together in tandem.

An insulating demarcation means, such as demarcation lines, dots and/or spots, may be placed within electrochromic devices, such as mirrors, glazings, optically attenuating contrast filters and the like, to assist in creating the interpane distance of the device and to enhance overall performance, in particular the uniformity of coloration across large area devices. Such insulating demarcation means, constructed from, for example, epoxy coupled with glass spacer beads, plastic tape or die cut from plastic tape, may be placed onto the conductive surface of one or more substrates by silk-screening or other suitable technique prior to assembling the device. The insulating demarcation means may be geometrically positioned across the panel, such as in a series of parallel, uniformly spaced-apart lines, and may be clear, opaque, tinted or colorless and appropriate combinations thereof, so as to appeal to the automotive stylist.

If the interpane distance betweenthe substrates is to be, for example, about 250 µm, then the insulating demarcation means (being substantially non-deformable) may be screened, acted or adhered to the conductive surface of a substrate at a lesser thickness, for example, about 150 µm to about 225 µm. Of course, if substantially deformable materials are used as such demarcation means, a greater thickness, for example, about 275 µm to about 325 µm, may be appropriate as well. Alternatively, the insulating demarcation means may have a thickness about equal to that of the interpafle distance of the device, and actually assist in bonding together the two substrates of the device.

In any event, the insulating demarcation means should prevent the conductive surfaces of the two substrates (facing one another in the assembled device) from contacting locally one another to avoid short-circuiting the electrochromic system. Similarly, should the electrochromic device be touched, pushed, impacted and the like at some position, the insulating demarcation means, present within the interpane distance between the substrates, should prevent one of the conductive surfaces from touching, and thereby short-circuiting, the other conductive surface. This may be particularly advantageous when flexible substrates, such as ITO-coated "MYLAR", are used in the electrochromic device.

Although spacers may be added to the electrochromic monomer composition and/or distributed across the conductive surface of one of the substrates prior to assembling the device, such random distribution provides a degree of uncertainty as to their ultimate location within the electrochromic device. By using such a screen-on technique as described above, a more defined and predictable layout of the insulating demarcation means may be achieved. Further, such spacers may be a rigid insoluble spacer material such as glass or be rigid soluble spacer material (such as a polymer such as polycarbonate, polymethylmethacrylate, polystyrene and the like) capable of dissolving in the plasticizer of the monomer composition. For example, rigid, soluble polymer spacer beads can be sprinkled across the conductive surface of a substrate and so help define an interpane spacing when the device is first assembled. Then, when the monomer composition is dispensed into the interpane spacing (after the establishment of the interpane spacing with the assistance of soluble polymer spacers), then over time the soluble spacer beads dissolve in the plasticizer, preferably prior to in situ conversion to the solid polychromic film.

Using such insulating demarcation means, one or both of the substrates, either prior to or after assembly in the device, may be divided into separate regions with openings or voids within the insulating demarcation means interconnecting adjacent regions so as to permit a ready introduction of the electrochromic monomer composition into the assembly.

A demarcation means may be used that is conductive as well, provided that it is of a smaller thickness than the interpane distance and/or a layer of an insulating material, such as a non-conductive epoxy, urethane or acrylic, is applied thereover so as to prevent conductive surfaces from contacting one another and thus short-circuiting the electrochromic assembly. Such conductive demarcation means include conductive frits, such as silver frits like the # 7713 silver conductive frit available commercially from E. I. de Pont de Nemours and Co., Wilmington, Del., conductive paint or ink and/or metal films, such as those disclosed in Lynam IV. Use of a conductive demarcation means, such as a line of the # 7713 silver conductive frit, having a width of about 0.09375" and a thickness of about 50 µm, placed on the conductive surface of one of the substrates of the electrochromic device may provide the added benefit of enhancing electrochromic performance by reducing bus bar-to-bus bar overall resistance and thus enhancing uniformity of coloration, as well as rapidity of response, particularly over large area devices.

Fabrication of electrochrolflic multi-radius/aspheric or spherical/convex mirrors can benefit from single or tandem bending such as is described in copending U.S. patent application Ser. No. 08/429,643, the disclosure of which is hereby incorporated by reference herein. Convex or multi-radius minilites/shapes can, for example, be individually bent [and thereafter ITO coated or metal reflector coated (such as with a chromium metal reflector, a chromium undercoat, rhodium overcoat metal reflector, a chromium undercoat/aluminum overcoat reflector, or their like, such as is described in U.S. patent application Ser. No. 08/429,643, (now U.S. Pat. No. 5,742,187) and then the individual bent minilites/shapes can be selectively sorted so that the best matched pairs from a production batch can be selected. For example, bent convex or aspheric minilites/shapes can be bent in production lots such as of 100 pieces or thereabouts. Thereafter, each individual bent minilite/shape is placed in a vision system where the reflection of a pattern of dots, squares, lines, circles, ovals (or the like) is photographed using a digital camera and the position of individual dots, etc. in the pattern, as reflected off the individual minilite/shape being measured, is captured and stored digitally in a computer storage. Each individual minilite/shape, in turn, is similarly measured and a digital image of the reflected image of each part's pattern is also computer stored. An identifier is allocated to each minilite/shape and to its corresponding computer stored record of the reflected image of the pattern. Next, a computer program finds which combination of two minilites/shapes have most closely matched reflected images of the fixed pattern (which typically is a dot matrix or the like). This is achieved, for example, by finding how close the center of one reflected dot on a given part is located apart from its corresponding dot on another part. For perfectly matched parts, corresponding dots coincide; when they are located apart, then a local mismatch is occurring. Thus, by using a dot matrix of, for example, 10 to 100 dots reflected off a given part, and forming the sum of the squares of the absolute inter-dot distances to give a figure of merit for each putative from match, then minilites/shapes can be selectively sorted by selecting the matched pairs with the lowest inter-dot distances as indicated by the smallest figure of merit. Alternately, a pattern with a measured, pre-established distortion can be designed such that, upon reflection off the convex (or concave) surface of a bent minilite/shape, the pattern is reflected as straight, parallel lines. The equipment suitable to use in a vision system is conventional in the machine vision art and includes a digital camera (such as a charge coupled device (CCD) camera or a video microchip camera (CMOS camera)), a frame grabber/video computer interface, and a computer. Typically the camera is mounted above (typically 1 foot to 4 feet above, or even farther above) the subject minilite/shape, and the camera views through the pattern (that typically is an illuminated light box with the pattern incorporated therein) to view the pattern's reflection off the convex (or, if desired, the concave) surface of the bent part. If desired, optical calculations can be made that allow determination of the actual profile of the bent glass based upon measurements taken and calculated from the pattern's reflection.

Also, an aspheric electrochromic (or a convex electrochromic) mirror can be used as an interior rearview mirror, and can be packaged as a clip-on to an existing vehicular rearview mirror in a manner that is similar to aftermarket wide angle mirrors conventionally known. Such interior aspheric/convex electrochromic mirrors can optionally be solar powered or be powered by a battery pack, for ease of installation in the vehicular aftermarket. Should it be desirable to minimize weight for convex or aspheric inside or outside mirrors, then thin glass (in the thickness range of about 1 mm to about 1.8 mm, or even thinner) can be used for one or both of the substrates used in a laminate electrochromic assembly. Use of such thin glass is described in U.S. patent application Ser. No. 08/429,643 filed Apr. 27, 1995, (now U.S. Pat. No. 5,724,187) the disclosure of which is hereby incorporated by reference herein. Also, cutting of convex and especially aspheric glass can benefit from computer numerical controlled (CNC) cutting where a cutting head is moved under digital computer control. In this regard, a multi-axis CNC cutter is preferred where the cutting head (which may be a diamond tool or wheel, a laser beam, a water jet, an abrasive water jet, or the like) can be moved in three dimensions. Most preferably, and especially for cutting aspheric bent glass, a cutter that moves in three-dimensions but that keeps the cutting tool (such as a diamond wheel) normal (i.e., with a cutting wheel axis at or close to 90° to the tangential plane of the bent glass surface) is preferred. For example, a cutting machine such as available from LASER Maschlnenbau GmbH & Company KG, Grossbetlingen, Germany can be used to cut aspheric glass. In such a system, the bent glass lite/minilite from which the shape is to be cut is mounted on a support arm that is movable in three dimensions and that generally moves in three dimensions either CNC driven, or by following a cam, along the three-dimensional profile of the aspheric shape being cut. Also, the cutting wheel can be adjusted so that its angle relative to a tangent to the glass at point of cut is close to 90° (and not less than about 70°; not less than about 80° more preferred and not less than about 85° most preferred). In this manner, movement of the cutting support under the cutting wheel, in combination with adjustment of the pitch of the cutting wheel itself, maintains as close to normal (i.e., 90°) the cutting angle as possible, and thus achievement of a clean, efficient cut and breakout of the shape. While particularly beneficial for aspheric shapes where the radius can change from about 2000 mm to below 600 mm, and smaller, across the surface of the shape, cutting of convex glass can also benefit from maintenance of a near normal cutting angle for the cutting tool (i.e., cutting wheel).

Optionally, a machine vision system can be utilized to determine the surface profile of the glass to be cut and the data as to the profile is fed back to the cutter's CNC controller to properly orientate the glass under the cutting head. Use of a vision system, such as is described above, to scan and measure the system profile of the glass to be cut can be thus used to determine how much offset there is on the radius of the glass relative to the cutting head. CNC controlled sensors can be automatically adjusted on every cutting cycle based on the information received from the vision system. A five-axis shape cutter that allows the cutting head remain approximately perpendicular to the surface of the glass regardless of the radius of curvature is commercially available, such as from LASER Maschlnenbau GmbH & Company KG, Grossbetlingen, Germany. Also, if desired and particularly for thin glass substrates, the front substrate and/or rear substrate can be toughened or tempered (such as by, for example, chemical tempering or contact tempering) such as described in U.S. Pat. No. 5,239,405 entitled "Near-Infrared Reflecting, Ultraviolet Protected, Safety Protected Vehicular Glazing" invented by N. Lynam and issued Aug. 24, 1993, the disclosure of which is hereby incorporated by reference herein. Also, an exterior mirror of this invention can be attached to the backplate commonly used to mount to the actuator used in an exterior complete mirror assembly (as is commonly known in automotive mirror art) by use of a double-sticky tape such as is described in U.S. Pat. No. 5,572,384 (see supra) or can be attached using a hot melt adhesive that is applied to the rearmost surface of the laminate glass assembly (i.e., the rear surface of the rear glass substrate, often referred to as the fourth surface of the laminate assembly). Preferably, such hot melt adhesive, when cured, is flexible, provides an anti-scatter function meeting automotive safety specification and most preferably, is electrically conductive (such as by inclusion of conductive carbon or conductive metal flakes or fibrils, such as copper, brass, aluminum or steel fibrils).

Also, a heater can be attached to the rearmost surface of the laminate construction formed by sandwiching the electrochromic medium between the first and second (i.e., front and rear) substrates of an electrochromic rearview mirror device. Such heater can be directly applied to the rearmost glass surface, or can be a separate heater pad, such as is disclosed in U.S. patent application Ser. No. 08/429,643 filed Apr. 27, 1995, now U.S. Pat. No. 5,724,187 the disclosure of which is hereby incorporated by reference herein. Preferably, the heater is combined with the mirror reflector mounting plate (also known in the automotive mirror art as the mirror backing plate or the mirror backplate). More preferably, the heater and/or the mirror backing plate is formed (such as by injection molding, extrusion and the like) of a conductive polymer material such as a polymer resin incorporating conductive carbon or conductive metal flakes or fibrils (such as of copper, brass, aluminum, steel or equivalent metal). Most preferably, the heater and the mirror backing plate are formed and attached to the mirror element in an integral molding operation as follows. The mirror reflector glass (that preferably is an electrochromic mirror cell but that, optionally, can be a conventional mirror reflector such as chromed glass) is placed in a mold. A heater (such as a positive temperature coefficient heater pad, or a pad formed from a conductive polymer resin that incorporates metal or carbon conducting particles, or a pad formed from a resin that is intrinsically self-conducting in its resin structure such as a polyaniline resin), is either injection molded onto the rearmost glass surface of the glass reflector element (optionally, with an adhesion promoting primer already applied to the rearmost glass surface and/or with a heat transfer agent applied to the rearmost glass surface), or is attached to the rearmost glass surface (or is already pre-attached to the rearmost glass surface) using a double-sticky tape or a hot melt adhesive (preferably, also conducting and/or of high heat transfer efficiency such as aluminum foil). Finally, a plastic resin is injection molded to form the mirror backing plate (and, optionlly, the bezel around the outer perimeter of an electrochromic sideview mirror sub-assembly as is commonly known in the electrochromic rearview mirror art). The backing plate for the mirror element is the means for attachment to the electrical or manually operated actuator within the complete outside sideview mirror assembly that enables the driver to change the orientation of the mirror reflector when mounted on the vehicle and to select the mirror's alignment relative to the driver and thus select the rearward view that suits that particular driver's needs for field of view rearward. By integral molding, the conventionally separate steps of separately attaching a heater pad to the mirror glass and then attaching a separately formed backing plate can be reduced to a single integral molding step where components, including the mirror glass, are loaded into a mold, plastic resin is injected or plastic resins are co-injected, and a complete sub-assembly (including heater, connectors, busbars, wire leads/wire harnesses, heat distributors, thermistors, thermal cut-off switches, backing plate, bezel, etc.) is unloaded from the tool after completion of the integral molding step.

Further, vehicle warning indicia such as the familiar "OBJECTS MAY BE CLOSER THAN THEY APPEAR" can be created (such as by silk-screening, dispensing, printing, etc.) using a conductive material (such as a conductive ink, conductive paint, conductive polymer and the like). In this way, electrical conductivity is maintained across the full surface of the inward facing surface of the rear substrate (frequently called the third surface). Where a metal reflector (such as a chromium layer or an underlayer of chromium overcoated with a higher reflecting metal layer such as of silver, aluminum or rhodium) is used as a third surface reflector, the metal reflector can first be deposited (such as by sputter deposition utilizing planar magnetron or rotary magnetron cathodes) onto the conductive surface of TEC glass (or any other transparent conductive coated surface). Next, the metal reflector can be selectively removed to form the desired indicia (i.e., a "HEATED" symbol, a manufacturer's date code and ID, a hazard warning indicia such is commonly found on signal mirrors such as are available on MY97 Ford Bronco and Ford Expedition vehicles available from Ford Motor Company, Detroit, Mich. and as described in U.S. Pat. No. 5,207,492 invented by Roberts and issued May 1993, the disclosure of which is hereby incorporated by reference herein). The metal reflector can be removed using chemical etching through a mask or directly using laser scribing (such as with a YAG laser), by controlled sandblasting, and the like. By selectively removing the overlayering metal reflector but leaving the underlying transparent conductor largely intact, electrical conductivity across the third surface (i.e., the inward facing surface of the rear substrate) is largely undistributed, and electrochromic coloration is correspondingly uniform. Should it be desired to read an indicia on a third surface, then backlighting can be provided on the fourth surface (i.e., the non-inward facing surface of the rear substrate) that can be viewed by reading through the indicia created on the third surface by removing a third surface metal reflector. Also, optionally, a conductive indicia of a non-dark color (such as brilliant white) could be created on the second surface (i.e., the inward facing surface of the front substrate) of the laminate electrochromic assembly. Thus, when the electrochromic medium colors, the indicia remains visible as a color contrast against the colored dimmed state of the electrochromic medium. Preferably, and as stated above, the indicia is created from conducting or at least partially conducting material (such as can be achieved using conductive carbon fillers). Alternately, non-conducting non-dark colored indicia can be used on the second surface of the laminate assembly. Preferably, such non-dark colored indicia are bright and somewhat reflecting so that they maintain good color contrast in the dimmed state of the electrochromic mirror.

Once constructed, any of the electrochromic devices described herein may have a molded casing placed there around. This molded casing may be pre-formed and then placed about the periphery of the assembly or, for that matter, injection molded therearound using conventional techniques, including injection molding of thermoplastic materials, such as polyvinyl chloride [see e.g., U.S. Pat. No. 4,139,234 (Morgan)], or reaction injection molding of thermosetting materials, such as polyurethane or other thermosets [see e.g., U.S. Pat. No. 4,561,625 (Weaver)]. Thus, modular automotive glazings incorporating polychromic solid films may be manufactured.

Polychromic solid films may be used in a variety of automotive rearview mirror assemblies including those assemblies described in U.S. patent application Ser. No: (not yet assigned) entitled "Vehicle Blind Spot detection and Display System", invented by Schofield et al. and filed Feb. 12, 1997, the disclosure of which is hereby incorporated herein by reference. Also, they may be used in association with rain sensor interior mirror assemblies wherein a rain sensor functionality, as is commonly known in the automotive art, is provided in association with an interior rearview mirror assembly. Such association includes utilizing an element of the rearview mirror assembly (such as a plastic housing attached, for example, to the mirror channel mount that conventionally attaches the mirror assembly to a windshield button slug) to cover a windshield-contacting rain sensor (such as is described in U.S. Pat. No. 4,973,844 titled "Vehicular Moisture Sensor and Mounting Apparatus Therefor", invented by O'Farrell et al. and issued Nov. 27, 1990, the disclosure of which is hereby incorporated herein by reference), or it may include a non-windshield-contacting rain sensor (such as is described in PCT International Application US 94/05093 entitled "Multi-Function Light Sensor for Vehicle" invented by Dennis J. Hegyl, published as WO 94/27262 on Nov. 24, 1994, the disclosure of which is hereby incorporated by reference herein). The rearview mirror assembly can include a display function (or multiple display functions).

These displays may perform a single display function or multiple display functions such as providing indication of an additional vehicle function, such as a compass mirror display function, a temperature display function, status of inflation of tires display function, a passenger air bag disable display function, an automatic rain sensor operation display function, telephone dial information display function, highway status information display function, blind spot indicator display function, or the like. Such display may be an alpha-numerical display or a multi-pixel display, and maybe fixed or scrolling. Such an automatic rain sensor operation display function may include a display function related to both a windshield-contacting and a non-windshield-contacting rain sensor, including, for example, where the circuitry to control the rain sensor, electrochromic dimming of a variable reflectance electrochromic mirror, and any other mirror-mounted electronic feature are commonly housed in or on a rearview mirror assembly and wholly or partially share components on a common circuit board. The blind spot detection display or the automatic rain sensor operation display may alternate with other display functions by a display toggle which may be manually operated, time-shared, voice-actuated, or under the control of some other sensed function, such as a change in direction of the vehicle or the like. Should a rain sensor control be associated with, incorporated in, or coupled to the interior rearview mirror assembly, the rain sensor circuitry, in addition to providing automatic or semi-automatic control over operation of the windshield wipers (on the front and/or rear windshield of the vehicle), can control the defogger function to defog condensed vapor on an inner cabin surface of a vehicle glazing (such as the inside surface of the front windshield, such as by operating a blower fan, heater function, air conditioning function, or their like), or the rain sensor control can close a sunroof or any other movable glazing should rain conditions be detected. As stated above, it may be advantageous for the rain sensor control (or any other feature such as a head-lamp controller, a remote keyless entry receiver, a cellular phone including its microphone, a vehicle status indicator and the like) to share components and circuitry with the electrochromic mirror function control circuitry and electrochromic mirror assembly itself. Also, a convenient way to mount a non-windshield-contacting rain sensor such as described by Hegyl is by attachment, such as by snap-on attachment, as a module to the mirror channel mount such as is described in U.S. Pat. No. 5,576,678 entitled "Mirror Support Bracket," invented by R. Hook et al. and issued Nov. 19, 1996, the disclosure of which is hereby incorporated by reference herein. The mirror mount and/or windshield button may optionally be specially adapted to accommodate a non-windshield-mounting rain sensor module. Such mounting as a module is readily serviceable and attachable to a wide variety of interior mirror assemblies (both electrochromic and non-electrochromic such as prismatic, manually adjusted mirror assemblies), and can help ensure appropriate alignment of the non-windshield-mounted variety of rain sensor to the vehicle windshield insofar that the module attached to the mirror mount remains fixed whereas the mirror itself (which typically attaches to the mirror channel mount via a single or double ball joint) is movable so that the driver can adjust its field of view. Also, should smoke from cigarettes and the like be a potential source of interference to the operation of the non-windshield-contacting rain sensor, then a mirror-attached housing can be used to shroud the rain sensor unit and shield it from smoke (and other debris). Optionally, such ability to detect presence of cigarette smoke can be used to enforce a non-smoking ban in vehicles, such as is commonly requested by rental car fleet operators. Also, when a rain sensor (contacting or non-contacting) is used to activate the wiper on the rear window (rear backlight) of the vehicle, the sensor can be conveniently packaged and mounted with the CHMSL (center high mounted stop light) stop light assembly commonly mounted on the rear window glass or close to it. Mounting of the rain sensor with the CHMSL stop light can be aesthetically appealing and allow sharing of components/wiring/circuitry.

The electrochromic solid films can be used with interior rearview mirrors equipped with a variety of features such as a high/low (or daylight running beam/low) headlamp controller, a hands-free phone attachment, a video camera for internal cabin surveillance and/or video telephone function, seat occupancy detection, map reading lights, compass/temperature display, fuel level and other vehicle status display, a trip computer, an intrusion detector and the like. Again, such features can share components and circuitry with the electrochromic mirror circuitry and assembly so that provision of these extra features is economical.

Placement of a video camera either at, within, or on the interior rearview mirror assembly (including within or on a module attached to a mirror structure such as the mount that attaches to the windshield button) has numerous advantages. For example, the mirror is centrally and high mounted and so is in a location that has an excellent field of view of the driver, and of the interior cabin in general. Also, it is a defined distance from the driver and so focus of the camera is facilitated. Also, if placed on the movable portion of the mirror assembly, the normal alignment of the mirror reflector relative to the driver's field of vision rearward via the mirror can be used to readily align the video camera to view the head of the driver. Since many interior rearview mirrors are electrically serviced, placement of a camera at within, or on the rearview mirror assembly can be conveniently and economically realized, with common sharing of components and circuitry by, for example, a compass direction function (which may include a flux gate sensor, a magneto-resistive sensor, a magneto-inductive sensor, or a magneto-capacitive sensor), an external temperature display function and the electrochromic dimming function. Although the driver is likely the principal target and beneficiary of the video camera, the video camera field of view can be mechanically or electrically (i.e., via a joystick) adjusted to view other portions/occupants of the vehicle cabin interior. In this regard, the joystick controller that adjusts the position of the reflector on the outside rearview mirrors can, optionally, be used to adjust the video camera field of view as well. The video camera can be a CCD camera or a CMOS based video microchip such as is described in PCT Application No. 94/13227 filed Nov. 17, 1994, the disclosure of which is hereby incorporated by reference herein. For operation at night, the internal cabin of the vehicle may optionally be illuminated with non-visible radiation, such as near-infrared radiation, and the video camera can be responsive to said near-infrared radiation so that a video telephone call can be conducted even when the interior cabin is dark to visible light, such as at night. Also, the video camera mounted at, within or on the inner rearview mirror assembly (such as within the mirror housing or in a pod attached to the mirror mount) can be utilized to capture an image of the face of a potential driver and then, using appropriate image recognition software, decide whether the driver is authorized to operate the vehicle and, only then, enable the ignition system to allow the motor of the vehicle be started. Use of such a mirror-mounted video camera (or a digital still camera) enhances vehicle security and reduces theft. Further, the video camera can monitor the driver while he/she is driving and, by detection of head droop, eye closure, eye pupil change, or the like, determine whether the driver is becoming drowsy/falling asleep, and then activate a warning to the driver to stay alert/wake up. It is beneficial to use a microprocessor to control multiple functions within the interior mirror assembly and/or within other areas of the vehicle (such as the header console area), and such as is described in Irish Patent Application No. 970014 entitled "A Vehicle Rearview Mirror and A Vehicle Control System Incorporating Such Mirror," application date Jan. 9, 1997, the disclosure of which is hereby incorporated by reference herein. Such microprocessor can, for example, control the electrochromic dimming function, a compass direction display and an external temperature display. For example, a user actuatable switch can be provided that at one push turns on a compass/temperature display, on second push changes the temperature display to metric units (i.e., to degrees Celsius), on third push changes to Imperial units (i.e., degrees Fahrenheit) and on fourth push turns off the compass/temperature display, with the microprocessor controlling the logic of the display. Alternately, a single switch actuation turns on the display in Imperial units, the second actuation changes it to metric units, and third actuation turns the display off. Further, the displays and functions described herein can find utility also on outside rearview mirrors. For example, a transducer that receives and/or transmits information to a component of an intelligent highway system (such as is known in the automotive art) can be incorporated into an interior and/or outside rearview mirror assembly. Thus, for example, a transmitter/receiver for automatic toll booth function could be mounted at/within/on an outside sideview mirror assembly. A digital display of the toll booth transaction can be displayed by a display incorporated in the interior rearview mirror assembly. Optionally, a micro printer incorporated within the rearview mirror can print a receipt of the transaction. Similarly, for safety and security on the highways, GPS information, state of traffic information, weather information, telephone number information, and the like may be displayed and transmitted/received via transducers located at, within, or on an interior rearview mirror assembly and/or an outside sideview mirror assembly. Also, the interior rearview mirror assembly can include a link to the Worldwide Web via the INTERNET. Such as via a modem/cellular phone mounted within the vehicle, and preferably, mounted at, within or on the interior rearview mirror assembly. Thus, the driver can interact with other road users, can receive/transmit messages including E-mail, can receive weather and status of highway traffic/conditions, and the like, via a mirror located interface to the INTERNET.

Further, a trainable garage door opener such as a universal garage door opener such as is available from Prince Corporation, Holland, Mich. under the tradename HOMELINK™, or the transmitter for a universal home access system that replaces the switch in a household garage that opens/closes the garage door with a smart switch that is programmable to a household specific code that is of the rolling code type, such as is available from TRW Automotive, Farmington Hills, Mich. under the tradename KWIKLINK™ may be mounted at, within, or on the interior mirror (or, if desired, the outside sideview mirror). Switches to operate such devices (typically up to three separate push type switches, each for a different garage door/security gate/household door) can be mounted on the mirror assembly, preferably user actuatable from the front face of the mirror housing. Preferably, the universal garage door opener HOMELINK™ unit or the universal home access KWIKLINK™ unit is mounted at, within or on the interior rearview mirror assembly. Optionally, such a unit could be mounted at, within or on an outside sideview mirror assembly.

The KWIKLINK™ Universal Home Access System (which operates on a rolling code, such as is commonly known in the home/vehicle security art) comprises a vehicle mounted transmitter and a receiver located in the garage. The KWIKLINK™ system is a low-current device that can be, optionally, operated off a battery source, such as a long life lithium battery. It is also compact and lightweight as executed on a single-or double-sided printed circuit board. The KWIKLINK™ printed circuit board can be mounted within the mirror housing (optionally adhered to a shock absorber comprising a double-sticky tape anti-scatter layer on the rear of the reflector element (prismatic or electrochromic) such as is described in U.S. Pat. No. 5,572,354 entitled "Rear Mirror Assembly", invented by J. Desmond et al. and issued Nov. 5, 1996, the disclosure of which is hereby incorporated by reference herein or may be accommodated within a detachable module, such as the pod described in U.S. Pat. No. 5,576,678 entitled "Mirror Support Bracket", invented by R. Hook et al. and issued Nov. 19, 1996, the disclosure of which is hereby incorporated by reference herein, and with the detachable module attached to the mirror mount or to the mirror button. Mounting the KWIKLINK™ unit in a detachable module has advantages, particularly for aftermarket supply where a battery operated KWIKLINK™ unit can be supplied within a pod housing (with the necessary user actuatable button or buttons mounted on the pod and with the battery being readily serviceable either by access through a trap door and/or by detaching the pad from the mirror mount). By supplying a battery-operated, stand-alone, snap-on, detachable KWIKLINK™ mirror mount pod, the KWIKLINK™ home access system can be readily and economically provided to a broad range of mirrors (including non-electrical mirrors such as base prismatic mirrors, and electrical mirrors such as lighted prismatic mirrors and electo-optic mirrors, such as electrochromic mirrors). Further, a solar panel can be installed on the pod housing to recharge the battery.

Also, the pod module assembly may have a windshield button mount attached thereto or incorporated therein and have, in addition, a structure that replicates the windshield button standard on most vehicles manufactured in the United States. Thus, when a consumer purchases such an aftermarket product, the consumer simply removes the existing interior rearview mirror assembly from the windshield button it is attached to in the vehicle. Then, the consumer attaches the pod module windshield button mount to the windshield button attached to the windshield (this can be achieved either by sliding on and securing with a screwdriver, or by snap-on in a manner conventional in the mirror mounting art). Finally, the consumer now attaches the rearview mirror assembly to the windshield button replication structure that is part of the aftermarket pod module. Since the windshield button shape is largely an industry standard (but the interior rearview mirror mount that attaches thereto is typically not standard), by using this "button on a button" pod module design, an aftermarket product (such as a pod module incorporating a home access transmitter, a universal garage door opener, a security monitor such as a pyroelectric intrusion detector (such as disclosed in U.S. patent application Ser. No. 08/720,237 filed Sep. 26, 1996 (now abandoned), the disclosure of which is hereby incorporated by reference herein), a remote keyless entry receiver, a compass, a temperature and/or clock function and the like) may be readily installed by the vehicle owner, and the existing rearview minor assembly can be readily remounted in the vehicle.

Also, a cellular phone can be incorporated into the interior mirror assembly with its antenna, optionally, incorporated into the outside sideview mirror assembly or into the inside rearview mirror assembly. Such mounting within the mirror assemblies has several advantages including that of largely hiding the cellular phone and antenna from ready view by a potential thief. Further, a seat occupancy detector coupled to an air bag deployment/disable monitor can be located at, within or on the interior rearview mirror assembly. The seat occupancy detector can be a video microchip or CCD camera seat occupancy detector, an ultrasonic detector or a pyroelectric detector, or their combination. Moreover, where more than one rearview mirror is being controlled or operated, or when several vehicle accessories are linked to, for example, an electrochromic interior or outside mirror, interconnections can be multiplexed, as is commonly known in the automotive art. Moreover, where it is desired to display external outdoor temperature within the interior cabin of the vehicle, a temperature sensor (such as a thermocouple or thermistor) can be mounted at, within or on an outside sideview mirror assembly (for example, it can protrude into the slipstream below the lower portion of the sideview mirror housing in a manner that is aesthetically and styling acceptable to the automakers and to the consumer) and with the temperature sensor output connected, directly or by multiplexing to a display (such as a vacuum fluorescent display) located in the interior cabin of the vehicle.

Preferably, the external temperature display is located at, within or on the interior rearview mirror assembly, optionally in combination with another display function such as a compass display (see U.S. patent application Ser. No: not yet assigned, entitled "Vehicle Blind Spot Detection System" invented by K. Schofield et al., and filed Feb. 12, 1997), or as a stand-alone pod attached as a module to a mirror support supper member (see U.S. Pat. No. 5,576,687). Most preferably, the interior and outside mirror assemblies are supplied by the same supplier, using just-in-time sequencing methods, such as is commonly known in the automotive supply art and as is commonly used such as for supply of seats to vehicles. Just-in-time and/or sequencing techniques can be used to supply a specific option (for example, the option of configuring an external temperature display with a base prismatic interior mirror, or with a base electrochromic interior mirror, or with a compass prismatic interior mirror, or with a compass electrochromic interior mirror) for an individual vehicle as it passes down the vehicle assembly line. Thus, the automaker can offer a wide array of options to a consumer from an option menu. Should a specific customer select an external temperature display for a particular vehicle due to be manufactured by an automaker at a particular location on a specific day/hour, then the mirror system supplier sends to the vehicle assembly plant, in-sequence and/or just-in-time, a set of an interior rearview mirror assembly and at least one outside sideview mirror assembly for that particular vehicle being produced that day on the assembly line, and with the outside sideview mirror equipped with an external temperature sensor and with the interior rearview mirror assembly equipped with an external temperature display. Such just-in-time, in-sequence supply (which can be used for the incorporation of the various added features recited supra and below) is facilitated when the vehicle utilizes a car area network such as is described in Irish Patent Application No: 970014 entitled "A Vehicle Rearview Mirror and A Vehicle Control System Incorporating Such Mirror", application date Jan. 9, 1997, the disclosure of which is hereby incorporated by reference herein, or when multiplexing is used, such as is disclosed in U.S. patent application Ser. No. 08/679,681 entitled "Vehicles Mirror Digital Network and Dynamically Interactive Mirror System", invented by O'Farrell et al., and filed Jul. 11, 1996, the disclosure of which is hereby incorporated by reference herein. Also, given that an interior electrochromic mirror can optionally be equipped with a myriad of features (such as map lights, reverse inhibit line, headlamp activation, external temperature display, remote keyless entry control, and the like), it is useful to equip such assemblies with a standard connector (for example, a 10-pin parallel connector) so that a common standard wiring harness can be provided across an automaker's entire product range. Naturally, multiplexing within the vehicle can help alleviate the need for more pins on such a connector, or allow a given pin or set of pins control more than one function.

Polychromic solid films can be used in added feature interior rearview mirror assemblies including those that include a loudspeaker (such as for a vehicle audio system, radio or the like, or for a cellular phone including a video cellular phone). Such loudspeaker may be a high frequency speaker that is mounted at, within, or on the interior rearview mirror assembly (such as within the mirror housing or attached as a module-type pod to the mirror mount such as is described supra) and with its audio output, preferably, directed towards the front windshield of the vehicle so that the windshield itself at least partially reflects the audio output of the speaker (that preferably is a tweeter speaker, more preferably is a compact (such as about 1"×1"×1" in dimensions or smaller), and most preferably utilizes a neodynium magnet core) back into the interior cabin of the vehicle. The interior rearview mirror assembly can also include a microphone and a digital (or a conventional magnetic tape) recorder that can be used by vehicle occupants to record messages and the like. A display can be provided that receives paging information from a pager incorporated in the interior rearview mirror assembly and that displays messages to the driver (preferably via a scrolling display) or to other occupants. The interior rearview mirror assembly can include a digital storage of information such as phone numbers, message reminders, calendar information and the like, that can automatically, or on demand, display information to the driver.

Each of the documents cited in the present teaching is herein incorporated by reference to the same extent as if each document had individually been incorporated by reference.

In view of the above description of the instant invention, it is evident that a wide range of practical opportunities is provided by the teaching herein. The following examples illustrate the benefits and utility of the present invention and are provided only for purposes of illustration, and are not to be construed so as to limit in any way the teaching herein.

EXAMPLES

In each of these examples, we selected random assemblies, fractured the substrates of the assemblies and scraped the polychromic solid film that had formed during the transformation process within the assembly from the broken substrate.

Scatter Safety Aspect of Electrochromic Devices Manufactured With Polychromic Solid Films To demonstrate the safety performance of the electrochromic devices manufactured according to the these examples, we simulated the impact of an accident by impacting the glass substrates of randomly selected devices with a solid object so as to shatter the glass substrates of those devices. We observed that in each instance the shattered glass was held in place by the polychromic solid film such that glass shards from the broken substrates did not separate and scatter from the device.

Stability and Cyclability of Electrochromic Devices Manufactured with Polychromic Solid Films In general, we observed good cycle stability, heat stability, performance under prolonged coloration and ultraviolet stability of the electrochromic devices manufactured with the polychromic solid films of the present invention.

To demonstrate the cycle stability, ultraviolet stability and thermal stability of some of the electrochromic devices manufactured with the polychromic solid films of the present invention, we subjected electrochromic mirrors to (1) 15 seconds color—15 seconds bleach cycles at both room temperature and about 50° C.; (2) ultraviolet stability tests by exposing the electrochromic mirrors to at least about 900 KJ/$m^2$ using a Xenon Weatherometer as per SAE J1960 and (3) thermal stability tests at about 85° C.

In these mirrors, we observed no change of electrochromic performance or degrading of the electrochromic devices after more than about 100,000 cycles (15 seconds color—15 seconds bleach) at room temperature and more than about 85,000 cycles (15 seconds color—15 seconds bleach) at about 50° C., and after exposure to about 900 KJ/$m^2$ of ultraviolet radiation and to about 85° C. for about 360 hours indicating excellent cycle stability and weatherability.

Example 1

In this example, we chose a RMPT-HVBF$_4$ electrochromic pair, in conjunction with a commercially available ultraviolet curable formulation, to illustrate the beneficial properties and characteristics of the polychromic solid films and electrochromic interior automotive mirrors manufactured therewith.

A. Synthesis and Isolation of RMPT

We synthesized 2-methyl-phenothiazine-3-one according to the procedure described in European Patent Publication EP 0 115 394 (Merck Frosst Canada). To reduce MPT to RMPT, we followed the redox procedure described in commonly assigned U.S. patent application Ser. No. 07/935,784 (filed Aug. 27, 1992), now U.S. Pat. No. 5,500,760.

B. Preparation of Electrochromic Monomer Composition

We prepared an electrochromic monomer composition according to the present invention comprising about 3.7% HVBF$_4$ (as a cathodic compound), about 1.6% RMPT (as an anodic compound), both homogeneously dispersed in a combination of about 47.4% propylene carbonate (as the plasticizer) and, as a monomer component, about 52.6% "IMPRUV" (an ultraviolet curable formulation). We thoroughly mixed this electrochromic monomer composition to ensure that a homogeneous dispersion of the components was achieved.

C. Mirror Assembly with Electrochromic Monomer Composition

We assembled interior automotive mirrors from HW-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×37 µm, with a weather barrier of an epoxy resin coupled with spacers of about 37 µm also applied.

We placed into the mirror assemblies the electrochromic monomer composition of Example 1(B), supra, by the vacuum backfilling technique [as described in Varaprasad III, supra].

D. Transformation of Electrochromic Monomer Composition Within Mirror to Polychromic Solid Film Once the electrochromic monomer composition of Example 1(B), supra, was uniformly applied within the mirror assemblies of Example 1(C), supra, we placed the assemblies onto the conveyor belt of a Fusion UV Curing System F-300 B. While the belt advanced initially at a rate of about twenty-five feet per minute, we exposed the assemblies to ultraviolet radiation generated by the D fusion lamp of the F-300 B. We passed the assemblies under the fusion lamp light eight times at that rate, pausing momentarily between passes to allow the assemblies to cool, then eight times at a rate of about fifteen feet per minute again pausing momentarily between passes to allow the assemblies to cool and finally three times at a rate of about ten feet per minute with the aforementioned pausing between passes.

E. Use of Electrochromic Mirror

We applied a potential of about 1.3 volts to one of the electrochromic mirrors, and thereafter observed this mirror to color rapidly and uniformly to a bluish purple color.

In addition, we observed that the high reflectance at the center portion of the mirror was about 71% reflectance which decreased to a low reflectance of about 10.8% when about 1.3 volts was applied thereto. The response time for the reflectance to change from about 70% to about 20% when that potential was applied thereto was about 3.7 seconds. We made this determination by following the SAE J964a standard procedure of the Society of Automotive Engineers, with a reflectometer—set in reflectance mode—equipped with a light source (known in the art as Illuminant A) and a photopic detector assembly interfaced with a data acquisition system.

We also observed that the mirror bleached from about 20% reflectance to about 60% reflectance in a response time of about 7.1 seconds under about a zero applied potential. We noted the bleaching to be uniform, and the bleached appearance to be silvery.

Example 2

In this example, we chose a RMPT-HVBF$_4$ electrochromic pair, in conjunction with a combination of commercially available ultraviolet curable formulations, to illustrate the beneficial properties and characteristics of the polychromic solid film and the electrochromic interior automotive mirrors manufactured therewith by using the sandwich lamination technique.

A. Preparation of Electrochromic Monomer Composition

We prepared an electrochromic monomer composition comprising by weight about 2.6% HVBF$_4$ (as a cathodic compound), about 1.2% RMPT (as an anodic compound), both homogeneously dispersed in a combination of about 40% propylene carbonate (as a plasticizer) and, in combination as a monomer component, about 50% "QUICK CURE" B-565 (an acrylated urethane/ultraviolet curable formulation) and about 10% "ENVIBAR" UV 1244 (a cycloalkyl epoxide/ultraviolet curable formulation). We thoroughly mixed this electrochromic monomer composition to ensure that a homogeneous dispersion of the components was achieved.

B. Mirror Assembly With Electrochromic Monomer Composition

In this example, we assembled interior automotive mirrors by dispensing a portion of the electrochromic monomer composition of Example 2(A), supra, onto the conductive surface of a tin oxide-coated glass substrate (the other surface of the substrate being silver-coated so as to form a mirror) onto which we also placed 37 µm glass beads, and then positioned thereover the conductive surface of a clear, tin oxide-coated glass substrate. These glass substrates, commercially available under the trade name "TEC-Glass" products as "TEC-20" from Libbey-Owens-Ford Co., Toledo, Ohio, having dimensions of about 3"×6", were assembled to form an interpane distance between the glass substrates of about 37 µm. In this way, the electrochromic monomer composition was located between the conductive surface of the two glass substrates of the mirror assemblies.

C. Transformation of Electrochromic Monomer Composition within Mirror to Polychromic Solid Film Once the electrochromic monomer composition of Example 2(A), supra, was uniformly applied within the mirror assemblies of Example 2(B), supra, we placed the assemblies onto the conveyor belt of a Fusion UV Curing System F-300 B. While the belt advanced initially at a rate of about twenty feet per minute, we exposed the assemblies to ultraviolet radiation generated by the D fusion lamp of the F-300 B. We passed the assemblies under the fusion lamp light twelve times at that rate, pausing between every third or fourth pass to allow the assemblies to cool.

D. Use of Electrochromic Mirrors

We applied a potential of about 1.3 volts to one of the mirrors, and thereafter observed that the mirror colored rapidly and uniformly to a bluish purple color.

In addition, we observed that the high reflectance at the center portion of the mirror was about 57% reflectance which decreased to a low reflectance of about 9.3%. The response time for the reflectance to change from about 55% to about 20% was about 10 seconds when a potential of about 1.3 volts was applied thereto. We made this determination by the reflectometer described in Example 1, supra.

We also observed that the mirror bleached from about 10% reflectance to about 50% reflectance in a response time of about 56 seconds under about zero applied potential. We noted the bleaching to be uniform, and the bleached appearance to be silvery.

Example 3

In this example, we compared the beneficial properties and characteristics of a polychromic solid film prepared using ferrocene as an anodic electrochromic compound, and manufactured within an exterior automotive mirror

[Example 3(B)(1) and (D)(1), infra] and interior automotive mirrors [Example 3(B)(2) and (D)(2), infra]. We also installed an interior automotive mirror as a rearview mirror in an automobile to observe its performance under conditions attendant with actual automotive use.

A. Preparation of Electrochromic Monomer Composition

We prepared an electrochromic monomer composition comprising by weight about 4.4% $EVClO_4$ (as a cathodic compound), about 2% ferrocene (as an anodic compound), both homogeneously dispersed in a combination comprising, in combination as the plasticizer component, about 48.6% propylene carbonate and about 8.8% cyanoethyl sucrose and, in combination as a monomer component, about 17.7% caprolactone acrylate and about 13.3% polyethylene glycol diacrylate (400). We also added about 0.9% benzoin i-butyl ether (as a photoinitiator) and about 4.4% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

1. Exterior Automotive Mirror

We assembled exterior automotive mirrors from HW-ITO coated glass substrates (where the conductive surface of each glass substrate faced one another), with both the clear, front glass and the silvered, rear glass having a sheet resistance of about 15 ohms per square. The dimensions of the mirror assemblies were about 3.5"×5.5"×74 μm, with a weather barrier of an epoxy resin coupled with spacers of about 74 μm also applied.

We placed into these mirror assemblies the electrochromic monomer composition of Example 3(A), supra, using the vacuum backfilling technique [as described in Varaprasad III, supra].

2. Interior Automotive Mirror

We assembled interior automotive mirrors from HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×44 μm, with a weather barrier of an epoxy resin coupled with spacers of about 44 μm also applied.

We placed into these mirror assemblies the electrochromic monomer composition of Example 3(A), supra, using the vacuum backfilling technique [as described in Varaprasad III, supra].

C. Transformation of Electrochromic Monomer Composition Within Mirror to Polychromic Solid Film Once the electrochromic monomer composition of Example 3(A), supra, was uniformly applied within each of the respective mirror assemblies of Example 3(B)(1) and (2), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.3 volts to one of the electrochromic mirrors of Example 3(B), supra, and to two of the electrochromic mirrors of Example 3(C), supra. Our observations follow.

1. Exterior Automotive Mirror

We observed that the electrochromic mirror colored rapidly and uniformly to a blue color with a greenish hue.

In addition, we observed that the high reflectance at the center portion of the exterior mirror decreased from about 80.5% to about 5.7%, with a change in the reflectance of about 70% to about 20% in a response time of about 5.0 seconds when a potential of about 1.3 volts was applied thereto. We made this determination by the reflectometer described in Example 1, supra.

We also observed that the mirror bleached from about 10% reflectance to about 60% reflectance in a response time of about 9.2 seconds, under about a zero applied potential. We noted the bleaching to be uniform, and the bleached appearance to be silvery.

2. Interior Automotive Mirror

We observed that each of a first and second electrochromic mirror colored rapidly and uniformly to a blue color with a greenish hue.

In addition, we observed that for the first mirror the high reflectance at the center portion of the interior mirror decreased from about 80.2% to about 6.3%, with a change in the reflectance of about 70% to about 20% in a response time of about 3.1 seconds when a potential of about 1.3 volts was applied thereto. The second mirror exhibited comparable results, with the reflectance decreasing from about 78.4% to about 7.5% in about 2.7 seconds. We made these determinations by the reflectometer described in Example 1, supra.

We also observed that the first mirror bleached from about 10% reflectance to about 60% reflectance in a response time of about 3.9 seconds under about a zero applied potential, and the second mirror bleached to the same extent in about 3.6 seconds. We noted the bleaching to be uniform, and the bleached appearance to be silvery.

We have successfully installed and operated such an electrochromic mirror in an automobile as a rearview mirror and achieved excellent results.

Example 4

In this example, we chose t-butyl ferrocene as the anodic electrochromic compound together with a monomer component containing the combination of a monomer and a commercially available ultraviolet curable formulation to illustrate the beneficial properties and characteristics of the polychromic solid films made therefrom and the electrochromic interior automotive mirrors manufactured therewith.

A. Preparation of Electrochromic Monomer Composition

We prepared an electrochromic monomer composition comprising by weight about 3.9% $EVClO_4$ (as a cathodic compound), about 2.3% t-butyl ferrocene (as an anodic compound), both homogeneously dispersed in a combination comprising about 61.7% propylene carbonate (as a plasticizer) and, in combination as a monomer component, about 10.7% caprolactone acrylate and about 10.6% "SARBOX" acrylate resin (SB 500) (an ultraviolet curable formulation). We also added about 1.3% "IRGACURE" 184

(as a photoinitiator) and about 4.4% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled interior automotive mirrors from HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 4(A), supra, using the vacuum backfilling technique [as described in Varaprasad III, supra].

C. Transformation of Electrochromic Monomer Composition Within Mirror to Polychromic Solid Film Once the electrochromic monomer composition of Example 4(A), supra, was uniformly applied within the mirror assemblies of Example 4(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.3 volts to one of the electrochromic mirrors of Example 4(B) and (C), supra, and observed this mirror to color rapidly and uniformly to a blue color with a greenish hue.

In addition, we observed that the high reflectance at the center portion of the mirror was about 79.3% reflectance which decreased to a low reflectance of about 9.8% when about 1.3 volts was applied thereto. The response time for the reflectance to change from about 70% to about 20% when that potential was applied thereto was about 2.3 seconds. We made this determination by the reflectometer described in Example 1, supra.

We also observed that the mirror bleached from about 10% reflectance to about 60% reflectance in a response time of about 3.0 seconds under about a zero applied potential. We noted the bleaching to be uniform.

Examples 5 through 8

In Examples 5 through 8, we compared the beneficial properties and characteristics of polychromic solid films prepared from ferrocene, and three alkyl derivatives thereof, as the anodic electrochromic compound and manufactured within interior automotive mirrors.

Example 5

A. Preparation of Electrochromic Monomer Composition

We prepared an electrochromic monomer composition according to the present invention comprising about 3.5% $EVClO_4$ (as a cathodic compound), about 2.1% dimethyl ferrocene (as an anodic compound), both homogeneously dispersed in a combination of about 51.5% propylene carbonate (as a plasticizer) and about 34.3% "QUICK CURE" B-565 (as a monomer component). We also added about 8.6% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled interior automotive mirrors from HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 5(A), supra, using the vacuum backfilling technique [as described in Varaprasad III, supra].

C. Transformation of Electrochromic Monomer Composition Within Mirror to Polychromic Solid Film Once the electrochromic monomer composition of Example 5(A), supra, was uniformly applied within the mirror assemblies of Example 5(B), supra, we placed the assemblies onto the conveyor belt of a Fusion UV Curing System F-300 B, and exposed the assemblies to ultraviolet radiation in the same manner as described in Example 2(C), supra.

D. Use of Electrochromic Mirror

We applied a potential of about 1.3 volts to one of the electrochromic mirrors, and thereafter observed this mirror to color rapidly and uniformly to a blue color with a greenish hue.

In addition, we observed that the high reflectance at the center portion of the mirror was about 71.9% reflectance which decreased to a low reflectance of about 7.5% when about 1.3 volts was applied thereto. The response time for the reflectance to change from about 70% to about 20% when that potential was applied thereto was about 2.4 seconds. We made this determination by the reflectometer described in Example 1, supra.

We also observed that the mirror bleached from about 10% reflectance to about 60% reflectance in a response time of about 4.2 seconds under about a zero applied potential. We noted the bleaching to be uniform.

Example 6

A. Preparation of Electrochromic Monomer Composition

We prepared an electrochromic monomer composition according to the present invention comprising about 3.5% $EVClO_4$ (as a cathodic compound), about 2.3% n-butyl ferrocene (as an anodic compound), both homogeneously dispersed in a combination of about 51.3% propylene carbonate (as a plasticizer) and about 34.3% "QUICK CURE" B-565 (as a monomer component). We also added about 8.6% "UVINUL" N 35 (as an ultraviolet stabilizing agent), and thoroughly mixed this electrochromic monomer composition to ensure that a homogeneous dispersion of the components was achieved.

B. Mirror Assembly with Electrochromic Monomer Composition

We assembled interior automotive mirrors from HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 6(A), supra, using the vacuum backfilling technique [as described in Varaprasad III, supra].

C. Transformation of Electrochromic Monomer Composition Within Mirror to Polychromic Solid Film Once the electrochromic monomer composition of Example 6(A), supra, was uniformly applied within the mirror assemblies of Example 6(B), supra, we placed the assemblies onto the conveyor belt of a Fusion UV Curing System F-300 B, and exposed the assemblies to ultraviolet radiation in the same manner as described in Example 2(C), supra.

D. Use of Electrochromic Mirror

We applied a potential of about 1.3 volts to one of the electrochromic mirrors, and thereafter observed this mirror to color rapidly and uniformly to a blue color with a greenish hue.

In addition, we observed that the high reflectance at the center portion of the mirror was about 73.8% reflectance which decreased to a low reflectance of about 7.8% when about 1.3 volts was applied thereto. The response time for the reflectance to change from about 70% to about 20% when that potential was applied thereto was about 2.5 seconds. We made this determination by the reflectometer described in Example 1, supra.

We also observed that the mirror bleached from about 10% reflectance to about 60% reflectance in a response time of about 4.3 seconds under about a zero applied potential. We noted the bleaching to be uniform.

Example 7

A. Preparation of Electrochromic Monomer Composition

We prepared an electrochromic monomer composition according to the present invention comprising about 3.5% EVClO$_4$ (as a cathodic compound), about 2.3% t-butyl ferrocene (as an anodic compound), both homogeneously dispersed in a combination of about 51.3% propylene carbonate (as a plasticizer) and about 34.3% "QUICK CURE" B-565 (as a monomer component). We also added about 8.6% "UVINUL" N 35 (as an ultraviolet stabilizing agent), and thoroughly mixed this electrochromic monomer composition to ensure that a homogeneous dispersion of the components was achieved.

B. Mirror Assembly with Electrochromic Monomer Composition

We assembled interior automotive mirrors from HWG-ITO coated glass substrates (where the conductive surface of each glass substrate faced one another), with the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 7(A), supra, using the vacuum backfilling technique [as described in Varaprasad III, supra].

C. Transformation of Electrochromic Monomer Composition Within Mirror to Polychromic Solid Film Once the electrochromic monomer composition as of Example 7(A), supra, was uniformly applied within the mirror assemblies of Example 7(B), supra, we placed the assemblies onto the conveyor belt of a Fusion UV Curing System F-300 B, and exposed the assemblies to ultraviolet radiation in the same manner as described in Example 2(C), supra.

D. Use of Electrochromic Mirror

We applied a potential of about 1.3 volts to one of the electrochromic mirrors, and thereafter observed this mirror to color rapidly and uniformly to a blue color with greenish hue.

In addition, we observed that the high reflectance at the center portion of the mirror was about 73.1% reflectance which decreased to a low reflectance of about 7.8% when about 1.3 volts was applied thereto. The response time for the reflectance to change from about 70% to about 20% when that potential was applied thereto was about 2.5 seconds. We made this determination by the reflectometer described in Example 1, supra.

We also observed that the mirror bleached from about 10% reflectance to about 60% reflectance in a response time of about 4.3 seconds under about a zero applied potential. We noted the bleaching to be uniform.

Example 8

A. Preparation of Electrochromic Monomer Composition

We prepared an electrochromic monomer composition according to the present invention comprising about 3.5% EVClO$_4$ (as a cathodic compound), about 1.8% ferrocene (as an anodic compound), both homogeneously dispersed in a combination of about 51.8% propylene carbonate (as a plasticizer) and about 34.3% "QUICK CURE" B-565 (as a monomer component). We also added about 8.6% "UVINUL" N 35 (as an ultraviolet stabilizing agent), and thoroughly mixed this electrochromic monomer composition to ensure that a homogeneous dispersion of the components was achieved.

B. Mirror Assembly with Electrochromic Monomer Composition

We assembled interior automotive mirrors from HWG-ITO coated glass substrates (where the conductive surface of each glass substrate faced one another), with the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 8(A), supra, using the vacuum backfilling technique [as described in Varaprasad III, supra].

C. Transformation of Electrochromic Monomer Composition Within Mirror to Polychromic Solid Film Once the electrochromic monomer composition of Example 8(A), supra, was uniformly applied within the mirror assemblies of Example 8(B), supra, we placed the assemblies onto the conveyor belt of a Fusion UV Curing System F-300 B. and exposed the assemblies to ultraviolet radiation in the same manner as described in Example 2(C), supra.

D. Use of Electrochromic Mirror

We applied a potential of about 1.3 volts to one of the electrochromic mirrors, and thereafter observed this mirror to color rapidly and uniformly to a blue color with a greenish hue.

In addition, we observed that the high reflectance at the center portion of the mirror was about 72.7% reflectance which decreased to a low reflectance of about 7.9% when about 1.3 volts was applied thereto. The response time for the reflectance to change from about 70% to about 20% when that potential was applied thereto was about 2.7 seconds. We made this determination by the reflectometer described in Example 1, supra.

We also observed that the mirror bleached from about 10% reflectance to about 60% reflectance in a response time of about 4.8 seconds under about a zero applied potential. We noted the bleaching to be uniform.

Example 9

A. Preparation of Electrochromic Monomer Composition

We prepared an electrochromic monomer composition comprising by weight about 3.9% $EVClO_4$ (as a cathodic compound), about 1.2% t-butyl ferrocene and about 1.0% DMPA (in combination as the anodic compound), homogeneously dispersed in a combination comprising about 45% propylene carbonate, about 8.9% cyanoethyl sucrose and about 8.9% 3-hydroxypropionitrile (in combination as a plasticizer component) and, in combination as a monomer component, about 17.7% caprolactone acrylate, about 11.5% polyethylene glycol diacrylate (400) and about 1.8% 1,6-hexanediol diacrylate. We also added about 0.9% "IRGACURE" 184 (as a photoinitiator) and about 4.4% "UVINUL N 35" (as an ultraviolet stabilizing agent), and we thoroughly mixed this electrochromic monomer composition to ensure that a homogeneous dispersion of the components was achieved.

B. Mirror Assembly with Electrochromic Monomer Composition

We assembled interior automotive mirrors from HWG-ITO coated glass substrates (where the conductive surface of each glass substrate faced one another), with the clear, front glass and the silvered, rear glass having a sheet resistance of about 15 ohms per square. The dimensions of the mirror assemblies were about 2.5"×10"×44 µm, with a weather barrier of an epoxy resin coupled with spacers of about 44 µm also applied.

We placed into these mirror assemblies the electrochromic monomer composition of Example 9(A), supra, using the vacuum backfilling technique [as described in Varaprasad III, supra].

C. Transformation of Electrochromic Monomer Composition Within Mirror to Polychromic Solid Film Once the electrochromic monomer composition of Example 9(A), supra, was uniformly applied within the mirror assemblies of Example 9(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.3 volts to one of the electrochromic mirrors, and thereafter observed that the mirror colored rapidly and uniformly to a bluish green color.

In addition, we observed that the high reflectance at the center portion of the mirror was about 78.2% decreased to a low reflectance of about 8.2%, with a change in the reflectance of about 70% to about 20% in a response time of about 1.9 seconds when a potential of about 1.3 volts was applied thereto. We made this determination by the reflectometer described in Example 1, supra.

We also observed that the mirror bleached from about 10% reflectance to about 60% reflectance in a response time of about 5.4 seconds under about a zero applied potential. We noted the bleaching to be uniform.

Example 10

In this example, like Example 2, we chose to illustrate the sandwich lamination technique of manufacturing electrochromic devices to demonstrate its efficiency in the context of the present invention.

A. Preparation of Electrochromic Monomer Composition

We prepared an electrochromic monomer composition comprising by weight about 3.0% $EVClO_4$ (as a cathodic compound), about 1.9% t-butyl ferrocene (as an anodic compound), both homogeneously dispersed in a combination of about 31.7% propylene carbonate (as a plasticizer), and, in combination as a monomer component, about 31.7% "QUICK CURE" B-565 and about 31.7% Urethane Acrylate (Soft) (CN 953). We thoroughly mixed this electrochromic monomer composition to ensure that a homogenous dispersion of the components was achieved.

B. Mirror Assembly With Electrochromic Monomer Composition

We assembled rectangular mirrors by dispensing a portion of the electrochromic monomer composition of Example 10(A), supra, onto the conductive surface of a silvered "TEC-20" glass substrate onto which we also placed 150 µm glass beads, and then positioned thereover the conductive surface of a clear "TEC-20" glass substrate. We assembled these glass substrates, having dimensions of about 5.5"×7", under moderate pressure to form an interpane distance between the glass substrates of about 150 µm. In this way, the electrochromic monomer composition was located between the conductive surfaces of the two glass substrates of the mirror assemblies.

C. Transformation of Electrochromic Monomer Composition Within Mirror to Polychromic Solid Film Once the electrochromic monomer composition of Example 10(A), supra, was uniformly applied within the mirror assemblies of Example 10(B), supra, we placed the assemblies onto the conveyor belt of a Fusion UV Curing System F-300 B, and exposed the assemblies to ultraviolet radiation in the same manner as described in Example 2(C), supra.

D. Use of Electrochromic Mirrors

We applied a potential of about 1.3 volts to one of the electrochromic mirror, and thereafter observed that the mirror colored rapidly and uniformly to a greenish blue color.

In addition, we observed that the high reflectance at the center portion of the mirror was about 66.7% reflectance which decreased to a low reflectance of about 5.8%. The response time for the reflectance to change from about 60% to about 5.9% was about 30 seconds when a potential of about 1.3 volts was applied thereto. We made this determination by the reflectometer described in Example 1, supra.

We also observed that the mirror bleached from about 5.9% reflectance to about 60% reflectance in a response time of about 180 seconds under about zero applied potential.

Example 11

In this example, we chose to illustrate the beneficial properties and characteristics of the polychromic solid films manufactured within electrochromic glazings, that may be used as small area transmissive devices, such as optical filters and the like.

A. Preparation of Electrochromic Monomer Composition

We prepared an electrochromic monomer composition comprising by weight about 2.5% $HVBF_4$ (as a cathodic compound), about 1.1% MPT having been previously reduced by contacting with zinc [see Varaprasad IV and commonly assigned U.S. patent application Ser. No. 07/935,784, now U.S. Pat. No. 5,500,760] (as an anodic compound), both homogeneously dispersed in a combination comprising, in combination as a plasticizer, about 47.7% propylene carbonate and about 1% acetic acid, and about 47.7% "QUICK CURE" B-565 (as a monomer component). We thoroughly mixed this electrochromic monomer composition to ensure that a homogeneous dispersion of the components was achieved.

B. Glazing Assembly With Electrochromic Monomer Composition

We assembled electrochromic glazings from HW-ITO coated glass substrates (where the conductive surface of each glass substrate faced one another), with the glass having a sheet resistance of about 15 ohms per square. The dimensions of the glazing assemblies were about 2.5"×10"×53 $\mu$m, with a weather barrier of an epoxy resin coupled with spacers of about 53 $\mu$m also applied.

We placed into these glazing assemblies the electrochromic monomer composition of Example 11(A), supra, using the vacuum backfilling technique [as described in Varaprasad III, supra].

C. Transformation of Electrochromic Monomer Composition Within Glazing to Polychromic Solid Film Once the electrochromic composition of Example 11(A), supra, was uniformly applied within the glazing assemblies of Example 11(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Glazing

We applied a potential of about 1.3 volts to the electrochromic glazings of Example 11(B) and (C), supra. We observed that the electrochromic glazings colored rapidly and uniformly to a bluish purple color.

In addition, we observed that the high transmission at the center portion of the glazing decreased from about 79.2% to about 7.4%, with a changed transmission of about 70% to about 20% in a response time of about 4.4 seconds when a potential of about 1.3 volts was applied thereto. We made this determination by the detection method described in Example 1, supra, except that the reflectometer was set in transmission mode.

We also observed that the glazing bleached from about 15% transmission to about 60% transmission in a response time of about 8.4 seconds, under about a zero applied potential. We noted good cycle stability, ultraviolet stability and thermal stability.

Example 12

A. Preparation of Electrochromic Monomer Composition

We prepared an electrochromic monomer composition comprising by weight about 3.7% $HVBF_4$ (as a cathodic compound), about 1.6% RMPT (as an anodic compound), both homogeneously dispersed in a combination comprising about 46.2% 3-hydroxypropionitrile (as a plasticizer), and, in combination as a monomer component, about 23.1% 2-(2-ethoxyethoxy)-ethylacrylate and about 23.1% tetraethylene glycol diacrylate. We also added about 2.3% "ESA-CURE" TZT (as a photoinitiator), and thoroughly mixed this electrochromic monomer composition to ensure that a homogeneous dispersion of the components was achieved.

B. Mirror Assembly With Electrochromic Monomer Composition

We assembled electrochromic mirrors from "TEC-20" glass substrates (where the conductive surface of each glass substrate faced one another), having dimensions of about 2.5"×10"×37 $\mu$m, with a weather barrier of an epoxy resin coupled with spacers of about 37 $\mu$m also applied.

We placed into these mirror assemblies the electrochromic monomer composition of Example 12(A), supra, using the vacuum backfilling technique [as described in Varaprasad III, supra].

C. Transformation of Electrochromic Monomer Composition Within Mirror to Polychromic Solid Film Once the electrochromic monomer composition of Example 12(A), supra, was uniformly applied within the mirror assemblies of Example 12(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.3 volts to one of the electrochromic mirrors of Example 12(B) and (C), supra, and observed this mirror to color rapidly and uniformly to a bluish purple color.

In addition, we observed that the high reflectance at the center portion of the mirror was about 68.4% reflectance which decreased to a low reflectance of about 13.3% when about 1.3 volts was applied thereto. The response time for the reflectance to change from about 65% to about 20% when that potential was applied thereto was about 3.0 seconds. We made this determination by the reflectometer described in Example 1, supra.

We also observed that the mirror bleached from about 15% reflectance to about 60% reflectance in a response time of about 3.0 seconds under about a zero applied potential. We noted the bleaching to be uniform, and the bleached appearance to be silvery.

Example 13

In this example, we chose to illustrate the beneficial properties and characteristics of polychromic solid films manufactured within electrochromic glazings consisting of sun roofs using a compatibilizing plasticizer component. Also, in this example, we chose to formulate the electrochromic monomer composition with an additional monomer having polyfunctionality as a compatibilizing agent for the polychromic solid film.

A. Preparation of Electrochromic Monomer Composition

We prepared an electrochromic monomer composition according to the present invention comprising about 4.0% $HVBF_4$ (as a cathodic compound), about 1.7% RMPT (as an anodic compound), both homogeneously dispersed in a combination comprising, in combination as a plasticizer, about 10.2% propylene carbonate, about 17% benzyl acetone and about 14.7% cyanoethyl sucrose, and, in combination as a monomer component, about 33.5% "QUICK CURE" B-565 and about 18.9% polyethylene glycol diacrylate (400). We thoroughly mixed this electrochromic monomer composition to ensure that a homogeneous dispersion of the components was achieved.

B. Glazing Assembly with Electrochromic Monomer Composition

We constructed a glazing assembly consisting of a sun roof model by dispensing a portion of the electrochromic monomer composition of Example 13(A), supra, onto the conductive surface of a "TEC-10" glass substrate onto which we also placed 100 µm glass beads, and then positioned thereover another "TEC-10" glass substrate, so that the electrochromic monomer composition was between and in contact with the conductive surface of the two glass substrates. We used "TEC-10" glass substrates having dimensions of about 6"×16.5", with bus bars attached at the lengthwise side of the substrates to create a distance therebetween of about 16.5". The interpane distance between the "TEC-10" glass substrates was about 100 µm.

C. Transformation of Electrochromic Monomer Composition Within Glazing Assembly to Polychromic Solid Film Once the electrochromic monomer composition of Example 13(A), supra, was uniformly applied within the glazing assembly of Example 13(B), supra, we placed the assembly onto the conveyor belt of a Fusion UV Curing System F-300 B, and exposed the assembly to ultraviolet radiation in the same manner as described in Example 2(C), supra.

D. Use of Electrochromic Glazing Assembly

We applied a potential of about 1.3 volts to the glazing assembly, and thereafter observed the assembly to color rapidly and uniformly to a bluish purple color.

In addition, we observed that the high transmission at the center portion of the glazing assembly was about 60.7% transmission which decreased to a low transmission of about 6.0% when about 1.3 volts was applied thereto. The response time for the transmission to change from about 60% to about 10% when that potential was applied thereto was about 3.8 minutes. We made this determination by the detection method described in Example 1, supra, except that the reflectometer was set in transmission mode.

We also observed that the glazing assembly bleached from about 10% transmission to about 45% transmission in a response time of about 4.2 minutes under about a zero applied potential.

Example 14

In this example, we chose to manufacture large area electrochromic mirrors, by the two hole filling technique, to demonstrate the beneficial properties and characteristics of the polychromic solid films within large truck mirrors.

A. Preparation of Electrochromic Monomer Composition

We prepared an electrochromic monomer composition comprising by weight about 1.9% $EVClO_4$ (as a cathodic compound), about 1.2% RMPT (as an anodic compound), both homogeneously dispersed in a combination comprising about 53.3% propylene carbonate (as a plasticizer) and about 43.6% "QUICK CURE" B-565 (as a monomer component). We thoroughly mixed this electrochromic monomer composition to ensure that a homogeneous dispersion of the components was achieved.

B. Mirror Assembly with Electrochromic Monomer Composition

We assembled large truck mirrors from FW-ITO glass substrates (where the conductive surface of each glass substrate faced one another), with the clear, front glass and the silvered, rear glass having a sheet resistance of about 6 to about 8 ohms per square. The dimensions of the mirror assemblies were about 6.5"×15"×44 µm, with a weather barrier of an epoxy resin coupled with spacers of about 44 µm also applied.

We placed into these mirror assemblies the electrochromic monomer composition of Example 14(A), supra, using the vacuum backfilling technique [as described in Varaprasad III, supra].

C. Transformation of Electrochromic Monomer Composition Within Mirror to Polychromic Solid Film Once the electrochromic monomer composition of Example 14(A), supra, was uniformly applied within the truck mirror assemblies of Example 14(B), supra, we placed the assemblies onto the conveyor belt of a Fusion UV Curing System F-300 B, and exposed the assemblies to ultraviolet radiation in the same manner as described in Example 2(C), supra.

D. Use of Electrochromic Mirror

We applied a potential of about 1.3 volts to one of the electrochromic truck mirrors, and thereafter observed that the mirror colored rapidly and uniformly to a bluish purple color.

In addition, we observed that the high reflectance at the center portion of the mirror was about 67.4% decreased to a low reflectance of about 7.9%, with a changed reflectance of about 65% to about 20% in a response time of about 7.1 seconds when a potential of about 1.3 volts was applied thereto. We made this determination by the reflectometer described in Example 1, supra.

We also observed that the mirror bleached from about 10% reflectance to about 55% reflectance in a response time of about 15.0 seconds under about a zero applied potential, and to its high reflectance shortly thereafter.

The electrochromic truck mirrors performed satisfactorily with its long axis positioned in vertical alignment with the ground.

Example 15

In this example, we have illustrated that the electrochromic monomer composition may be prepared in stages and thereafter used to manufacture polychromic solid films, and electrochromic devices manufactured with same, that demonstrates the beneficial properties and characteristics herein described. Also, in this example, like Examples 12 and 13, supra, we chose to formulate the electrochromic monomer composition with a difunctional monomer component to illustrate the properties and characteristics attendant with the addition of that component.

A. Preparation of Electrochromic Monomer Composition

The electrochromic monomer composition of this example comprised by weight about 3.9% $EVClO_4$ (as a cathodic compound), about 2.3% t-butyl ferrocene (as an anodic compound), both homogeneously dispersed in a combination of about 62% propylene carbonate (as the plasticizer), and, in combination as a monomer component, about 20% caprolactone acrylate and about 6.5% polyethylene glycol diacrylate (400). We also added about 0.9% "IRGACURE" 184 (as a photoinitiator) and about 4.4% "UVINUL" N 35 (as an ultraviolet stabilizing agent), and thoroughly mixed this electrochromic monomer composition to ensure that a homogeneous dispersion of the components was achieved.

We prepared the above composition by first combining the propylene carbonate, caprolactone acrylate, polyethylene glycol diacrylate (400) and "IRGACURE" 184, with stirring and bubbling nitrogen gas through the combination, and initiating cure by exposing this combination to a source of fluorescent light at room temperature for a period of time of about 10 minutes. At this point, we removed the source of fluorescent light, and combined therewith the $EVClO_4$, t-butyl ferrocene and "UVINUL" N 35 to obtain a homogeneously dispersed electrochromic monomer composition. We monitored the extent of cure by the increase of viscosity.

B. Mirror Assembly With Electrochromic Monomer Composition

We assembled interior automotive mirrors with HWG-ITO coated glass substrates (where the conductive surface of each glass substrate faced one another), with the clear, front glass and the silvered, rear glass having a sheet resistance of about 15 ohms per square. The dimensions of the mirror assemblies were about 2.5"×10"×53 $\mu$m, with a weather barrier of an epoxy resin coupled with spacers of about 53 $\mu$m also applied.

We placed into these mirror assemblies the electrochromic monomer composition of Example 15(A), supra, using the vacuum backfilling technique [as described in Varaprasad III, supra].

C. Transformation of Electrochromic Monomer Composition Within Mirror to Polychromic Solid Film Once the electrochromic monomer composition of Example 15(A), supra, was uniformly applied within the mirror assemblies of Example 15(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirrors

We applied a potential of about 1.3 volts to one of the mirrors, and thereafter observed that the mirror colored rapidly and uniformly to a blue color with a greenish hue.

In addition, we observed that the high reflectance at the center portion of the mirror was about 82.6% reflectance which decreased to a low reflectance of about 8.8%. The response time for the reflectance to change from about 70% to about 20% was about 2.5 seconds at about room temperature and about the same when the surrounding temperature was reduced to about −28° C. when a potential of about 1.3 volts was applied thereto. We made that determination by the reflectometer described in Example 1, supra.

We also observed that the mirror bleached from about 10% reflectance to about 60% reflectance in a response time of about 1.9 seconds at about room temperature and of about 7.4 seconds when the surrounding temperature was reduced to about −28° C. under about zero applied potential.

Example 16

In this example, we chose to manufacture the polychromic solid film from a commercially available epoxy resin together with a cross-linking agent to illustrate enhanced prolonged coloration performance attained when such combinations are used in the electrochromic monomer composition.

A. Preparation of Electrochromic Monomer Composition

We prepared an electrochromic monomer composition comprising by weight about 4.7% $HVBF_4$ (as a cathodic compound), about 1.7% ferrocene (as an anodic compound), both homogeneously dispersed in a combination comprising about 64.5% propylene carbonate (as a plasticizer) and about 26.5% "CYRACURE" resin UVR-6105 (as a monomer component) and about 1.2% 2-ethyl-2-(hydroxymethyl)-1, 3-propanediol (as a cross-linking agent). We also added about 1.4% "CYRACURE" UVI-6990 (as a photoinitiator), and thoroughly mixed this electrochromic monomer composition to ensure that a homogeneous dispersion of the components was achieved.

B. Mirror Assembly With Electrochromic Monomer Composition

We assembled interior automotive mirrors HWG-ITO coated glass substrates (where the conductive surface of each glass substrate faced one another), with the clear, front glass and silvered, rear glass having a sheet resistance of about 15 ohms per square. The dimensions of the mirror assemblies were about 2.5"×10"×53 $\mu$m, with a weather barrier of an epoxy resin coupled with spacers of about 53 $\mu$m also applied.

We placed into these mirror assemblies the electrochromic monomer composition of Example 16(A), supra, using the vacuum backfilling technique [as described in Varaprasad III, supra].

C. Transformation of Electrochromic Monomer Composition Within Mirror to Polychromic Solid Film Once the electrochromic monomer composition of Example 16(A), supra, was uniformly applied within the mirror assemblies of Example 16(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.3 volts to one of the electrochromic mirrors prepared according to Examples 16(B) and (C), supra, and observed this mirror to color rapidly and uniformly to a blue color with a greenish hue.

In addition, we observed that the high reflectance at the center portion of the mirror was about 80.0% reflectance which decreased to a low reflectance of about 7.3% when about 1.3 volts was applied thereto. The response time for the reflectance to change from about 70% to about 20% when that potential was applied thereto was about 2.9 seconds. We made this determination by the reflectometer described in Example 1, supra.

We also observed that the mirror bleached from about 10% reflectance to about 60% reflectance in a response time of about 3.8 seconds under about a zero applied potential. We noted the bleaching to be uniform.

We further observed that the mirror bleached uniformly and satisfactorily after prolonged coloration in excess of about 8 hours.

Example 17

In this example, like Example 16, we chose to manufacture polychromic solid films from a commercially available epoxy resin together with a cross-linking agent to illustrate enhanced prolonged coloration performance attained when such combinations are used in the electrochromic monomer composition.

A. Preparation of Electrochromic Monomer Composition

We prepared an electrochromic monomer composition according to the present invention comprising about 4.7% $HVBF_4$ (as a cathodic compound), about 1.4% ferrocene (as an anodic compound), both homogeneously dispersed in a combination of about 64.6% propylene carbonate (as a plasticizer), about 17.5% "CYRACURE" resin UVR-6105 (as a monomer component) and about 10.1% "CARBOWAX" PEG 1450 (as a cross-linking agent). We also added about 1.4% "CYRACURE" UVI-6990 (as a photoinitiator), and thoroughly mixed this electrochromic monomer composition to ensure that a homogeneous dispersion of the components was achieved.

B. Mirror Assembly with Electrochromic Monomer Composition

We assembled interior automotive mirrors from HWG-ITO coated glass substrates (where the conductive surface of each glass substrate faced one another), with the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 17(A), supra, using the vacuum backfilling technique [as described in Varaprasad III, supra].

C. Transformation of Electrochromic Monomer Composition Within Mirror to Polychromic Solid Film Once the electrochromic monomer composition of Example 17(A), supra, was uniformly applied within the mirror assemblies of Example 17(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.3 volts to one of the electrochromic mirrors, and thereafter observed this mirror to color rapidly and uniformly to a blue color with a greenish hue.

In addition, we observed that the high reflectance at the center portion of the mirror was about 75.2% reflectance which decreased to a low reflectance of about 7.6% when about 1.3 volts was applied thereto. The response time for the reflectance to change from about 70% to about 20% when that potential was applied thereto was about 2.4 seconds. We made this determination by the reflectometer described in Example 1, supra.

We also observed that the mirror bleached from about 10% reflectance to about 60% reflectance in a response time of about 4.2 seconds under about a zero applied potential. We noted the bleaching to be uniform.

We further observed that the mirror bleached uniformly and satisfactorily after prolonged coloration in excess of about 8 hours.

Example 18

In this example, we chose ferrocene as the anodic electrochromic compound together with a monomer component containing the combination of a monofunctional monomer and a difunctional monomer to illustrate the beneficial properties and characteristics of polychromic solid films made therefrom.

A. Preparation of Electrochromic Monomer Composition

We prepared an electrochromic monomer composition comprising by weight about 4.3% $EVClO_4$ (as a cathodic compound), about 1.9% ferrocene (as an anodic compound), both homogeneously dispersed in a combination comprising about 55.9% propylene carbonate (as a plasticizer) and, in combination as a monomer component, about 12.7% caprolactone acrylate and about 17.2% polyethylene glycol diacrylate (400). We also added about 3.5% benzoin i-butyl ether (as a photoinitiator) and about 4.3% "UVINUL" N 35 (as an ultraviolet stabilizing agent), and thoroughly mixed this electrochromic monomer composition to ensure that a homogenous dispersion of the components was achieved.

B. Mirror Assembly With Electrochromic Monomer Composition

We assembled interior automotive mirrors from HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×44 μm, with a weather barrier of an epoxy resin coupled with spacers of about 44 μm also applied.

We placed into these mirror assemblies the electrochromic monomer composition of Example 18(A), supra, using the vacuum backfilling technique [as described in Varaprasad III, supra].

C. Transformation of Electrochromic Monomer Composition Within Mirror to Polychromic Solid Film Once the electrochromic monomer composition of Example 18(A), supra, was uniformly applied within the mirror assemblies of Example 18(B), supra, we placed the assemblies onto the conveyor belt of a Fusion UV Curing System F-300 B. While the belt advanced initially at a rate of about fifty feet per minute, we exposed the assemblies to ultraviolet radiation generated by the D fusion lamp of the F-300 B. We passed these mirror assemblies under the fusion lamp fifteen times pausing for two minute intervals between every third pass, then nine times at that rate pausing for two minute intervals between every third pass, and finally six times at a rate of about twenty-five feet per minute pausing for two minute intervals after every other pass.

D. Use of Electrochromic Mirror

We applied a potential of about 1.5 volts to one of the electrochromic mirrors of Examples 18(B) and (C), supra, and observed this mirror to color rapidly and uniformly to a blue color with a greenish hue.

In addition, we observed that the high reflectance at the center portion of the mirror was about 77.1% reflectance which decreased to a low reflectance of about 7.9% when about 1.5 volts was applied thereto. The response time for the reflectance to change from about 70% to about 20% when that potential was applied thereto was about 2.8 seconds. We made this determination by the reflectometer described in Example 1, supra.

We also observed that the mirror bleached from about 10% reflectance to about 60% reflectance in a response time of about 2.6 seconds under about a zero applied potential. We noted the bleaching to be uniform.

Example 19

In this example, we chose ferrocene as the anodic electrochromic compound together with a monomer component containing the combination of a monomer and a commercially available ultraviolet curable formulation to illustrate the beneficial properties and characteristics of polychromic solid films made therefrom.

A. Preparation of Electrochromic Monomer Composition

We prepared an electrochromic monomer composition comprising by weight about 4.3% $EVClO_4$ (as a cathodic compound), about 1.9% ferrocene (as an anodic compound), both homogeneously dispersed in a combination of about 55.9% propylene carbonate (as a plasticizer), and, in combination as a monomer component, about 10.3% caprolactone acrylate, about 15.5% polyethylene glycol diacrylate (400) and about 4.3% "SARBOX" acrylate resin (SB 500). We also added about 3.5% benzoin i-butyl ether (as a photoinitiator) and about 4.3% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled interior automotive mirrors with HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×53 μm, with a weather barrier of an epoxy resin coupled with spacers of about 53 μm also applied.

We placed into these mirror assemblies the electrochromic monomer composition of Example 19(A), supra, using the vacuum backfilling technique [as described in Varaprasad III, supra].

C. Transformation of Electrochromic Monomer Composition Within Mirror to Polychromic Solid Film Once the electrochromic monomer composition of Example 19(A), supra, was uniformly applied within the mirror assemblies of Example 19(B), supra, we placed the assemblies onto the conveyor belt of a Fusion UV Curing System F-300 B, and exposed the assemblies to ultraviolet radiation in the same manner as described in Example 18(C), supra.

D. Use of Electrochromic Mirrors

We applied a potential of about 1.5 volts to one of the mirrors, and thereafter observed that the mirror colored rapidly and uniformly to a blue color with a greenish hue.

In addition, we observed that the high reflectance at the center portion of the mirror was about 79.6% reflectance which decreased to a low reflectance of about 7.6%. The response time for the reflectance to change from about 70% to about 20% was about 2.2 seconds when a potential of about 1.5 volts was applied thereto. We made that determination by the reflectometer described in Example 1, supra.

We also observed that the mirror bleached from about 10% reflectance to about 60% reflectance in a response time of about 2.5 seconds under about zero applied potential.

Example 20

In this example, we chose to manufacture interior rearview mirrors from polychromic solid films prepared with a commercially available epoxy resin together with a cross-linking agent to illustrate enhanced prolonged coloration performance attained when such combinations are used in the electrochromic monomer composition.

A. Preparation of Electrochromic Monomer Composition

We prepared an electrochromic monomer composition comprising by weight about 4.6% $EVClO_4$ (as a cathodic compound), about 2.1% ferrocene (as an anodic compound), both homogeneously dispersed in a combination comprising about 57.4% propylene carbonate (as a plasticizer) and, in combination as a monomer component, about 8.2% "CYRACURE" resin UVR-6105 and about 14.0% caprolactone, and about 1.1% 2-ethyl-2-(hydroxymethyl)-1, 3-propanediol (as a cross-linking agent). We also added, in combination as photoinitiators, about 1.4% "CYRACURE" UVI-6990 and about 1.5% benzoin i-butyl ether, and thoroughly mixed this electrochromic monomer composition to ensure that a homogeneous dispersion of the components was achieved.

B. Mirror Assembly With Electrochromic Monomer Composition

We assembled interior automotive mirrors HWG-ITO coated glass substrates (where the conductive surface of each glass substrate faced one another), with the clear, front glass and the silvered, rear glass having a sheet resistance of about 15 ohms per square. The dimensions of the mirror assemblies were about 2.5"×10"×44 µm, with a weather barrier of an epoxy resin coupled with spacers of about 44 µm also applied.

We placed into these mirror assemblies the electrochromic monomer composition of Example 20(A), supra, using the vacuum backfilling technique [as described in Varaprasad III, supra].

C. Transformation of Electrochromic Monomer Composition Within Mirror to Polychromic Solid Film Once the electrochromic monomer composition of Example 20(A), supra, was uniformly applied within the mirror assemblies of Example 20(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about 1.4 volts to one of the electrochromic mirrors prepared according to Examples 20(B) and (C), supra, and observed this mirror to color rapidly and uniformly to a blue color with a greenish hue.

In addition, we observed that the high reflectance at the center portion of the mirror was about 76.9% reflectance which decreased to a low reflectance of about 7.9% when about 1.4 volts was applied thereto. The response time for the reflectance to change from about 70% to about 20% when that potential was applied thereto was about 3.1 seconds. We made this determination by the reflectometer described in Example 1, supra.

We also observed that the mirror bleached from about 10% reflectance to about 60% reflectance in a response time of about 3.3 seconds under about a zero applied potential. We noted the bleaching to be uniform.

Example 21

In this example, we illustrate that a prolonged application of a bleach potential—i.e., a potential having a polarity opposite to that used to achieve color—, having a magnitude greater than about 0.2 volts, and preferably about 0.4 volts, may be used to enhance bleach speeds of electrochromic devices, such as automotive rearview mirrors, manufactured with polychromic solid films as the medium of variable reflectance.

A. Preparation of Electrochromic Monomer Composition

We prepared an electrochromic monomer composition comprising by weight about 4.3% $EVClO_4$ (as a cathodic compound), about 1.9% ferrocene (as an anodic compound), both homogeneously dispersed in a combination comprising about 60.2% propylene carbonate (as a plasticizer) and, in combination as a monomer component, about 8.6% caprolactone acrylate, about 12.9% polyethylene glycol diacrylate (400) and about 4.3% "SARBOX" acrylate resin (SB 500). We also added about 3.4% "IRGACURE" 184 (as a photoinitiator) and about 4.3% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled interior automotive mirrors from HW-ITO coated glass substrates (where the conductive surface of each glass substrate faced one another), with both the front, clear glass and the silvered, rear glass having a sheet resistance of about 15 ohms per square.

The dimensions of the mirror assemblies were about 2.5"×10"×44 µm, with a weather barrier of an epoxy resin coupled with spacers of about 44 µm also applied.

We placed into these mirror assemblies the electrochromic monomer composition of Example 21(A), supra, using the vacuum backfilling technique [as described in Varaprasad III, supra].

C. Transformation of Electrochromic Monomer Composition Within Mirror to Polychromic Solid Film Once the electrochromic monomer composition of Example 21(A), supra, was uniformly applied within the mirror assemblies of Example 21(B), supra, we placed the assemblies onto the conveyor belt of a Fusion UV Curing System F-300 B, and exposed the assemblies to ultraviolet radiation in the same manner as described in Example 1(D), supra.

D. Use of Electrochromic Mirror

We applied a potential of about −0.7 volts to one of the electrochromic mirrors of Examples 21(B) and (C), supra, and observed that mirror reflectance at the center portion of the mirror remained high at about 76%.

Upon reversing the polarity of the applied potential and increasing the magnitude to about +1.5 volts, we observed this mirror to color rapidly and uniformly to a blue color.

In addition, we observed that the high reflectance at the center portion of the mirror decreased to a low reflectance of about 7.8%, with the response time for the reflectance to change from about 70% to about 20% when that potential was applied thereto being about 2.4 seconds. We made this determination by the reflectometer described in Example 1, supra.

We also observed that the mirror bleached from about 10% reflectance to about 60% reflectance in a response time of about 1.7 seconds under a potential of about −0.7 volts with a high reflectance of about 78% re-established. We noted that when a potential of about zero volts to about −0.2 volts was applied to the mirror to bleach the mirror from the fully dimmed stated, the response time to achieve this effect was about 2.0 seconds. We also noted that when a potential having a greater magnitude, such as about −0.8 volts to about −0.9 volts, was applied to the mirror, the color assumed by the polychromic solid film may be controlled. For instance, a slight blue tint may be achieved at that aforestated greater negative potential using the electrochromic system of this example so that the bleached state of the electrochromic mirror may be matched to the color appearance of conventional non-electrochromic blue-tint mirrors commonly featured on luxury automobiles.

Example 22

In this example, we illustrate that a gradient opacity panel, such as that which may be used as an electrochromic shade band on an automobile windshield, may be created by configuring the bus bars on the electrochromic assembly so they are affixed partially around, or along the opposite sides, of the assembly, thus creating a transition between the areas of the device to which voltage is applied and those where no voltage is applied.

A. Preparation of Electrochromic Monomer Composition

We prepared an electrochromic monomer composition comprising by weight about 2.1% $EVClO_4$ (as a cathodic compound), about 1.4% t-butyl ferrocene (as an anodic compound), both homogeneously dispersed in a combination of about 54.2% propylene carbonate (as the plasticizer), and, in combination as a monomer component, about 28.6% B-565 and about 13.8% Urethane Acrylate (Soft) (CN 953). We thoroughly mixed this electrochromic monomer composition to ensure that a homogeneous dispersion of the components was achieved.

B. Panel Assembly With Electrochromic Monomer Composition

We constructed a panel assembly containing an electrochromic shade band by dispensing a portion of the electrochromic monomer composition of Example 22(A), supra, onto the conductive surface of a HW-ITO coated glass substrate having a sheet resistance of about 15 ohms per square. Onto this substrate we also placed 100 $\mu$m glass beads, and then positioned thereover another HW-ITO coated glass substrate having a sheet resistance of about 15 ohms per square so that the electrochromic monomer composition was between and in contact with the conductive surface of the two glass substrates. The dimensions of the assembly were about 4.5"×14", with an interpane distance between the glass substrates of about 100 $\mu$m.

We connected bus bars along the 14" sides of the panel assembly only about 4" inward from the edge of each of the opposing 14" sides. We thereafter affixed electrical leads to the bus bars.

C. Transformation of Electrochromic Monomer Composition Within Panel Assembly to Polychromic Solid Film Once the electrochromic monomer composition of Example 22(A), supra, was uniformly applied within the window panel assembly of Example 22(B), supra, we placed the assembly onto the conveyor belt of a Fusion UV Curing System F-300 B, and exposed the panel assembly to ultraviolet radiation in the same manner as described in Example 2(C), supra.

Once the polychromic solid film was formed, we applied a weather barrier of epoxy resin along, and over, the glass joints to prevent entry of environmental contaminants. This weather barrier consisted of a bead of "ENVIBAR" UV 1244 ultraviolet curable adhesive followed by the application of "SMOOTH-ON" room temperature cure epoxy (commercially available from Smooth-On Inc., Gillette, N.J.).

D. Demonstration of Electrochromic Shade Band Within Panel Assembly

We applied a potential of about 1.3 volts to the panel assembly, and thereafter observed that only the 4" region through which an electric field was formed colored rapidly, uniformly and intensely to a blue color. We also observed that color extended beyond that 4" region for a distance of about 1", in a gradient opacity which changed gradually from an intense coloration immediately adjacent the bus bar/non-bus bar transition to a bleached appearance beyond that additional 1" region or thereabouts.

In addition, we observed that the high transmittance at the center portion of the panel assembly was about 79.6% transmittance which decreased to a low transmittance of about 7.6%. The response time for the transmittance to change from about 70% to about 20% was about 2.2 seconds when a potential of about 1.5 volts was applied thereto. We made that determination by the reflectometer described in Example 1, supra, except that the reflectometer was set in transmission mode.

We also observed that the panel assembly bleached from about 10% transmittance to about 60% transmittance in a response time of about 2.5 seconds under about zero applied potential.

Example 23

In this example, like Example 3, supra, we installed the interior automotive mirror as a rearview mirror in an automobile to observe its performance under conditions attendant with actual use.

A. Preparation of Electrochromic Monomer Composition

We prepared an electrochromic monomer composition comprising by weight about 3.0% $EVClO_4$ (as a cathodic compound), about 1.3% ferrocene (as an anodic compound), both homogeneously dispersed in a combination of about 62.6% propylene carbonate (as a plasticizer), and, in combination as a monomer component, about 8.9% caprolactone acrylate, about 13.4% polyethylene glycol diacrylate (400) and about 4.5% "SARBOX" acrylate resin (SB 500). We also added about 1.8% "IRGACURE" 184 (as a photoinitiator) and about 4.5% "UVINUL" N 35 (as an ultraviolet stabilizing agent), and thoroughly mixed this electrochromic monomer composition to ensure that a homogenous dispersion of the components was achieved.

B. Mirror Assembly With Electrochromic Monomer Composition

We assembled an interior automotive mirror with HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×74 $\mu$m, with a weather barrier of an epoxy resin coupled with spacers of about 74 $\mu$m also applied.

We placed into these mirror assemblies the electrochromic monomer composition of Example 23(A), supra, using the vacuum backfilling technique [as described in Varaprasad III, supra].

C. Transformation of Electrochromic Monomer Composition Within Mirror to Polychromic Solid Film Once the electrochromic monomer composition of Example 23(A), supra, was uniformly applied within the mirror assembly of Example 23(B), supra, we placed the assembly onto the conveyor belt of a Fusion UV Curing System F-300 B, and exposed the assembly to ultraviolet radiation in the same manner as described in Example 1(D), supra.

D. Use of Electrochromic Mirror

We applied a potential of about 1.5 volts to the mirror, and thereafter observed rapid and uniform coloration to a blue color with a greenish hue.

In addition, we observed that the high reflectance at the center portion of the mirror was about 72.0% reflectance which decreased to a low reflectance of about 7.5%. The response time for the reflectance to change from about 70% to about 20% was about 3.5 seconds when a potential of about 1.5 volts was applied thereto. We made that determination by the reflectometer described in Example 1, supra.

We also observed that the mirror bleached from about 10% reflectance to about 60% reflectance in a response time of about 5.2 seconds under about zero applied potential.

We have successfully installed and operated this mirror in an automobile as a rearview mirror and have achieved excellent results.

Example 24

In this example, we chose to illustrate the beneficial properties and characteristics of polychromic solid films manufactured within an electrochromic sun roof panel.

A. Preparation of Electrochromic Monomer Composition

We prepared an electrochromic monomer composition according to the present invention comprising about 1.4% EVClO$_4$ (as a cathodic compound), about 0.9% t-butyl ferrocene (as an anodic compound), both homogeneously dispersed in a combination comprising about 39% propylene carbonate (as a plasticizer), and, in combination as a monomer component, about 39% "QUICK CURE" B-565 and about 19.53% Urethane Acrylate (Soft) (CN 953). We thoroughly mixed this electrochromic monomer composition to ensure that a homogeneous dispersion of the components was achieved.

B. Preparation of Sun Roof Panel Assembly and Placement of Electrochromic Monomer Composition Therein We prepared the glass substrates for use in the glazing assembly of this example by placing flat "TEC-20" glass substrates (with a black ceramic frit band around their perimeter edge regions), having dimensions of about 12"× 16", onto the mold of a bending instrument at room temperature under ambient conditions, and then increasing the temperature of the substrates to be bent to at least about 500° C. thereby causing the substrates to conform to the shape of the mold.

We also placed, as a spacer means, black drafting tape (Zipatone, Inc., Hillsdale, Ill.), having a width of about 0.0625" and a thickness of about 150 μm, onto a conductive surface of one of the bent "TEC-20" glass substrates in about 1.5" intervals across the width of the substrate. At such intervals, we found the black drafting tape to be positioned in an aesthetically appealing manner, and to maintain uniformity of the electrochromic media across the full dimensions of the panel.

We assembled the sun roof panel by dispensing a portion of the electrochromic monomer composition of Example 24(A), supra, onto the conductive surface of the substrate to be used as the concave interior surface (i.e., the Number 4 surface), and placed thereover the conductive surface of the substrate bearing the spacer means so that the electrochromic monomer composition was between and in contact with the conductive surface of the glass substrates. We then placed the panel assembly in a vacuum bag, gently elevated the temperature and evacuated substantially most of the air from the vacuum bag. In this way, the electrochromic monomer composition dispersed uniformly between the substrates under the pressure from the atmosphere.

C. Transformation of Electrochromic Monomer Composition Into Polychromic Solid Film We then placed the sun roof panel assembly (still contained in the vacuum bag) into a Sunlighter model 1530 UV chamber, equipped with three mercury lamps (commercially available from Test-Lab Apparatus Co., Milford, N.H.), and allowed the sun roof panel to remain exposed to the ultraviolet radiation emitted by the lamps for a period of time of about 30 minutes. The interpane distance between the "TEC-20" glass substrates was about 150 μm.

We thereafter attached bus bars at the 12" side of the substrates to create a distance therebetween of about 16". We then attached electrical leads to the bus bars.

D. Use of Electrochromic Sun Roof Panel

We applied a potential of about 1.3 volts to the glazing assembly, and thereafter observed the panel to color rapidly and uniformly to a bluish purple color.

In addition, we observed that the high transmission at the center portion of the sun roof panel was about 67% transmission which decreased to a low transmission of about 5% when about 1.3 volts was applied thereto. The response time for the transmission to change from about 60% to about 10% when that potential was applied thereto was about 3 minutes. We made this determination by the detection method described in Example 1, supra, except that the reflectometer was set in transmission mode.

We also observed that the glazing assembly bleached from about 5% transmission to about 60% transmission in a response time of about 6.5 minutes under about a zero applied potential.

The ultraviolet stability, scatter safety performance and/or electrochromic performance, and reduction in transmittance of near-infrared radiation of sun roof panels manufactured in accordance with the teaching herein, may be augmented by using the methods taught in Lynam III and Lynam V, and in commonly assigned U.S. Pat. No. 5,239,406 (Lynam)].

Example 25

In this example, we chose to illustrate the beneficial properties and characteristics of polychromic solid films manufactured within an electrochromic sun visor having a segmented design.

A. Preparation of Electrochromic Monomer Composition

We prepared an electrochromic monomer composition according to the present invention comprising about 2.4%

EVClO$_4$ (as a cathodic compound), about 1.6% ferrocene (as an anodic compound), both homogeneously dispersed in a combination comprising about 48% propylene carbonate (as a plasticizer), and, in combination as a monomer component, about 32% "QUICK CURE" B-565 and about 16% Urethane Acrylate (Soft) (CN 953). We thoroughly mixed this electrochromic monomer composition to ensure that a homogeneous dispersion of the components was achieved.

B. Sun Visor with Electrochromic Monomer Composition

We assembled the sun visor of this example from FW-ITO coated glass substrates, having dimensions of about 4"×14" and a sheet resistance of about 6 to about 8 ohms per square, onto which we previously placed deletion lines to form three individual segments. We created these deletion lines by screening a photo-resist material onto the glass substrate prior to depositing the ITO coating, and thereafter applying a coat of ITO onto the photo-resist coated substrate, and washing away the photoetched resist material using an organic solvent, such as acetone.

We assembled the sun visor by placing onto the 14" edges of the conductive surface of one of the FW-ITO glass substrates "KAPTON" high temperature polyamide tape (E.I. du Pont de Nemours and Company, Wilmington, Del.), having a thickness of 70 µm. We then dispensed a portion of the electrochromic monomer composition of Example 25(A), supra, onto that conductive surface and then placed thereover the conductive surface of another substrate so that the electrochromic monomer composition was between and in contact with the conductive surface of the glass substrates. The interpane distance between the substrates was about 70 µm.

C. Transformation of Electrochromic Monomer Composition Within Sun Visor to Polychromic Solid Film Once the electrochromic monomer composition of Example 25(A), supra, was uniformly applied within the sun visor assembly of Example 25(B), supra, we placed the assembly onto the conveyor belt of a Fusion UV Curing System F-300 B, and exposed the assembly to ultraviolet radiation in the same manner as described in Example 2(C), supra.

Upon completion of the transformation process, we applied "ENVIBAR" UV 1244 to the glass edges and joints and again exposed the sun visor to ultraviolet radiation to further weather barrier protect the sun visor. We then applied "SMOOTH-ON" epoxy to those portions of the sun visor to form a final weather barrier about the sun visor.

D. Use of Electrochromic Sun Visor

We applied a potential of about 1.3 volts to the sun visor, and thereafter observed the sun visor to color rapidly and uniformly to a bluish purple color.

In addition, we observed that the high transmission at the center portion of the sun visor was about 74.9% transmission which decreased to a low transmission of about 2.5% when about 1.5 volts was applied thereto. The response time for the transmission to change from the high transmission state to about 10% when that potential was applied thereto was about 9 seconds. We made this determination by the detection method described in Example 1, supra, except that the reflectometer was set in transmission mode.

We also observed that the sun visor bleached from about 10% transmission to about 70% transmission in a response time of about 15 seconds under about a zero applied potential.

The segmented portions of the sun visor of this example may be made in a horizontal direction or a vertical direction, and individual segments may be activated by connection to an individual segment addressing means, such as a mechanical switch, a photosensor, a touch sensor, including a touch activated glass panel, a voice activated sensor, an RF activated sensor and the like. In addition, segments may be activated individually or as pluralities by responding to glare from the sun, such as when the sun rises from and falls toward the horizon, or as it traverses the horizon. This sun visor, as well as other electrochromic glazings, such as windows, sun roofs and the like, may use automatic glare sensing means that involve single or multiple photosensors, such as those disclosed in U.S. Pat. No. 5,148,014 (Lynam).

Example 26

In this example, we assembled an interior automotive mirror as a rearview mirror to be installed in an automobile to observe its performance under conditions attendant with actual use.

A. Preparation of Electrochromic Monomer Composition

We prepared an electrochromic monomer composition comprising by weight about 3.6% EVClO$_4$ (as a cathodic compound), about 1.6% ferrocene (as an anodic compound), both homogeneously dispersed in a combination of about 61.9% propylene carbonate (as a plasticizer), and, in combination as a monomer component, about 11.1% polyethylene glycol monomethacrylate (400), about 11.1% polyethylene glycol diacrylate (400) and about 4.4% "SARBOX" acrylate resin (SB 500). We also added about 1.8% "IRGACURE" 184 (as a photoinitiator) and about 4.4% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled an interior automotive mirror with HWG-ITO coated glass substrates (where the conductive surface of each glass substrate faced one another), with both the clear, front glass and the silvered, rear glass having a sheet resistance of about 15 ohms per square. The dimensions of the mirror assemblies were about 2.5"×10"×53 µm, with a weather barrier of an epoxy resin coupled with spacers of about 53 µm also applied.

We placed into these mirror assemblies the electrochromic monomer composition of Example 26(A), supra, using the vacuum backfilling technique [as described in Varaprasad III, supra].

C. Transformation of Electrochromic Monomer Composition Within Mirror to Polychromic Solid Film Once the electrochromic monomer composition of Example 26(A), supra, was uniformly applied within the mirror assembly of Example 26(B), supra, we placed the assembly onto the conveyor belt of a Fusion UV Curing System F-300 B, and exposed the assembly to ultraviolet radiation in the same manner as described in Example 1(D), supra.

D. Use of Electrochromic Mirror

We applied a potential of about 1.5 volts to the mirror, and thereafter observed rapid and uniform coloration to a blue color with a greenish hue.

In addition, we observed that the high reflectance at the center portion of the mirror was about 72.0% reflectance which decreased to a low reflectance of about 7.4%. The response time for the reflectance to change from about 70% to about 20% was about 2.1 seconds when a potential of about 1.5 volts was applied thereto. We made that determination by the reflectometer described in Example 1, supra.

We also observed that the mirror bleached from about 10% reflectance to about 60% reflectance in a response time of about 4.0 seconds under about zero applied potential.

Example 27

In this example, we assembled automotive mirrors for use with the 1993 Lincoln Continental automobile. Specifically, Example 27(A), infra, illustrates the manufacture and use of an interior rearview mirror, and Example 27(B), infra, illustrates the use of an exterior mirror, sized for driver-side and passenger-side applications, to be installed in the automobile.

A. 1993 Lincoln Continental Interior Rearview Mirror

1. Preparation of Electrochromic Monomer Composition

We prepared an electrochromic monomer composition comprising by weight about 3.6% $EVClO_4$ (as a cathodic compound), about 1.6% ferrocene (as an anodic compound), both homogeneously dispersed in a combination of about 62% propylene carbonate (as a plasticizer), and, in combination as a monomer component, about 8.9% caprolactone acrylate, about 13.3% polyethylene glycol diacrylate (400) and about 4.4% "SARBOX" acrylate resin (SB 500). We also added about 1.8% "IRGACURE" 184 (as a photoinitiator) and about 4.4% "UVINUL" N 35 (as an ultraviolet stabilizing agent), and thoroughly mixed this electrochromic monomer composition to ensure that a homogeneous dispersion of the components was achieved.

2. Interior Rearview Mirror Assembly With Electrochromic Monomer Composition We assembled an interior rearview mirror, with an interpane distance of 53 µm, from HWG-ITO coated 093 glass substrates (where the conductive surface of each glass substrate faced one another), with both the clear, front glass and the silvered, rear glass having a sheet resistance of about 15 ohms per square. We also applied a weather barrier of an epoxy resin coupled with spacers of about 53 µm.

We placed into these mirror assemblies the electrochromic monomer composition of Example 27(A)(1), supra, using the vacuum backfilling technique [as described in Varaprasad III, supra].

3. Transformation of Electrochromic Monomer Composition Within Mirror to Polychromic Solid Film Once the electrochromic monomer composition of Example 27(A)(1), supra, was uniformly applied within the mirror assembly of Example 27(A)(2), supra, we placed the assembly onto the conveyor belt of a Fusion UV Curing System F-300 B, and exposed the assembly to ultraviolet radiation in the same manner as described in Example 1(D), supra.

4. Use of Electrochromic Mirror

We applied a potential of about 1.5 volts to the mirror, and thereafter observed rapid and uniform coloration to a blue color with a greenish hue.

In addition, we observed that the high reflectance at the center portion of the mirror was about 76.5% reflectance which decreased to a low reflectance of about 7.4%. The response time for the reflectance to change from about 70% to about 20% was about 2.2 seconds when a potential of about 1.5 volts was applied thereto. We made that determination by the reflectometer described in Example 1, supra.

We also observed that the mirror bleached from about 10% reflectance to about 60% reflectance in a response time of about 2.7 seconds under about zero applied potential.

B. 1993 Lincoln Continental Exterior Mirrors—Driver-Side and Passenger-Side

1. Preparation of Electrochromic Monomer Composition

We prepared an electrochromic monomer composition comprising by weight about 2.6% $EVClO_4$ (as a cathodic compound), about 1.2% ferrocene (as an anodic compound), both homogeneously dispersed in a combination of about 63% propylene carbonate (as a plasticizer), and, in combination as a monomer component, about 9% caprolactone acrylate, about 13.5% polyethylene glycol diacrylate (400) and about 4.5% "SARBOX" acrylate resin (SB 500). We also added about 1.8% "IRGACURE" 184 (as a photoinitiator) and about 4.5% "UVINUL" N 35 (as an ultraviolet stabilizing agent), and thoroughly mixed this electrochromic monomer composition to ensure that a homogeneous dispersion of the components was achieved.

2. Exterior Mirror Assemblies With Electrochromic Monomer Composition

We assembled exterior mirrors, with an interpane distance of 74 µm, from FW-ITO coated 063 glass substrates (where the conductive surface of each glass substrate faced one another), with both the clear, front glass and the silvered, rear glass having a sheet resistance of about 6 to about 8 ohms per square. We also applied a weather barrier of an epoxy resin coupled with spacers of about 74 µm.

We placed into these mirror assemblies the electrochromic monomer composition of Example 27(B)(1), supra, using the vacuum backfilling technique [as described in Varaprasad III, supra].

3. Transformation of Electrochromic Monomer Composition Within Mirror to Polychromic Solid Film Once the electrochromic monomer composition of Example 27(B)(1), supra, was uniformly applied within the mirror assemblies of Example 27(B)(2), supra, we placed the assemblies onto the conveyor belt of a Fusion UV Curing System F-300 B, and exposed the assemblies to ultraviolet radiation in the same manner as described in Example 1(D), supra.

4. Use of Electrochromic Mirrors

We applied a potential of about 1.5 volts to one of the mirrors, and thereafter observed rapid and uniform coloration to a blue color with a greenish hue.

In addition, we observed that the high reflectance at the center portion of the mirror was about 72% reflectance which decreased to a low reflectance of about 8%. The response time for the reflectance to change from about 70% to about 20% was about 3.9 seconds when a potential of about 1.5 volts was applied thereto. We made that determination by the reflectometer described in Example 1, supra.

We also observed that the mirror bleached from about 10% reflectance to about 60% reflectance in a response time of about 4.0 seconds under about zero applied potential.

Example 28

A. Preparation of Electrochromic Monomer Composition

We prepared an electrochromic monomer composition comprising by weight about 6.31% HVSS (as a cathodic compound), about 1.63% ferrocene (as an anodic compound), both homogeneously dispersed in a combination of about 47.48% propylene carbonate and about 8.63% 3-hydroxypropionitrile (as a plasticizer), and, in combination as a monomer component, about 12.95% caprolactone acrylate, about 8.63% polyethylene glycol diacrylate (400) and about 8.63% "SARBOX" acrylate resin (SB 501). We also added, in combination as photoinitiators, about 0.13% "IRGACURE" 184 and about 1.29% "CYRACURE" UVI-6990 and about 4.32% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled an interior rearview mirror, with an interpane distance of 53 μm, from HWG-ITO coated 093 glass substrates (where the conductive surface of each glass substrate faced one another), with both the clear, front glass and the silvered, rear glass having a sheet resistance of about 15 ohms per square. We also applied a weather barrier of an epoxy resin coupled with spacers of about 53 μm.

We placed into these mirror assemblies the electrochromic monomer composition of Example 28(A), supra, using the vacuum backfilling technique [as described in Varaprasad III, supra].

C. Transformation of Electrochromic Monomer Composition Within Mirror to Polychromic Solid Film Once the electrochromic monomer composition of Example 28(A), supra, was uniformly applied within the mirror assembly of Example 28(B), supra, we placed the assembly onto the conveyor belt of a Hanovia UV Curing System (Hanovia Corp., Newark, N.J.), fitted with UV lamp 6506A431, with the intensity dial set at 300 watts. We exposed the assembly to ultraviolet radiation in a similar manner as described in Example 1(D), supra, by passing the assembly under the UV lamp with the conveyor speed set at about 20% to about 50% for about 120 to about 180 multiple passes.

D. Use of Electrochromic Mirror

We applied a potential of about 1.2 volts to the mirror, and thereafter observed rapid and uniform coloration to a blue color with a greenish hue.

In addition, we observed that the high reflectance at the center portion of the mirror was about 73.9% reflectance which decreased to a low reflectance of about 7.4%. The response time for the reflectance to change from about 70% to about 20% was about 3.9 seconds when a potential of about 1.2 volts was applied thereto. We made that determination by the reflectometer described in Example 1, supra.

Example 29

A. Preparation of Electrochromic Monomer Composition

We prepared an electrochromic monomer composition comprising by weight about 4.38% $DSMVClO_4$ (as a cathodic compound) and about 0.57% $EHPVClO_4$ (as a cathodic compound), about 1.62% ferrocene (as an anodic compound), both homogeneously dispersed in a combination of about 56.74% propylene carbonate (as a plasticizer), and, in combination as a monomer component, about 13.10% caprolactone acrylate, about 8.73% polyethylene glycol diacrylate (400), about 4.37% "SARBOX" acrylate resin (SB 500E50) and about 4.37% "CYRACURE" resin UVR-6110. We also added, in combination as photoinitiators, about 0.44% "IRGACURE" 184 and about 1.31% "CYRACURE" UVI-6990 and about 4.37% "UVINUL" N 35 (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled an interior rearview mirror, with an interpane distance of 53 μm, from HWG-ITO coated 093 glass substrates (where the conductive surface of each glass substrate faced one another), with both the clear, front glass and the silvered, rear glass having a sheet resistance of about 15 ohms per square. We also applied a weather barrier of an epoxy resin coupled with spacers of about 53 μm.

We placed into these mirror assemblies the electrochromic monomer composition of Example 29(A), supra, using the vacuum backfilling technique [as described in Varaprasad III, supra].

C. Transformation of Electrochromic Monomer Composition Within Mirror to Polychromic Solid Film Once the electrochromic monomer composition of Example 29(A), supra, was uniformly applied within the mirror assembly of Example 29(B), supra, we placed the assembly onto the conveyor belt of a Hanovia UV Curing System (Hanovia Corp., Newark, N.J., fitted with UV lamp 6506A431, with the intensity dial set at 300 watts. We exposed the assembly to ultraviolet radiation in a similar manner as described in Example 1(D), supra, by passing the assembly under the UV lamp with the conveyor speed set at about 20% to about 50% for about 120 to about 180 multiple passes.

D. Use of Electrochromic Mirror

We applied a potential of about 1.2 volts to the mirror, and thereafter observed rapid and uniform coloration to a blue color with a greenish hue.

In addition, we observed that the high reflectance at the center portion of the mirror was about 79.6% reflectance which decreased to a low reflectance of about 6.7%. The response time for the reflectance to change from about 70%

Example 30

A. Preparation of Electrochromic Monomer Composition

We prepared an electrochromic monomer composition comprising by weight about 4.42% $DSMVClO_4$ (as a cathodic compound) and about 0.59% $EHPVClO_4$ (as a cathodic compound), about 1.65% ferrocene (as an anodic compound), both homogeneously dispersed in a combination of about 48.67% propylene carbonate (as a plasticizer), and, in combination as a monomer component, about 13.27% caprolactone acrylate, about 8.85% polyethylene glycol diacrylate (400), about 8.85% "SARBOX" acrylate resin (SB 500E50) and about 8.85% "CYRACURE" resin UVR-6110. We also added, in combination as photoinitiators, about 0.44% "IRGACURE" 184 and about 1.77% "CYRACURE" UVI-6990 and about 2.65% 2-hydroxy-4-octoxybenzophenone (as an ultraviolet stabilizing agent), and thoroughly mixed this electrochromic monomer composition to ensure that a homogeneous dispersion of the components was achieved.

B. Mirror Assembly With Electrochromic Monomer Composition

We assembled an interior rearview mirror, with an interpane distance of 53 µm, from HWG-ITO coated 093 glass substrates (where the conductive surface of each glass substrate faced one another), with both the clear, front glass and the silvered, rear glass having a sheet resistance of about 15 ohms per square. We also applied a weather barrier of an epoxy resin coupled with spacers of about 53 µm.

We placed into these mirror assemblies the electrochromic monomer composition of Example 30(A), supra, using the vacuum backfilling technique [as described in Varaprasad III, supra].

C. Transformation of Electrochromic Monomer Composition Within Mirror to Polychromic Solid Film Once the electrochromic monomer composition of Example 30(A), supra, was uniformly applied within the mirror assembly of Example 30(B), supra, we placed the assembly onto the conveyor belt of a Hanovia UV Curing System (Hanovia Corp., Newark, N.J., fitted with UV lamp 6506A431, with the intensity dial set at 300 watts. We exposed the assembly to ultraviolet radiation in a similar manner as described in Example 1(D), supra, by passing the assembly under the UV lamp with the conveyor speed set at about 20% to about 50% for about 120 to about 180 multiple passes.

D. Use of Electrochromic Mirror

We applied a potential of about 1.3 volts to the mirror, and thereafter observed rapid and uniform coloration to a blue color with a greenish hue.

In addition, we observed that the high reflectance at the center portion of the mirror was about 71.9% reflectance which decreased to a low reflectance of about 6.9%. The response time for the reflectance to change from about 70% to about 20% was about 3.9 seconds when a potential of about 1.3 volts was applied thereto. We made that determination by the reflectometer described in Example 1, supra.

to about 20% was about 2.8 seconds when a potential of about 1.2 volts was applied thereto. We made that determination by the reflectometer described in Example 1, supra.

Example 31

A. Preparation of Electrochromic Monomer Composition

We prepared an electrochromic monomer composition comprising by weight about 0.36% $HUVPF_6$ (as a cathodic compound), about 0.97% $EVClO_4$ (as a cathodic compound), about 0.17% Ferrocene (FE, an anodic compound), about 0.39% 5,10-dihydro-5,10-dimethylphenazine (as an anodic compound), all homogeneously dispersed in a combination of about 89.68% propylene carbonate (as plasticizer) and, in combination as a monomer component, about 0.65% HDT (an isocyanate) and about 3.08% Lexorez 1931-50 (a polyol), and about 0.03% T-1 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×125 µm, with a weather barrier of an epoxy resin coupled with spacers of about 125 µm also applied.

We placed into these mirror assemblies the electrochromic monomer composition of Example 31 (A), supra, using the vacuum back filling technique (as described in Varaprasad III, supra).

C. Transformation of Electrochromic Monomer Composition within Mirror to Polychromic Solid Film Once the electrochromic monomer composition of Example 31 (A), supra, was uniformly applied within the mirror assemblies of Example 31 (B), supra, we placed the assemblies overnight at room temperature during which time the monomer composition reacted to form in situ as the solid polymer matrix film inside the mirror. These mirror assemblies were then placed in an electrically heated convection oven maintained at about 80° C. for about 2 hours.

D. Use of Electrochromic Mirror

We applied a potential of about 1.4 volts to one of the electrochromic mirrors, and observed this mirror to color rapidly and uniformly to a gray color with bluish hue.

In addition, we observed that the high reflectance at the center portion of the mirror was about 72.3% reflectance which decreased to a low reflectance of about 7.1% when about 1.4 volts was applied to thereto. The response time for reflectance to change from about 70% to about 20% when that potential was applied thereto was about 2.1 seconds. We made this determination by the reflectometer described in Example 1, supra.

We also observed that the mirror bleached from about 10% reflectance to about 60% reflectance in a response time of about 7.0 seconds under about a zero applied potential. We noted the bleaching to be uniform.

Example 32

A. Preparation of Prepolymer Composition that includes a Viologen containing Polyol We prepared viologen containing polyol through copolymerization of $ESMVClO_4$ with caprolactone acrylate according to the following procedure: We prepared a reaction mixture comprising by weight about 4.86% ESMV-CLO$_4$ (a viologen with vinyl functionality), about 1.94% UVI 6990 (a photoinitiator), about 0.97% Irgacure 184 (a photoinitiator), all homogeneously dispersed in a combination comprising about 43.69% caprolactone acrylate (an acrylate with hydroxyl functionality) and 48.54% propylene carbonate and placed it in a sealed glass container. We placed the sealed glass container on a conveyor belt of a Fusion UV Curing System F-300B. While the belt advanced at a rate of about 10 feet per minute, we exposed the reaction mixture to ultraviolet radiation generated by the D fusion lamp of the F 300B. We passed the sealed glass container containing the reaction mixture under the fusion lamp light twenty five times at that rate, pausing momentarily between the passes to allow the prepoplymer composition to cool. We used the resulting prepolymer composition that includes a viologen containing polyol to prepare the electrochromic monomer composition.

B. Preparation of Electrochromic Monomer Composition

We prepared an electrochromic monomer composition comprising by weight about 2.11% prepolymer composition of Example 32 (A), supra (as a cathodic compound and polyol), about 1.97% EVClO$_4$ (as a cathodic compound), and about 1.01% 5,10-dihydro-5,10-dimethylphenazine (as an anodic compound), all homogeneously dispersed in a combination of about 76.65% propylene carbonate (as plasticizer) and in combination as a monomer component, about 2.68% HDT (an isocyanate) and about 15.52% Desmophen 1700 (a polyol), and about 0.06% T-9 (a tin catalyst). We thoroughly mixed this monomer composition to ensure that a homogeneous dispersion of the components was achieved.

C. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 µm, with a weather barrier of an epoxy resin coupled with spacers of about 105 µm also applied.

We placed into these mirror assemblies the electrochromic monomer composition of Example 32 (B), supra, using the vacuum back filling technique (as described in Varaprasad III, supra).

D. Transformation of Electrochromic Monomer Composition within Mirror to Polychromic Solid Film Once the electrochromic monomer composition of Example 32 (B), supra, was uniformly applied within the mirror assemblies of Example 32 (C), supra, we placed the assemblies overnight at room temperature during which time the monomer composition reacted to form in situ the solid polymer matrix film inside the mirror. These mirror assemblies were then placed in an electrically heated convection oven maintained at about 80° C. for about 2 hours.

E. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 64.1% reflectance which decreased to a low reflectance of about 6.5% when about 1.4 volts was applied to thereto. The response time for reflectance to change from about 60% to about 20% when that potential was applied thereto was about 2.6 seconds. We made this determination by the reflectometer described in Example 1, supra.

We also observed that the mirror bleached from about 10% reflectance to about 50% reflectance in a response time of about 12.7 seconds under about a zero applied potential. We noted the bleaching to be uniform.

Example 33

A. Preparation of Electrochromic Monomer Composition

We prepared an electrochromic monomer composition comprising by weight about 0.3% HHVPF$_6$ (as a cathodic compound), about 0.97% EVClO$_4$ (as a cathodic compound), about 0.59% 5,10-dihydro-5,10-dimethylphenazine (as an anodic compound), all homogeneously dispersed in a combination of about 89.71% propylene carbonate (as plasticizer) and, in combination as a monomer component, about 0.65% HDT (an isocyanate) and about 3.08% Lexorez 1931-50 (a polyol), and about 0.03% T-9 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC 15 and from HW-ITO glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 µm, with a weather barrier of an epoxy resin coupled with spacers of about 105 µm also applied.

We placed into these mirror assemblies the electrochromic monomer composition of Example 33 (A), supra, using the vacuum back filling technique (as described in Varaprasad III, supra).

C. Transformation of Electrochromic Monomer Composition within Mirror to Polychromic Solid Film Once the electrochromic monomer composition of Example 33 (A), supra, was uniformly applied within the mirror assemblies of Example 33 (B), supra, we placed the assemblies in an electrically heated convection oven maintained at about 80° C. for about 2 hours whereupon the monomer composition reacted to form in situ the solid polymer matrix film inside the mirror.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 71.8% reflectance which decreased to a low reflectance of about 7.0% when about 1.4 volts was applied to thereto. The response time for reflectance to change from about 70% to about 20% when that potential was applied thereto was about 2.2 seconds. We made this determination by the reflectometer described in Example 1, supra.

We also observed that the mirror bleached from about 10% reflectance to about 60% reflectance in a response time of about 4.9 seconds under about a zero applied potential. We noted the bleaching to be uniform.

E. Stability and Cyclability of Electrochromic Devices Manufactured with Polychromic Solid Films To demonstrate the cycle stability of the electrochromic mirrors assemblies of Example 33 (B and C), supra, we subjected the electrochromic mirrors made from TEC 15 glass substrates to 20 seconds color—20 seconds bleach cycles at different test temperatures required by automotive specifications. We have observed good cycle stability after about 85,000 cycles which include about 25,000 cycles at 70° C., about 20,000 cycles at −30° C., and about 40,000 cycles at room temperature. We observed, that the high reflectance of the mirror at the center portion of the mirror changed from 71.8% to 71.0% and that the low reflectance changed from 7.0% to 7.5% after about 85,000 cycles. We also observed that the response time for reflectance change from about 70% to about 20% changed from 2.2 seconds to 2.7 seconds and the response time for reflectance change from about 10% to about 60% changed from 4.9 seconds to 5.2 seconds after about 85,000 cycles.

To demonstrate the ultraviolet stability, we exposed the electrochromic mirror assemblies made from HW-ITO glass substrate of Example 33 supra, to at least about 2600 kJ/m$^2$ using a Xenon weatherometer as per SAE J1960. We observed, that the high reflectance of the mirror at the center portion of the mirror changed from 79.4% to 78.9% and that the low reflectance changed from 6.0% to 6.25% after exposure to ultraviolet radiation. We also observed that the response time for reflectance change from about 70% to about 20% changed from 1.6 seconds to 1.7 seconds and the response time for reflectance change from about 10% to about 60% changed from 4.1 seconds to 4.4 seconds after exposure to ultraviolet radiation.

To demonstrate the thermal stability of the electrochromic mirror assemblies of Example 33 (B and C), supra, we placed the mirror assemblies made from HW-ITO glass substrates in an electric oven maintained at about 85° C. for at least about 400 hours. We observed, that the high reflectance of the mirror at the center portion of the mirror changed from 79% to 77% and that the low reflectance changed from 6.1% to 5.7% after the heat test. We also observed that the response time for reflectance change from about 70% to about 20% changed from 1.5 seconds to 1.7 seconds and the response time for reflectance change from about 10% to about 60% changed from 4.1 seconds to 4.4 seconds after the heat test.

The environmental and overall performance the electrochromic mirrors was suitable for use in a vehicle.

Example 34

A. Preparation of Electrochromic Monomer Composition

We prepared an electrochromic monomer composition comprising by weight about 0.37% HUVPF$_6$ (as a cathodic compound), about 0.96% EVClO$_4$ (as a cathodic compound), about 0.59% 5,10-dihydro-5,10-dimethylphenazine (as an anodic compound), all homogeneously dispersed in a combination of about 89.65% propylene carbonate (as plasticizer) and, in combination as a monomer component, about 0.65% HDT (an isocyanate) and about 3.08% Lexorez 1931-50 (a polyol), and about 0.03% T-1 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled exterior automotive mirrors using TEC 15 glass for the front substrate and a multi-layer metal reflector coated glass (consisting of about 200 angstroms of rhodium undercoated with about 1500 angstroms of chromium, and with the chromium being disposed between the rhodium layer and the glass surface so as to serve as an adhesion promoter layer such as is described in U.S. application Ser. No. 08/238,521 filed May 5, 1994, now U.S. Pat. No. 5,668,663 the disclosure of which is hereby incorporated by reference herein) for the rear substrate (where the conductive surface of each glass substrate faced one another), with the clear front glass having a sheet resistance of about 15 ohms per square and the rear multi-layered reflector coated glass having a sheet resistance of about 5 ohms per square. The dimensions of the mirror assemblies were about 3.5"×7.5"×105 $\mu$m, with a weather barrier of an epoxy resin coupled with spacers of about 105 $\mu$m also applied.

We placed into these mirror assemblies the electrochromic monomer composition of Example 34 (A), supra, using the vacuum back filling technique (as described in Varaprasad III, supra).

C. Transformation of Electrochromic Monomer Composition within Mirror to Polychromic Solid Film Once the electrochromic monomer composition of Example 34 (A), supra, was uniformly applied within the mirror assemblies of Example 34 (B), supra, we placed the assemblies in an electrically heated convection oven maintained at about 80° C. for about 2 hours whereupon the monomer composition reacted to form in situ the solid polymer matrix film inside the mirror.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 56.3% reflectance which decreased to a low reflectance of about 7.0% when about 1.4 volts was applied to thereto. The response time for reflectance to change from about 55% to about 20% when that potential was applied thereto was 1.2 seconds. We made this determination by the reflectometer described in Example 1, supra.

We also observed that the mirror bleached from about 10% reflectance to about 50% reflectance in a response time of about 5.8 seconds under about a zero applied potential. We noted the bleaching to be uniform.

Example 35

A. Preparation of Electrochromic Monomer Composition

We prepared an electrochromic monomer composition comprising by weight about 1.09% HUVPF$_6$ (as a cathodic compound), about 0.58% EVClO$_4$ (as a cathodic compound), about 0.59% 5,10-dihydro-5,10-dimethylphenazine (as an anodic compound), all homogeneously dispersed in a combination of about 89.34% propylene carbonate (as plasticizer) and, in combination as a monomer component, about 0.84% HDT (an isocyanate) and about 2.88% Lexorez 1931-50 (a polyol), and about 0.03% T-1 (a tin catalyst), and about 4.65% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 $\mu$m, with a weather barrier of an epoxy resin coupled with spacers of about 105 $\mu$m also applied.

We placed into these mirror assemblies the electrochromic monomer composition of Example 35 (A), supra, using the vacuum back filling technique (as described in Varaprasad III, supra).

C. Transformation of Electrochromic Monomer Composition within Mirror to Polychromic Solid Film Once the electrochromic monomer composition of Example 35 (A), supra, was uniformly applied within the mirror assemblies of Example 35 (B), supra, we placed the assemblies overnight at room temperature during which time the monomer composition reacted to form in situ the solid polymer matrix film inside the mirror. These mirror assemblies were then placed in an electrically heated convection oven maintained at about 80° C. for about 2 hours.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 72.1% reflectance which decreased to a low reflectance of about 7.3% when about 1.4 volts was applied to thereto. The response time for reflectance to change from about 70% to about 20% when that potential was applied thereto was about 2.0 seconds. We made this determination by the reflectometer described in Example 1, supra.

We also observed that the mirror bleached from about 10% reflectance to about 60% reflectance in a response time of about 7.9 seconds under about a zero applied potential. We noted the bleaching to be uniform.

Example 36

A. Preparation of Electrochromic Monomer Composition

We prepared an electrochromic monomer composition comprising by weight about 0.3% HHVPF$_6$ (as a cathodic compound), about 0.96% EVClO$_4$ (as a cathodic compound), about 0.59% 5,10-dihydro-5,10-dimethylphenazine (as an anodic compound), all homogeneously dispersed in a combination of about 84.13% propylene carbonate (as plasticizer) and, in combination as a monomer component, about 1.38% HDT (an isocyanate) and about 7.96% Lexorez 1931-50 (a polyol), and about 0.01% T-9 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 $\mu$m, with a weather barrier of an epoxy resin coupled with spacers of about 105 $\mu$m also applied.

We placed into these mirror assemblies the electrochromic monomer composition of Example 36 (A), supra, using the vacuum back filling technique (as described in Varaprasad III, supra).

C. Transformation of Electrochromic Monomer Composition within Mirror to Polychromic Solid Film Once the electrochromic monomer composition of Example 36 (A), supra, was uniformly applied within the mirror assemblies of Example 36 (B), supra, we placed the assemblies in an electrically heated convection oven maintained at about 80° C. for about 2 hours whereupon the monomer composition reacted to form in situ the solid polymer matrix film inside the mirror.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 69.9% reflectance which decreased to a low reflectance of about 8.0% when about 1.4 volts was applied to thereto. The response time for reflectance to change from about 70% to about 20% when that potential was applied thereto was about 2.1 seconds. We made this determination by the reflectometer described in Example 1, supra.

We also observed that the mirror bleached from about 10% reflectance to about 60% reflectance in a response time of about 5.2 seconds under about a zero applied potential. We noted the bleaching to be uniform.

Example 37

A. Preparation of Electrochromic Monomer Composition

We prepared an electrochromic monomer composition comprising by weight about 0.65% HUVClO$_4$ (as a cathodic compound), about 0.77% EVClO$_4$ (as a cathodic compound), about 0.59% 5,10-dihydro-5,10-dimethylphenazine (as an anodic compound), all homogeneously dispersed in a combination of about 89.57% propylene carbonate (as plasticizer) and, in combination as a monomer component, about 0.79% HDT (an isocyanate) and about 2.94% Lexorez 1931-50 (a polyol), and about 0.03% T-1 (a tin catalyst), and about 4.66% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 $\mu$m, with a weather barrier of an epoxy resin coupled with spacers of about 105 $\mu$m also applied.

We placed into these mirror assemblies the electrochromic monomer composition of Example 37 (A), supra, using the vacuum back filling technique (as described in Varaprasad III, supra).

C. Transformation of Electrochromic Monomer Composition within Mirror to Polychromic Solid Film Once the electrochromic monomer composition of Example 37 (A), supra, was uniformly applied within the mirror assemblies of Example 37 (B), supra, we placed the assemblies overnight at room temperature during which time the monomer composition reacted to form in situ the solid polymer matrix film inside the mirror. These mirror assemblies were then placed in an electrically heated convection oven maintained at about 80° C. for about 2 hours.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 74.0% reflectance which decreased to a low reflectance of about 7.5% when about 1.4 volts was applied to thereto. The response time for reflectance to change from about 70% to about 20% when that potential was applied thereto was about 2.0 seconds. We made this determination by the reflectometer described in Example 1, supra.

We also observed that the mirror bleached from about 10% reflectance to about 60% reflectance in a response time of about 6.2 seconds under about a zero applied potential. We noted the bleaching to be uniform.

Example 38

A. Preparation of Electrochromic Monomer Composition

We prepared an electrochromic monomer composition comprising by weight about 0.52% HUEVClO$_4$ (as a cathodic compound), about 0.77% EVClO$_4$ (as a cathodic compound), about 0.59% 5,10-dihydro-5,10-dimethylphenazine (as an anodic compound), all homogeneously dispersed in a combination of about 88.75% propylene carbonate (as plasticizer) and, in combination as a monomer component, about 0.93% HDT (an isocyanate) and about 3.74% Lexorez 1931-50 (a polyol), and about 0.03% T-1 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 $\mu$m, with a weather barrier of an epoxy resin coupled with spacers of about 105 $\mu$m also applied.

We placed into these mirror assemblies the electrochromic monomer composition of Example 38 (A), supra, using the vacuum back filling technique (as described in Varaprasad III, supra).

C. Transformation of Electrochromic Monomer Composition within Mirror to Polychromic Solid Film Once the electrochromic monomer composition of Example 38 (A), supra, was uniformly applied within the mirror assemblies of Example 38 (B), supra, we placed the assemblies overnight at room temperature during which time the monomer composition reacted to form in situ the solid polymer matrix film inside the mirror. These mirror assemblies were then placed in an electrically heated convection oven maintained at about 80° C. for about 2 hours.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 72.9% reflectance which decreased to a low reflectance of about 7.1% when about 1.4 volts was applied to thereto. The response time for reflectance to change from about 70% to about 20% when that potential was applied thereto was about 2.0 seconds. We made this determination by the reflectometer described in Example 1, supra.

We also observed that the mirror bleached from about 10% reflectance to about 60% reflectance in a response time of about 5.4 seconds under about a zero applied potential. We noted the bleaching to be uniform.

Example 39

A. Preparation of Electrochromic Monomer Composition

We prepared an electrochromic monomer composition comprising by weight about 0.3% HHVPF$_6$ (as a cathodic compound), about 0.96% EVClO$_4$ (as a cathodic compound), about 0.49% 5,10-dihydro-5,10-dimethylphenazine (as an anodic compound), and about 0.13% THAc having been previously reduced by contacting with zinc (U.S. Pat. No. 5,500,760 issued Mar. 19, 1996 the disclosure of which is incorporated by reference herein) (as an anodic compound), all homogeneously dispersed in a combination of about 85.34% propylene carbonate and about 0.91% acetic acid (as plasticizer) and, in combination as a monomer component, about 1.59% HDT (an isocyanate) and about 5.42% Lexorez 1931-50 (a polyol), and about 0.19% T-9 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 µm, with a weather barrier of an epoxy resin coupled with spacers of about 105 µm also applied.

We placed into these mirror assemblies the electrochromic monomer composition of Example 39 (A), supra, using the vacuum back filling technique (as described in Varaprasad III, supra).

C. Transformation of Electrochromic Monomer Composition within Mirror to Polychromic Solid Film Once the electrochromic monomer composition of Example 39 (A), supra, was uniformly applied within the mirror assemblies of Example 39 (B), supra, we placed the assemblies in an electrically heated convection oven maintained at about 80° C. for about 2 hours whereupon the monomer composition reacted to form in situ the solid polymer matrix film inside the mirror.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 67.4% reflectance which decreased to a low reflectance of about 6.6% when about 1.4 volts was applied to thereto. The response time for reflectance to change from about 65% to about 20% when that potential was applied thereto was about 2.5 seconds. We made this determination by the reflectometer described in Example 1, supra.

We also observed that the mirror bleached from about 10% reflectance to about 60% reflectance in a response time of about 8.3 seconds under about a zero applied potential. We noted the bleaching to be uniform.

Example 40

A. Preparation of Electrochromic Monomer Composition

We prepared an electrochromic monomer composition comprising by weight about 0.3% HHVPF$_6$ (as a cathodic compound), about 0.97% EVClO$_4$ (as a cathodic compound), about 0.59% 5,10-dihydro-5,10-dimethylphenazine (as an anodic compound), all homogeneously dispersed in a combination of about 89.71% propylene carbonate (as plasticizer) and, in combination as a monomer component, about 0.65% HDT (an isocyanate) and about 3.08% Lexorez 1931-50 (a polyol), and about 0.03% T-9 (a tin catalyst), and about 4.67% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled exterior automotive mirrors using clear HW-ITO glass for the front substrate and chromium metal coated glass for the rear substrate (where the conductive surface of each glass substrate faced one another), with the clear front glass having a sheet resistance of about 15 ohms per square and the rear chrome glass having a sheet resistance of 5 ohms per square. The dimensions of the mirror assemblies were about 3.5"×7.5"×105 µm, with a weather barrier of an epoxy resin coupled with spacers of about 105 µm also applied.

We placed into these exterior mirror assemblies the electrochromic monomer composition of Example 40 (A), supra, using the vacuum back filling technique (as described in Varaprasad III, supra).

C. Transformation of Electrochromic Monomer Composition within Mirror to Polychromic Solid Film Once the electrochromic monomer composition of Example 40 (A), supra, was uniformly applied within the mirror assemblies of Example 40 (B), supra, we placed the assemblies in an electrically heated convection oven maintained at about 80° C. for about 2 hours whereupon the monomer composition reacted to form in situ the solid polymer matrix film inside the mirror.

D. Use of Exterior Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 52.7% reflectance which decreased to a low reflectance of about 6.4% when about 1.4 volts was applied to thereto. The response time for reflectance to change from high reflectance to about 23% when that potential was applied thereto was about 1.6 seconds. We made this determination by the reflectometer described in Example 1, supra.

We also observed that the mirror bleached from low reflectance to about 40% reflectance in a response time of about 6.9 seconds under about a zero applied potential. We noted the bleaching to be uniform.

E. Stability and Cyclability of Electrochromic Devices Manufactured with Polychromic Solid Films To demonstrate the electrical stability of the mirror assemblies of Example 40 (B and C), supra, we applied 1.4 volts and continuously colored the electrochromic mirrors for at least about 300 hours at room temperature. We observed that the high reflectance changed from 52.7% to 52.2% and the low reflectance remained unchanged at 6.4% after the continuous coloration test. We observed that the response time for reflectance to change from high reflectance to about 23% changed from 1.6 seconds to 2.0 seconds after the continuous coloration test and also that the response time for the mirror to bleach from low reflectance to about 40% reflectance remained steady at about 6.9 seconds before and after the continuous coloration test.

To demonstrate the cyclability of the mirror assemblies of Example 40 (B and C), supra, we applied 1.4 volts and continuously colored the electrochromic mirrors for at least about 300 hours at room temperature.

To demonstrate the cycle stability of the electrochromic mirrors assemblies of Example 40 (B and C), supra, we subjected the electrochromic mirrors to 20 seconds color—20 seconds bleach cycles at different test temperatures required by automotive specifications. We observed good cycle stability after about 80,000 cycles which include about 30,000 cycles at 70° C., and about 50,000 cycles at room temperature. We observed, that the high reflectance of the mirror at the center portion of the mirror changed from 53.22 to 51.1% and that the low reflectance changed from 6.5% to 7.1% after the cycle test. We also observed that the response time for reflectance change from high reflectance to about 23% remained constant at about 1.9 seconds after the cycle test and the response time for reflectance change from low reflectance to about 40% changed from 5.7 seconds to 5.5 seconds after the cycle test.

Example 41

In this example, we chose to illustrate the beneficial properties and characteristics of the polychromic solid films manufactured within electrochromic glazings, or that may be used as small area transmissive devices, such as optical filters and the like.

A. Preparation of Electrochromic Monomer Composition

We prepared an electrochromic monomer composition comprising by weight about 0.37% $HUVPF_6$ (as a cathodic compound), about 0.96% $EVClO_4$ (as a cathodic compound), about 0.59% 5,10-dihydro-5,10-dimethylphenazine (as an anodic compound), all homogeneously dispersed in a combination of about 89.65% propylene carbonate (as plasticizer) and, in combination as a monomer component, about 0.65% HDT (an isocyanate) and about 3.08% Lexorez 1931-50 (a polyol), and about 0.03% T-1 (a tin catalyst), and about 4.67% Uvinul N 35 (a UV stabilizer). We thoroughly mixed this monomer composition to ensure that a homogeneous dispersion of the components was achieved.

B. Glazing Assembly with Electrochromic Monomer Composition

In this example, we assembled electrochromic glazings from clear TEC 15 glass substrates (where the conductive surface of each glass substrate faced one another), with the glass having a sheet resistance of about 15 ohms per square. The dimensions of the glazing assemblies were about 2.5"× 10"×105 $\mu$m, with a weather barrier of an epoxy resin coupled with spacers of about 105 $\mu$m also applied.

We placed into these glazing assemblies the electrochromic monomer composition of Example 41 (A), supra, using the vacuum back filling technique (as described in Varaprasad III, supra).

C. Transformation of Electrochromic Monomer Composition within Glazing to Polychromic Solid Film Once the electrochromic monomer composition of Example 41 (A), supra, was uniformly applied within the glazing assemblies of Example 41 (B), supra, we placed the assemblies in an electrically heated convection oven maintained at about 80° C. for about 2 hours whereupon the monomer composition reacted to form in situ the solid polymer matrix film inside the glazing assemblies.

D. Use of Electrochromic Glazing

We applied a potential of about 1.4 volts to one of the electrochromic glazings of Example 41 (B and C), supra. We observed that the electrochromic glazings colored rapidly and uniformly to a gray color with greenish hue.

In addition, we observed that the high transmission at the center portion of the glazing was about 77.1% transmission which decreased to a low transmission of about 10.3% when about 1.4 volts was applied to thereto. The response time for transmission to change from about 70% to about 20% when that potential was applied thereto was 4 seconds. We made this determination by the reflectometer described in Example 1, supra.

We also observed that the glazing bleached from about 10% transmission to about 70% transmission in a response time of about 7.7 seconds under about a zero applied potential. We noted the bleaching to be uniform.

Example 42

A. Preparation of Electrochromic Monomer Composition

We prepared an electrochromic monomer composition comprising by weight about 0.3% $DVAVPF_6$ (as a cathodic compound), about 1.15% $EVClO_4$ (as a cathodic compound), about 0.69% 5,10-dihydro-5,10-dimethylphenazine (as an anodic compound), all homogeneously dispersed in a combination of about 86.63% propylene carbonate (as plasticizer) and, in combination as a monomer component, about 0.93% HDT (an isocyanate) and about 5.59% Lexorez 1931-50 (a polyol), and about 0.05% dibutyltin dilaurate (a tin catalyst), and about 4.66% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 $\mu$m, with a weather barrier of an epoxy resin coupled with spacers of about 105 $\mu$m also applied.

We placed into these mirror assemblies the electrochromic monomer composition of Example 42 (A), supra, using the vacuum back filling technique (as described in Varaprasad III, supra).

C. Transformation of Electrochromic Monomer Composition within Mirror to Polychromic Solid Film Once the electrochromic monomer composition of Example 42 (A), supra, was uniformly applied within the mirror assemblies of Example 42 (B), supra, we placed the assemblies in an electrically heated convection oven maintained at about 60° C. for about 1 hour whereupon the monomer composition reacted to form in situ the solid polymer matrix film inside the mirror.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 68.0% reflectance which decreased to a low reflectance of about 6.7% when about 1.2 volts was applied to thereto. The response time for reflectance to change from about 60% to about 20% when that potential was applied thereto was about 2.4 seconds. We made this determination by the reflectometer described in Example 1, supra.

We also observed that the mirror bleached from about 10% reflectance to about 60% reflectance in a response time of about 5.7 seconds under about a zero applied potential. We noted the bleaching to be uniform.

Example 43

A. Preparation of Electrochromic Monomer Composition

We prepared an electrochromic monomer composition comprising by weight about 2.18% HUVPF$_6$ (as a cathodic compound), about 0.58% 5,10-dihydro-5,10-dimethylphenazine (as an anodic compound), all homogeneously dispersed in a combination of about 88.87% propylene carbonate (as plasticizer) and, in combination as a monomer component, about 1.3% HDT (an isocyanate) and about 2.41% Lexorez 1931-50 (a polyol), and about 0.03% T-1 (a tin catalyst), and about 4.63% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from TEC-15 glass substrates (where the conductive surface of each glass substrate faced one another), with both the clear, front glass and the silvered, rear glass having a sheet resistance of about 15 ohms per square. The dimensions of the mirror assemblies were about 2.5"×10"×105 µm, with a weather barrier of an epoxy resin coupled with spacers of about 105 µm also applied.

We placed into these mirror assemblies the electrochromic monomer composition of Example 43 (A), supra, using the vacuum back filling technique (as described in Varaprasad III, supra).

C. Transformation of Electrochromic Monomer Composition within Mirror to Polychromic Solid Film Once the electrochromic monomer composition of Example 43 (A), supra, was uniformly applied within the mirror assemblies of Example 43 (B), supra, we placed the assemblies in an electrically heated convection oven maintained at about 80° C. for about 1 hour whereupon the monomer composition reacted to form in situ the solid polymer matrix film inside the mirror.

D. Use of Electrochromic Mirror

We applied a potential of about 1.4 volts to one of the electrochromic mirrors, and observed this mirror to color rapidly and uniformly to a gray color with greenish hue.

In addition, we observed that the high reflectance at the center portion of the mirror was about 71.2% reflectance which decreased to a low reflectance of about 12.5% when about 1.2 volts was applied to thereto. The response time for reflectance to change from about 70% to about 20% when that potential was applied thereto was about 5.3 seconds. We made this determination by the reflectometer described in Example 1, supra.

We also observed that the mirror bleached from about 15% reflectance to about 50% reflectance in a response time of about 12.0 seconds under about a zero applied potential. We noted the bleaching to be uniform.

Example 44

A. Preparation of Electrochromic Monomer Composition

We prepared an electrochromic monomer composition comprising by weight about 0.66% HVSS (as a cathodic compound), about 1.52% EVClO$_4$ (as a cathodic compound), about 0.17% ferrocene (as an anodic compound), about 0.74% phenothiazine (as an anodic compound) all homogeneously dispersed in a combination of about 87.6% propylene carbonate (as plasticizer) and, in combination as a monomer component, about 4.61% dipentaerythritol pentaacrylate. We also added about 0.09% 1,1'-azobiscyclohexanecarbonitrile (as an initiator), about 4.61% Uvinul N 35 (a UV stabilizer). We thoroughly mixed this monomer composition to ensure that a homogeneous dispersion of the components was achieved.

B. Mirror assembly with Electrochromic Monomer Composition

In this example, we assembled interior automotive mirrors from HW-ITO glass substrates (where the conductive surface of each glass substrate faced one another), with both the clear, front glass and the silvered, rear glass having a sheet resistance of about 15 ohms per square. The dimensions of the mirror assemblies were about 2.5"×10"×125 µm, with a weather barrier of an epoxy resin coupled with spacers of about 125 µm also applied.

We placed into these mirror assemblies the electrochromic monomer composition of Example 44 (A), supra, using the vacuum back filling technique (as described in Varaprasad III, supra).

C. Transformation of Electrochromic Monomer Composition within Mirror to Polychromic Solid Film Once the electrochromic monomer composition of Example 44 (A), supra, was uniformly applied within the mirror assemblies of Example 44 (B), supra, we placed the assemblies in an electrically heated convection oven maintained at about 80° C. for about 2 hour whereupon the monomer composition reacted to form in situ the solid polymer matrix film inside the mirror.

D. Use of Electrochromic Mirror

We applied a potential of about 1.3 volts to one of the electrochromic mirrors, and observed this mirror to color rapidly and uniformly to a gray color with bluish hue.

In addition, we observed that the high reflectance at the center portion of the mirror was about 65% reflectance which decreased to a low reflectance of about 6% when about 1.3 volts was applied to thereto. We made this determination by the reflectometer described in Example 1, supra. We noted that the response time to color and also the response time to bleach the mirror was suitable for use in a vehicle.

While we have provided the above examples of the foregoing invention for illustrative purposes employing preferred electrochromic compounds, monomer components and plasticizers, and other components it is to be understood that variations and equivalents of each of the prepared electrochromic monomer compositions identified herein will provide suitable, if not comparable, results when viewed in connection with the results gleaned from these examples. Without undue experimentation, those of ordinary skill in the art will find it readily apparent to prepare polychromic solid film with the beneficial properties and characteristics desirable for the specific application armed with the teaching herein disclosed. And, it is intended that such equivalents be encompassed by the claims which follow hereinafter.

What we claim is:

1. A variable transmission assembly suitable for use as a vehicular glazing or mirror:
   a first substrate having a first transparent conductor coated surface;
   a second substrate having a second conductor coated surface, said second substrate positioned in substantially parallel spaced-apart relationship with said first substrate and with said first and second conductor coated surfaces facing each other;
   an electrochromic medium disposed between said first and second substrates whereby the transmission of light through said electrochromic medium is changed when an electrical potential is applied thereto and wherein said electrochromic medium comprises a plasticized, cross-linked polymeric solid film formed by curing an electrochromic monomer composition that includes at least one polyfunctional component capable of cross-linking, at least one anodic electrochromic compound, at least one cathodic electrochromic compound and a plasticizer, wherein said anodic electrochromic compound is an organic or organometallic compound and said cathodic electrochromic compound is an organic or organometallic compound; and
   wherein the spaced-apart distance between said first substrate and said second substrate is at least about 10 microns.

2. The variable transmission assembly according to claim 1, wherein said plasticizer is selected from the group consisting of acetonitrile, benzylacetone, 3-hydroxypropionitrile, methoxypropionitrile, 3-ethoxypropionitrile, propylene carbonate, ethylene carbonate, glycerine carbonate, 2-acetylbutyrolactone, cyanoethyl sucrose, 7-butyrolactone, 2-methylglutaronitrile, N,N'-dimethylformamide, 3-methylsulfolane, methylethyl ketone, cyclopentanone, cyclohexanone, 4-hydroxy-4-methyl-2-pentanone, acetophenone, glutaronitrile, 3,3'-oxydipropionitrile, 2-methoxyethyl ether, triethylene glycol dimethyl ether and combinations thereof.

3. The variable transmission assembly according to claim 1, wherein the conductor coated surface of said first substrate is selected from a material selected from the group consisting of indium tin oxide, indium tin oxide full wave, indium tin oxide half wave, indium tin oxide half wave green, tan oxide, antimony-doped tin oxide, fluorine-doped tin oxide, antimony-doped zinc oxide and aluminum-doped zinc oxide.

4. The variable transmission assembly according to claim 1, wherein said assembly is a member selected from the group consisting of a vehicular window, vehicular windshield, vehicular backlight, vehicular interior mirror, vehicular exterior mirror, vehicular sun roof, vehicular sun visor or vehicular shade band.

5. The variable transmission assembly according to claim 1, further comprising a molded casing formed about the periphery of the assembly.

6. The variable transmission assembly according to claim 5, wherein said molded casing comprises an injection molding or a reaction injection molding.

7. The variable transmission assembly according to claim 1, wherein at least one of said substrates is constructed from tinted glass.

8. The variable transmission assembly according to claim 1, wherein the spaced-apart distance between said first substrate and said second substrate is from about 10 micron to about 1000 micron.

9. The variable transmission assembly according to claim 8, wherein the spaced-apart distance is from about 20 micron to about 200 micron.

10. The variable transmission assembly according to claim 9, wherein the spaced-apart distance is from about 37 micron to about 74 micron.

11. The variable transmission assembly according to claim 1, comprising a boundary seal made from a polymeric material.

12. The variable transmission assembly according to claim 11, wherein said polymeric material comprises an epoxy resin, a plasticized polyvinyl butyral, an ionomer resin, a polyamide material, a nitrile containing polymer, or a butyl rubber.

13. The variable transmission assembly according to claim 11, wherein said boundary seal comprises spacers.

14. The variable transmission assembly according to claim 1, wherein said electrochromic monomer composition includes a monomer component selected from the group consisting of acrylated urethanes, acrylated heterocyclics and acrylate resins.

15. The variable transmission assembly according to claim 1, wherein said electrochromic monomer composition further comprises a component selected from the group consisting of photoinitiators, photosensitizers, ultraviolet stabilizing agents, electrolytic materials, coloring agents, spacers, anti-oxidizing agents, flame retarding agents, heat stabilizing agents, compatibilizing agents, humectants, lubricating agents, adhesion promoting agents, coupling agents and combinations thereof.

16. The variable transmission assembly according to claim 1, wherein said electrochromic monomer composition comprises a cross-linking agent.

17. The variable transmission assembly according to claim 16, wherein said cross-linking agent is selected from the group consisting of polyfunctional hydroxy compounds, polyfunctional primary or secondary amino compounds, polyfunctional mercapto compounds and combinations thereof.

18. The variable transmission assembly according to claim 17, wherein said cross-linking agent comprises a polyfunctional hydroxy compound.

19. The variable transmission assembly according to claim 18, wherein said polyfunctional hydroxy compound comprises a polyol.

20. The variable transmission assembly according to claim 19, wherein said polyol comprises a glycol or a glycerol.

21. The variable transmission assembly according to claim 16, wherein said cross-linking agent is selected from the group consisting of pentaerythritol, 2-ethyl-2-(hydroxymethyl)-1,3-propanediol, caprolactone triols, and combinations thereof.

22. The variable transmission assembly according to claim 1, wherein said monomer composition comprises a monomer component which polymerizes by addition polymerization or ring opening polymerization selected from the group consisting of a monofunctional monomer, a difunctional monomer, a trifunctional monomer, a polyfunctional monomer or mixtures thereof.

23. The variable transmission assembly according to claim 22, wherein said monomer component is selected from the group of monomers consisting of 2-hydroxyethyl acrylate, 2-hydroxyethyl methacrylate, methylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate, 2,3-dihydroxypropyl methacrylate, methyl acrylate, ethyl acrylate, n-propyl acrylate, i-propyl acrylate, n-butyl acrylate, s-butyl acrylate, n-pentyl acrylate, 2-ethylhexyl acrylate, methyl methacrylate, ethyl methacrylate, n-propyl methacrylate, i-propyl methacrylate, n-butyl methacrylate, s-butyl methacrylate, n-pentyl methacrylate, s-pentyl methacrylate, methoxyethyl acrylate, methoxyethyl methacrylate, triethylene glycol monoacrylate, glycerol monoacrylate, glycerol monomethacrylate, benzyl acrylate, caprolactone acrylate, cyclohexyl acrylate, cyclohexyl methacrylate, 2-ethoxyethyl acrylate, 2-ethoxyethyl methacrylate, 2-(2-ethoxyethoxy)-ethylacrylate, glycidyl methacrylate, n-hexyl acrylate, n-hexyl methacrylate, isobornyl acrylate, isobornyl methacrylate, i-decyl acrylate, i-decyl methacrylate, i-octyl acrylate, lauryl acrylate, lauryl methacrylate, 2-methoxyethyl acrylate, n-octyl acrylate, 2-phenoxyethyl acrylate, 2-phenoxyethyl methacrylate, stearyl acrylate, stearyl methacrylate, tetrahydrofurfuryl acrylate, tetrahydrofurfuryl methacrylate, tridecyl methacrylate, 1,4-butanediol diacrylate, 1,4-butanediol dimethacrylate, 1,3-butylene glycol diacrylate, 1,3-butylene glycol dimethacrylate, diethylene glycol diacrylate, diethylene glycol dimethacrylate, ethylene glycol diacrylate, ethoxylated bisphenol A dimethacrylate, ethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol diacrylate, tetraethylene glycol dimethacrylate, triethylene glycol diacrylate, triethylene glycol dimethacrylate, tripropylene glycol diacrylate, dipentaerythritol pentaacrylate, ethoxylated pentaerythritol triacrylate, pentaerythritol tetraacrylate, trimethylolpropane triacrylate, pentaerythritol triacrylate, trimethylolpropane trimethacrylate, tris(2-hydroxyethyl)-isocyanurate triacrylate, tris(2-hydroxyethyl)-isocyanurate trimethacrylate, polyethylene glycol monoacrylate, polyethylene glycol monomethacrylate, polypropylene glycol monoacrylate, polypropylene glycol monomethacrylate, hydroxyethyl cellulose acrylate, hydroxyethyl cellulose methacrylate, methoxy poly(ethyleneoxy) ethylacrylate, methoxy poly(ethyleneoxy) ethylmethacrylate, ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, dipropylene glycol diacrylate, divinyl benzene, divinyl toluene, diallyl tartrate, allyl maleate, divinyl tartrate, triallyl melamine, glycerine trimethacrylate, diallyl maleate, divinyl ether, diallyl monomethylene glycol citrate, ethylene glycol vinyl allyl citrate, allyl vinyl maleate, diallyl itaconate, ethylene glycol diester of itaconic acid, polyester of maleic anhydride with triethylene glycol, polyallyl glucoses, polyallyl sucroses, glucose dimethacrylate, pentaerythritol tetraacrylate, sorbitol dimethacrylate, diallyl aconitate, divinyl citrasonate, diallyl fumarate, allyl methacrylate, 1,3-bis-(4-benzoyl-3-hydroxyphenoxy)-2-propylacrylate, 2-hydroxy-4-acryloxyethoxybenzophenone, 4-methacryloxy-2-hydroxybenzophenone, cyclohexene oxide, cyclopentene oxide, glycidyl i-propyl ether, glycidyl acrylate, furfuryl glycidyl ether, styrene oxide, ethyl-3-phenyl glycidate, 1,4-butanediol glycidyl ether, 2,3-epoxypropyl -4-(2,3-epoxypropoxy) benzoate, 4,4'-bis-(2,3-epoxypropoxy) biphenyl and combinations thereof.

24. The variable transmission assembly according to claim 23, wherein said plasticizer is selected from the group consisting of acetonitrile, benzylacetone, 3-hydroxypropionitrile, methoxypropionitrile, 3-ethoxypropionitrile, propylene carbonate, ethylene carbonate, glycerine carbonate, 2-acetylbutyrolactone, cyanoethyl sucrose, 7-butyrolactone, 2-methylglutaronitrile, N,N'-dimethylformamide, 3-methylsulfolane, methylethyl ketone, cyclopentanone, cyclohexanone, 4-hydroxy-4-methyl-2-pentanone, acetophenone, glutaronitrile, 3,3'-oxydipropionitrile, 2-methoxyethyl ether, triethylene glycol dimethyl ether and combinations thereof.

25. The variable transmission assembly according to claim 22, wherein said cathodic electrochromic compound may be selected from the group consisting of ethylviologen perchlorate, heptylviologen styryl sulfonate, distyrylmethylviologen perchlorate, ethylhydroxypropylviologen perchlorate and combinations thereof.

26. The variable transmission assembly according to claim 1, wherein said cathodic electrochromic compound comprises a viologen or an anthraquinone.

27. The variable transmission assembly according to claim 1, wherein said anodic electrochromic compound is selected from the group consisting of phenothiazines, phenazines, metallocenes and combinations thereof.

28. The variable transmission assembly according to claim 27, wherein said anodic electrochromic compound is selected from the group consisting of 2-methyl-phenothiazine-3-one having been previously contacted with a redox agent, 5,10-dihydro-5,10-dimethylphenazine, ferrocene and combinations thereof.

29. The variable transmission assembly according to claim 1, wherein said second conductor coated surface is coated with a metallic reflective coating.

* * * * *